(12) United States Patent
Sweet et al.

(10) Patent No.: US 10,367,834 B2
(45) Date of Patent: Jul. 30, 2019

(54) SYSTEMS AND METHODS FOR IMPLEMENTING INTRUSION PREVENTION

(71) Applicant: CloudPassage, Inc., San Francisco, CA (US)

(72) Inventors: Carson Sweet, San Francisco, CA (US); Vlasta Pokladnikova, San Francisco, CA (US)

(73) Assignee: CloudPassage, Inc., San Francisco, CA (US)

( * ) Notice: Subject to any disclaimer, the term of this patent is extended or adjusted under 35 U.S.C. 154(b) by 141 days.

(21) Appl. No.: 15/571,364

(22) PCT Filed: May 12, 2016

(86) PCT No.: PCT/US2016/032162
§ 371 (c)(1),
(2) Date: Nov. 2, 2017

(87) PCT Pub. No.: WO2016/183347
PCT Pub. Date: Nov. 17, 2016

(65) Prior Publication Data
US 2018/0359264 A1  Dec. 13, 2018

Related U.S. Application Data

(60) Provisional application No. 62/160,542, filed on May 12, 2015.

(51) Int. Cl.
*H04L 29/06* (2006.01)
*G06F 21/57* (2013.01)
(Continued)

(52) U.S. Cl.
CPC ........ *H04L 63/1416* (2013.01); *G06F 21/577* (2013.01); *H04L 9/0819* (2013.01);
(Continued)

(58) Field of Classification Search
CPC ............. H04L 63/1416; H04L 63/1433; H04L 63/1408; H04L 63/0236; H04L 9/3247;
(Continued)

(56) References Cited

U.S. PATENT DOCUMENTS 7,444,331 B1 * 10/2008 Nachenberg ........ G06F 16/2455
8,850,565 B2 *  9/2014 Patrick ................ H04L 63/1441
726/22

(Continued)

OTHER PUBLICATIONS

Hutchins, E. M., et al. "Intelligence-Driven Computer Network Defense Informed by Analysis of Adversary Campaigns and Intrusion Kill Chains", 6th Annual International Conference on Information Warfare and Security, Washington, D.C. (2011), 14 pages.

*Primary Examiner* — Taghi T Arani
*Assistant Examiner* — Badri Narayanan Champakesan
(74) *Attorney, Agent, or Firm* — Morgan, Lewis & Bockius LLP

(57) ABSTRACT

System and methods are provided for implementing an intrusion prevention system in which data collected at one or more remote computing assets is analyzed against a plurality of workflow templates. Each template corresponding to a different threat vector and comprises: (i) a trigger definition, (ii) an authorization token, and (iii) an enumerated countermeasure responsive to the corresponding threat vector. When a match between the data collected at the one or more remote computing assets and a trigger definition of a corresponding workflow template is identified, an active threat is deemed to be identified. When this occurs the authorization token of the corresponding workflow template is enacted by obtaining authorization from at least two authorization contacts across established trust channels for the at least two authorization contacts. Responsive to obtaining this authorization, the enumerated countermeasure of the corresponding workflow template is executed.

30 Claims, 29 Drawing Sheets

(51) Int. Cl.
*H04L 9/08* (2006.01)
*H04L 9/32* (2006.01)

(52) U.S. Cl.
CPC ........ *H04L 9/3247* (2013.01); *H04L 63/0236* (2013.01); *H04L 63/0853* (2013.01); *H04L 63/1408* (2013.01); *H04L 63/1433* (2013.01)

(58) Field of Classification Search
CPC .. H04L 9/0819; H04L 63/0853; G06F 21/577
USPC .......................................................... 726/4
See application file for complete search history.

(56) References Cited

U.S. PATENT DOCUMENTS

| | | | |
|---|---|---|---|
| 9,275,222 B2* | 3/2016 | Yang | G06F 21/55 |
| 10,044,730 B1* | 8/2018 | Balazs | H04L 63/105 |
| 2007/0214224 A1* | 9/2007 | Nam | G06Q 10/107 |
| | | | 709/206 |
| 2009/0328206 A1* | 12/2009 | Bardsley | G06F 21/552 |
| | | | 726/22 |
| 2012/0210434 A1* | 8/2012 | Curtis | G06F 21/577 |
| | | | 726/25 |
| 2012/0216242 A1* | 8/2012 | Uner | G06F 21/50 |
| | | | 726/1 |
| 2012/0217301 A1* | 8/2012 | Namey | F41H 5/007 |
| | | | 235/411 |
| 2012/0260082 A1* | 10/2012 | Bobzin | G06F 9/4411 |
| | | | 713/100 |
| 2014/0082366 A1* | 3/2014 | Engler | H04L 9/3226 |
| | | | 713/176 |
| 2015/0310217 A1* | 10/2015 | Artes | G06F 21/577 |
| | | | 726/25 |

* cited by examiner

← 301

Edit workflow template

Name
[Block ip after Nikto attack ▼]

Description
[This killchain workflow will block the offending IP]

[✓] Enabled

Approvers — 324

322 →
320-1 → [✓] Thomas Papaspiros - tpapap@gmail.com
320-2 → [✓] Ioustinos Sarris - ioustnos@gmail.com
320-3 → [ ] Viasta Pokladnikova - biasta@cloudpassage.com
320-4 → [ ] Carson Sweet - carson@cloudpassage.com
320-5 → [ ] Ioustinos Sarris - ioustnos@thecitygame.com
320-6 → [ ] Marisa Bogdanoff - marisa@cloudpassage.com

Trigger definitions — 306 — 308 — 310

164

| Alert event type | Search string | Assign variable name | |
|---|---|---|---|
| lids_rule_failed ▼ | ScanLog1 | $a | 🗑 |
| lids_rule_failed ▼ | ScanLog2 | $b | 🗑 |

304-1
304-2

Add a trigger

Alert trigger conditions
[$a && $b==true]

302

Examples: If $a, $b, $c triggering event codes then valid boolean trigger formula would be:
($a && $b) || $c == true
$a && $b && $c == rue
etc...

Killchain actions after approval

| Name | Execution order | Web service | Parameters | |
|---|---|---|---|---|
| Blockoffending ip | 1 | block_ip - Blocks ips from accessing the server ▼ | aa8fd180667201 3206963c76 | 🗑 |

Fig. 3

| Type | | Logic function |
|---|---|---|
| 1 |  | C=A∧B |
| 2 |  | C=¬(A∧B) |
| 3 |  | C=A∨B |
| 4 | 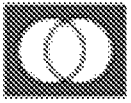 | C=¬(A∨B) |
| 5 |  | C=A∧¬B, C=¬A∧B |
| 6 |  | C=¬A∨B, C=A∨¬B |
| 7 |  | C=¬(A↔B) |
| 8 | 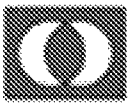 | C=A↔B |
Fig. 4

At a computer system (e.g., grid computer system 200) comprising one or more processing units, and memory storing one or more programs for execution by the one or more processors, the one more programs comprising instructions for implementing a method, receive data collected at one or more remote computing assets 100.

---

Receive a request from a security control module (e.g. agent executive 48) running within a first operating system 44 on a first remote computing asset 100 in the one or more remote computing assets. The request includes a policy identifier that identifies a security policy 58. Responsive to the request, a unique agent identity token, which includes a cryptographic key, is generated and transmitted to the security control module of the remote computing asset 100. Also, a first set of commands 58 is selected according to the identified security policy based upon (i) a current state of the first operating system 44, (ii) a current state of the security control module 48, and (iii) a current state of one or more applications running in the first operating system on the first remote computing asset. The first set of commands is placed in a command queue 150 for retrieval and execution by the security control module on the first remote computing asset 100. The data collected at the one or more remote computing assets 100 includes information that is collected by execution of the first set of commands 58 on the first remote computing asset 100.

---

The one or more remote computing assets 100 is a single remote computing asset.

---

Receiving the data collected uses a cryptographic key assigned to the one or more remote computing assets 100 and data shared with the one or more remote computing assets to decrypt the received data and verify a digital signature within the data.

---

The data collected at the one or more remote computing assets includes: (i) information regarding one or more processes running in memory associated with the one or more remote computing assets, (ii) information that identifies what processes are running in memory associated with the one or more remote computing assets, (iii) a current set of authorized users of the one or more remote computing assets, (iv) a current set of files and directories hosted by the one or more remote computing assets, (v) current metadata for files and directories hosted by the one or more remote computing assets, or (vi) current content of one or more configuration files for the one or more remote computing assets.

---

The one or more remote computing assets 100 include at least one virtual machine, or alternatively, consist of a single virtual machine.

Fig. 15A

SYSTEMS AND METHODS FOR IMPLEMENTING INTRUSION PREVENTION

CROSS-REFERENCE TO RELATED APPLICATION

This application is a United States National Stage Application filed under 35 U.S.C. § 371 of International Patent Application No. PCT/US2016/032162 filed May 12, 2016 and published as WO 2016/183347 A1, which claims priority to U.S. Provisional Application No. 62/160,542 filed May 12, 2015, the entire contents of which applications is incorporated herein for all purposes by this reference.

TECHNICAL FIELD

The present application relates generally to systems and methods for implementing intrusion prevention systems in which authorization from at least two authorization contacts across established trust channels is obtained before enacting a countermeasure responsive to a detected intrusion of a protected computing asset.

BACKGROUND

Cybersecurity threat vectors are paths that malefactors use to gain access to computing assets, such as devices or networks of devices, in order to acquire command and control of such assets and thereby advance nefarious objectives. Threat vectors, for instance, exploit misconfigured firewalls, unsecured wireless routers, wired modems, infected laptops located elsewhere that can access the network behind the firewall, infected USB keys, or known or unknown vulnerabilities in software running on computing assets.

Often there are a number of vulnerabilities in computing asset defenses. Given a set of vulnerabilities associated with a computing asset, a threat vector can be conceptualized as being drawn through some subset of the vulnerabilities, with the threat vector exploiting each of the vulnerabilities in the subset in a sequential ordered process. For instance, a first such vulnerability of the computing asset may be exploited to deliver a weapon. Then, a second such vulnerability may be exploited to install the weapon on the computing asset. A third such vulnerability of the computing asset may then be exploited to obtain command and control over the computing asset in order to achieve a nefarious objective. In this example, the threat vector encompasses the three vulnerabilities of the computing asset and exploits them in a sequential ordered process.

In some instances, multiple different threat vectors are applied against a computing asset in a brute force attack. That is, system vulnerabilities are discovered and exploited rapidly in a brute force manner. In other instances, a single threat vector, from among all the theoretically possible threat vectors, is implemented over a long period of time in order to obviate discovery of the breach in security of the computing asset. In any event, in modern computing assets, it is typically the case that the security of the computing asset is breached by the execution of a chain of events, and this chain of events is termed a threat vector.

In some situations, vulnerabilities that may form the basis for a threat vector are discovered through reconnaissance. Attempts are then made to exploit each of the vulnerabilities, often by firing off automated exploit attempts to see which one of the vulnerabilities can be successfully exploited in order to compromise the computing asset defenses and gain access to an interior environment of the computing asset. Once access to an interior environment is reached, attempts are made to use the interior environment as a jump point, thereby creating several different chains of attack, known as fish bones. That is, the jump points are used to find more vulnerabilities deeper in the interior of the computing asset until enough of the computing asset is compromised to exploit and compromise the computing asset (e.g., obtain command and control of the computing asset in order to shut a process down, implement a foreign process, alter a process, destroy computer code, steal data or computer code, etc.). The successive exploitation of vulnerabilities within the computer defenses constitutes a threat vector. Associated with the threat vector is a velocity with which the attack can be done, the velocity with which data or computer code can be taken out (in instances where the threat vector is designed to acquire data or compute code), and the route that it takes.

To protect computing assets against threat vectors, threat vector analysis is done. Such an analysis starts by evaluating each of the possible vulnerabilities of a computing asset. For instance, in the case where the computing asset is a networked system, all the exterior systems of the networked system are evaluated, all the ports on such exterior systems are evaluated, and so forth. Then, for specific threat vectors, very specific preventive actions, known as kill chain actions are developed. Kill chains implement specific controls or methods that break the chain of a corresponding threat vector in as many places as possible. The more places where the chain of vulnerabilities that constitutes a threat vector are blocked, the more effective the kill chain. For higher value computing assets, kill chains are designed that break every link in the vulnerabilities that constitute a corresponding threat vector. For instance, a kill chain may put some control in place to make sure that certain events can't happen.

In the art, kill chains are preemptive. That is, they implement a safeguard strategy that prevents certain events from happening on protected computing assets. There are many types of preemptive kill chain tools. For instance, network filters can be used to filter out illegitimate traffic, such as traffic to TCP port 445 in instances where such traffic is undesirable. Network intrusion prevention systems can be used to scan embedded data of legitimate network traffic for signatures of known attacks. Network connections or packets containing recognized attacks can be dropped and only clean data delivered to the computing assets. If an attack is not recognized and stopped by the network filters or the network intrusion prevention systems and thus reaches an application running on the computing asset, then a host intrusion prevention system can be used to proactively detect attempts to exploit vulnerabilities in code to execute guarded system calls. Examples of such vulnerabilities, of which there are many, include vulnerability CVE-2009-0658 in the Adobe Acrobat Portable Document Format (PDF), documented by ADOBE on Feb. 19, 2009 and patched Mar. 10, 2009, and CVE-2009-0556 in MICROSOFT POWERPOINT, which was discovered Mar. 23, 2009 and patched on May 12, 2009. See Hutchins et al., 2011, "Intelligence-Driven Computer Network Defense Informed by Analysis of Adversary Campaigns and Intrusion Kill Chains," Leading Issues in Information Warfare and Security Research 1, ed. Julie Ryan, Good New Digital Books, which is hereby incorporated by reference.

Further still, if the above identified preemptive defenses are not successful then behavior blocking can be enacted to prevent various types of threat vectors by detecting dangerous anomalies in application behavior such as launching unrelated external executable files, tampering with the content of executable files, or discovering processes that are commanding excessive computer resources. Products that have incorporated multiple such preemptive defenses have been marketed, and include Kerio ServerFirewall, Kerio Technologies, 2005.

However, what are lacking in the art are satisfactory methods for enacting automated kill chains that include countermeasures. While the above-described safeguards are general safeguard measures to apply in order to protect against threat vectors, countermeasures specifically counter specific threats. That is, a countermeasure breaks the chain of vulnerabilities exploited by a threat vector in real time or near real time upon detection of an explicit threat associated with the threat vector. As such, countermeasures are more effective against threat vectors then safeguards. Countermeasures are not found in automated kill chains because system administrators are adverse to the collateral damage often associated with automated countermeasures. For instance, consider a computing asset that is a web service used by customers. If there is an automated countermeasure system or an intrusion-prevention system that is in place, an intelligent attacker can actually leverage that countermeasure automation against the computing asset. For instance, the hacker can find out who all the best customers are and craft an attack that causes the countermeasure to block all the best customers from getting to the web service. This would force the system administrator to have to unwind the countermeasure, and in all likelihood, cause a significant loss in revenue. This example provides a simple demonstration of why defenses that fire automated countermeasures against detected threat vectors have been found to be unsatisfactory to system administrators.

Thus, given the above background, what is need in the art are satisfactory kill chain procedures that can launch automated kill chains that include countermeasures in response to specific threats.

SUMMARY

The disclosed embodiments provide kill chains capable of launching countermeasures in response to specific threats. In the present disclosure, mobile-enabled checkpoints are provided so that countermeasure capability is available, but is not fired until a predetermined number (at least two) authorized personnel approve the countermeasure. In this way, approval from authorized personnel is always in the chain of events leading to enacting a countermeasure. This prevents situations, such as those described above, in which automated countermeasures are actually used by a system attacker to cause collateral damage such as blocking all the best customers from access to a web service.

Advantageously, the number of people required to authorize the countermeasure of the disclosed kill chains can be scaled both in number of authorized personnel required and the seniority of such personnel, so that very stringent countermeasures require extensive authorization whereas less stringent countermeasures require less authorization. Moreover, in the disclosed systems and methods, authorization occurs across trusted channels to mobile devices associated with authorized personnel. In this way, a countermeasure can be conveniently launched in real time or near real time in response to a specific threat independent of the specific location of the authorized personnel at the time when the threat is detected.

Now that a general summary of the disclosed systems and methods has been outlined, more specific embodiments of the disclosed systems and methods will be presented.

One aspect of the present disclosure provides a computer system comprising one or more processing units and memory storing one or more programs for execution by the one or more processors. The one more programs comprise instructions for receiving data collected at one or more remote computing assets and instructions for obtaining a plurality of workflow templates. Each respective workflow template in the plurality of workflow templates corresponds to a different threat vector in a plurality of threat vectors. Each respective workflow template constitutes a novel kill chain comprising: (i) a trigger definition, (ii) an authorization token, and (iii) an enumerated countermeasure responsive to the corresponding threat vector. In some embodiments the authorization token corresponds to a specific authorization process in a lookup table of authorization processes. In other embodiments, the authorization token includes the authorization process itself. In some embodiments, the enumerated countermeasure is a single countermeasure. In some embodiments, the enumerated countermeasure is in fact a plurality of predetermined countermeasures.

The one or more programs further comprise instructions for identifying an active threat by comparing the data collected at the one or more remote computing assets against the trigger definitions of respective workflow templates in the plurality of workflow templates. When a match between the data collected at the one or more remote computing assets and a trigger definition of a corresponding workflow template is identified, an active threat is deemed identified. In this instance, the instructions for identifying further comprise enacting the authorization token of the corresponding workflow template.

This enacting comprises obtaining authorization from a first authorization contact associated with the corresponding workflow template by pushing an alert regarding the corresponding workflow template through a first established trust channel to a first remote device associated with the first authorization contact without user intervention by the first authorization contact. The first remote device is other than the one or more remote computing assets. Responsive to pushing the alert, either a first indication to proceed is received from the first authorization contact or an indication to abort the kill chain is received from the first authorization contact.

This enacting further comprises obtaining authorization from a second authorization contact associated with the corresponding workflow template. An alert regarding the corresponding workflow template is pushed through a second established trust channel to a second remote device associated with the second authorization contact without user intervention by the second authorization contact. In other words, the second user does not specifically request the alert, but rather the second alert is sent to the second user by way of text message or other form of push notification. The second remote device is other than the one or more remote computing assets. The second remote device is also other than the first remote device. Responsive to pushing the alert, a second indication to proceed is received from the second authorization contact or an indication to abort the kill chain is received from the second authorization contact.

The pushing of alerts to two or more authorization contacts constitutes the authorization protocol. Responsive to satisfactory completion of the authorization protocol, which requires receiving the first and second indication to proceed, the enumerated countermeasure of the corresponding workflow template is executed.

In some embodiments, the one or more programs further comprise instructions for receiving a request from a security control module running within a first operating system on a first remote computing asset in the one or more remote computing assets. The request includes a policy identifier that identifies a security policy. Responsive to this request, a unique agent identity token including a cryptographic key is generated. The agent identity token is transmitted to the security control module. A first set of commands is selected according to the identified security policy, based upon (i) a current state of the first operating system, (ii) a current state of the security control module, and (iii) a current state of one or more applications running in the first operating system on the first remote computing asset. The first set of commands is placed in a command queue for retrieval and execution by the security control module on the first remote computing asset. The data collected at the one or more remote computing assets includes information that is collected by execution of the first set of commands on the first remote computing asset.

In some embodiments, the first remote device is a first mobile device and the second remote device is a second mobile device.

In some embodiments, the enumerated countermeasure of the corresponding workflow template comprises a first action that targets a first component of the threat vector associated with the corresponding workflow template. In some such embodiments, the enumerated countermeasure of the corresponding workflow template further comprises a second action that targets a second component of the threat vector associated with the corresponding workflow template.

In some embodiments, the executing the enumerated countermeasure closes or restricts a port in a remote computing asset in the one or more remote computing assets.

In some embodiments, the enumerated countermeasure of the corresponding workflow template is a technical control set comprising: (i) closing a port on a device in the one or more remote computing assets, (ii) deleting an account on a remote computing asset in the one or more remote computing assets, (iii) terminating a process on a remote computing asset in the one or more remote computing assets, (iv) altering a priority level of a process on a remote computing asset in the one or more remote computing assets, (v) communicating incorrect data to an internet address associated with the active threat, (vi) shutting down a remote computing asset in the one or more remote computing assets, or (vii) blocking traffic originating from an IP address associated with the active threat from accessing the one or more remote computing assets.

In some embodiments, the instructions further comprise originating or maintaining the established first trust channel by receiving a request from a security control module running within an operating system on the first remote device. This request includes a policy identifier that identifies a security policy. A unique agent identity token which includes a cryptographic key is generated. The agent identity token is transmitted to the security control module. A set of commands is selected according to the identified security policy based on (i) a current state of the operating system, (ii) a current state of the security control module, and (iii) a current state of one or more applications running in the operating system on the first remote device. The set of commands is placed in a command queue for retrieval and execution by the first remote device. Data is received from the first remote device responsive to execution of the set of commands on the first remote device. This data is used to originate or maintain the first established trust channel with the first remote device. In some such embodiments, the pushing the alert regarding the corresponding workflow template through the first established trust channel comprises placing the alert in the command queue for retrieval by the first remote device.

In some embodiments, the first indication to proceed is received from the first authorization contact across the first established trust channel, from the first remote device. For instance, in some embodiments, the first authorization contact activates an affordance in a specific application running on the first remote device that authorizes the countermeasure and, in response to activating this affordance (e.g., pressing a radio button), an indication to proceed is communicated across the trusted channel. In some alternative embodiments, the first indication to proceed is received from the first authorization contact outside the first established trust channel. For instance, the first authorization contact, in response to receiving the alert, telephones a command and control central and provides verbal authorization to proceed with the countermeasure.

In some embodiments, the enacting the security token comprises sending the alert to a plurality of authorization contacts. In these embodiments, the plurality of authorization contacts consists of three of more authorization contacts and includes the first and second authorization contacts. Further, in such embodiments, satisfactory completion of the authorization protocol includes receiving an indication to proceed from more than a predetermined number of authorization contacts in the plurality of authorization contacts. The predetermined number of authorization contacts is less than the number of authorization contacts in the plurality of authorization contacts. To illustrate, in some embodiments, the plurality of authorization contacts consists of four authorization contacts and satisfactory completion of the authorization protocol requires receiving an indication to proceed from three of the authorization contacts.

In some embodiments, the enacting the security token comprises sending the alert to a plurality of authorization contacts, the plurality of authorization contacts consists of three of more authorization contacts and includes the first and second authorization contact, each authorization contact in the plurality of authorization contacts is associated with a point value that is contributed to an authorization score when the authorization contact provides an indication to proceed, and satisfactory completion of the authorization protocol comprises achieving a cumulative point score that exceeds a predetermined value. For instance, in some embodiments, the plurality of authorization contacts comprises a first authorization contact that has a four point value, a second authorization contact that has a three point value, and third through eighth authorization contacts that each have a two point value. For a given alert, satisfactory completion of the authorization protocol requires receiving a cumulative indication to proceed worth at least eight points. This can be achieved, for example, by receiving an indication to proceed from the first authorization contact (four points) plus the second authorization contact (three points), plus any one of the third through eighth contacts (two points) for a total of nine points. This can alternatively be achieved, for example, by receiving an indication to proceed from the third through seventh authorization contacts (4×2=8 points). As these examples illustrate, in some embodiments, the first authorization contact has a point value that is different than the second authorization contact.

In some embodiments, the workflow template authorization token includes a threat level value that represents a threat level of the workflow template. In such embodiments, enacting the authorization token comprises using the threat level value to select an authorization protocol from among a plurality of authorization protocols. In such embodiments, the selected authorization protocol includes an identity of the first remote device and the second remote device from which an indication to proceed is sought. In one such example, the threat level value of the workflow authorization token is on a scale of 1 to 10, with 1 representing the least severe threat and 10 representing the most severe threat. Each threat level value corresponds to an authorization protocol that is commensurate with the threat level value. In this example, the workflow template authorization token includes the threat level value of the threat that the workflow template is designed to thwart and enacting the authorization token comprises accessing the authorization protocol that is commensurate with the threat level value, and executing the protocol. Accordingly, in some such embodiments, a first authorization protocol in the plurality of authorization protocols is associated with a first threat level value and includes contact information for a first plurality of authorization contacts that are to be contacted by the enacting upon selection of the first authorization protocol, a second authorization protocol in the plurality of authorization protocols is associated with a second threat level value, other than the first threat level value, and includes contact information for a second plurality of authorization contacts that are to be contacted by the enacting upon selection of the second authorization protocol, and a number of authorization contacts in the first plurality of authorization contacts is different than a number of authorization contacts in the second plurality of authorization contacts.

In some embodiments, the one more programs further comprise instructions for enumerating the authorization token for a first workflow template in the plurality of workflow templates based upon a characteristic of the one or more remote computing assets that the first workflow template is designed to protect. In some embodiments, the characteristic is (i) a quantification of the confidentiality of information handled by the one or more remote computing assets or (ii) a quantification of the importance on maintaining the integrity of the information handled by the one or more remote computing assets, or (iii) a quantification of the importance of maintaining the availability of the one or more remote computing assets. In some embodiments, a remote computing asset in the one or more remote computing assets is a remote computer system at a predetermined IP address, a data stack, a computer service implemented on a computer system, or an internet protocol port on a remote computer system.

In some embodiments, the trigger definition of a workflow template in the plurality of workflow templates comprises an atomic indicator, a computed indicator, or a behavioral indicator. In some embodiments, the trigger definition of a workflow template in the plurality of workflow templates is correlated with an intrusion of the one or more remote computing assets.

In some embodiments, responsive to unsatisfactory completion of the authorization protocol, the enumerated countermeasure of the corresponding workflow template is not executed. In some embodiments, the one or more remote computing assets is a single remote computing asset.

In some embodiments, each respective workflow template in the plurality of workflow templates comprises an indication as to whether it is enabled or not. IN such embodiments, identification of the active threat comprises comparing the data collected at the one or more remote computing assets against only those trigger definition of respective workflow templates in the plurality of workflow templates that are enabled.

In some embodiments, a trigger definition of a workflow template in the plurality of workflow templates comprises a plurality of triggers and each respective trigger in the plurality of triggers is represented by (i) a variable indicating a status of the respective trigger and (ii) an event type. In such embodiments, the trigger definition further comprises logic that relates the plurality of triggers into a single expression. For example, consider an example in which a first trigger monitors for HALO (CloudPassage, San Francisco, Calif.) event types "lids rule failed" that contain the string "ScanLog1" and that the status of this first trigger is represented by variable name $a. Further, a second trigger monitors for HALO events type "lids rule failed" that contain the string "ScanLog2" and that the status of this second trigger is represented by the variable name $b. Further still in this example, the logic in the trigger definition that relates the first and second triggers is the clause "$a && $b==true". Thus, this trigger defines a triggered workflow in which both the first trigger and the second trigger events must occur. Accordingly if the selected alert trigger conditions clause was "$a||$b==true" then a new workflow would be created if either of the two events was detected.

In some embodiments, the step of receiving the data collected uses a cryptographic key assigned to the one or more remote computing assets and data shared with the one or more remote computing assets to decrypt the received data and verify a digital signature within the data.

In some embodiments, the data collected at the one or more remote computing assets includes: (i) information regarding one or more processes running in memory associated with the one or more remote computing assets, (ii) information that identifies what processes are running in memory associated with the one or more remote computing assets, (iii) a current set of authorized users of the one or more remote computing assets, (iv) a current set of files and directories hosted by the one or more remote computing assets, (v) current metadata for files and directories hosted by the one or more remote computing assets, or (vi) current content of one or more configuration files for the one or more remote computing assets.

In some embodiments, the one or more remote computing assets include at least one virtual machine. In some embodiments, the one or more remote computing assets consist of a single virtual machine.

In some embodiments, the instructions for receiving data collected at the one or more remote computing is scheduled to repeat execution at a predetermined time or at predetermined time intervals (e.g., every fifty seconds, every five minutes, each half hour, or every hour).

In some embodiments, a remote computing asset in the one or more remote computing assets is an embedded component of an automobile or an embedded component of an electrical appliance.

Another aspect of the present disclosure provides a non-transitory computer readable storage medium storing one or more programs configured for execution by a computing device having one or more processors and memory. The one or more programs comprise instructions for receiving data collected at one or more remote computing assets. The one or more programs further comprise instructions for obtaining a plurality of workflow templates. Each respective workflow template in the plurality of workflow templates corresponds to a different threat vector in a plurality of threat vectors. Each respective workflow template in the plurality of workflow templates comprises: (i) a trigger definition, (ii) an authorization token, and (iii) an enumerated countermeasure responsive to the corresponding threat vector. The one or more programs further comprise instructions for identifying an active threat by comparing the data collected at the one or more remote computing assets against the trigger definition of respective workflow templates in the plurality of workflow templates.

When a match between the data collected at the remote computing asset and a trigger definition of a corresponding workflow template is identified, an active threat is deemed to be identified, and the instructions for identifying further comprise enacting the authorization token of the corresponding workflow template. This enacting comprises: obtaining authorization from a first authorization contact associated with the corresponding workflow template by pushing an alert regarding the corresponding workflow template through a first established trust channel to a first remote device associated with the first authorization contact without user intervention by the first authorization contact. The first remote device is other than the one or more remote computing assets. A first indication to proceed is received from the first authorization contact when the first authorization contact approves the alert. The enacting further comprises obtaining authorization from a second authorization contact associated with the corresponding workflow template by pushing the alert regarding the corresponding workflow template through a second established trust channel to a second remote device associated with the second authorization contact without user intervention by the second authorization contact. The second remote device is other than the one or more remote computing assets and the second remote device is other than the first remote device. A second indication to proceed is from the second authorization contact when the second authorization contact approves the alert. Responsive to satisfactory completion of the authorization protocol, which satisfaction requires receiving the first and second indication to proceed, the enumerated countermeasure of the corresponding workflow template is executed.

BRIEF DESCRIPTION OF THE DRAWINGS

FIG. 3 illustrates a graphical user interface 301 for defining a workflow 162 that is provided by a kill chain event monitoring system in accordance with some embodiments.

FIG. 4 illustrates eight Venn diagrams associated with eight possible ways to combine two events, A and B, in accordance with some embodiments.

FIG. 15A, FIG. 15B, FIG. 15C, FIG. 15D, FIG. 15E, FIG. 15F, and FIG. 15G collectively illustrate a method for implementing an intrusion prevention system in which authorization from at least two authorization contacts across established trust channels is obtained before enacting a countermeasure responsive to a detected intrusion of one or more protected computing assets in accordance with the present disclosure.

Like reference numerals refer to corresponding parts throughout the several views of the drawings.

DETAILED DESCRIPTION

Figure 1A:
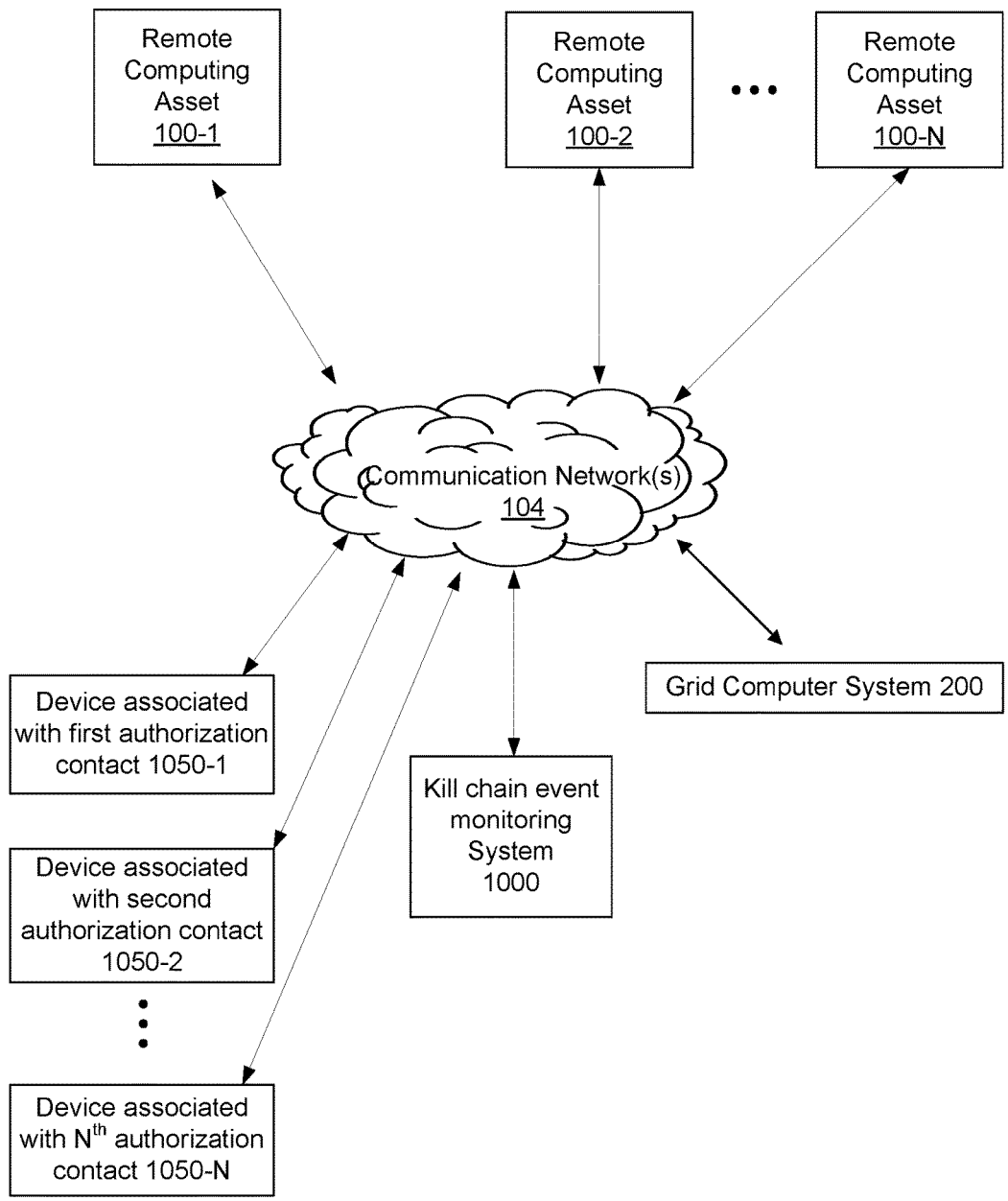
FIG. 1A, FIG. 1B, FIG. 1C and FIG. 1D illustrate a system in accordance with the present disclosure.
Figure 1B:
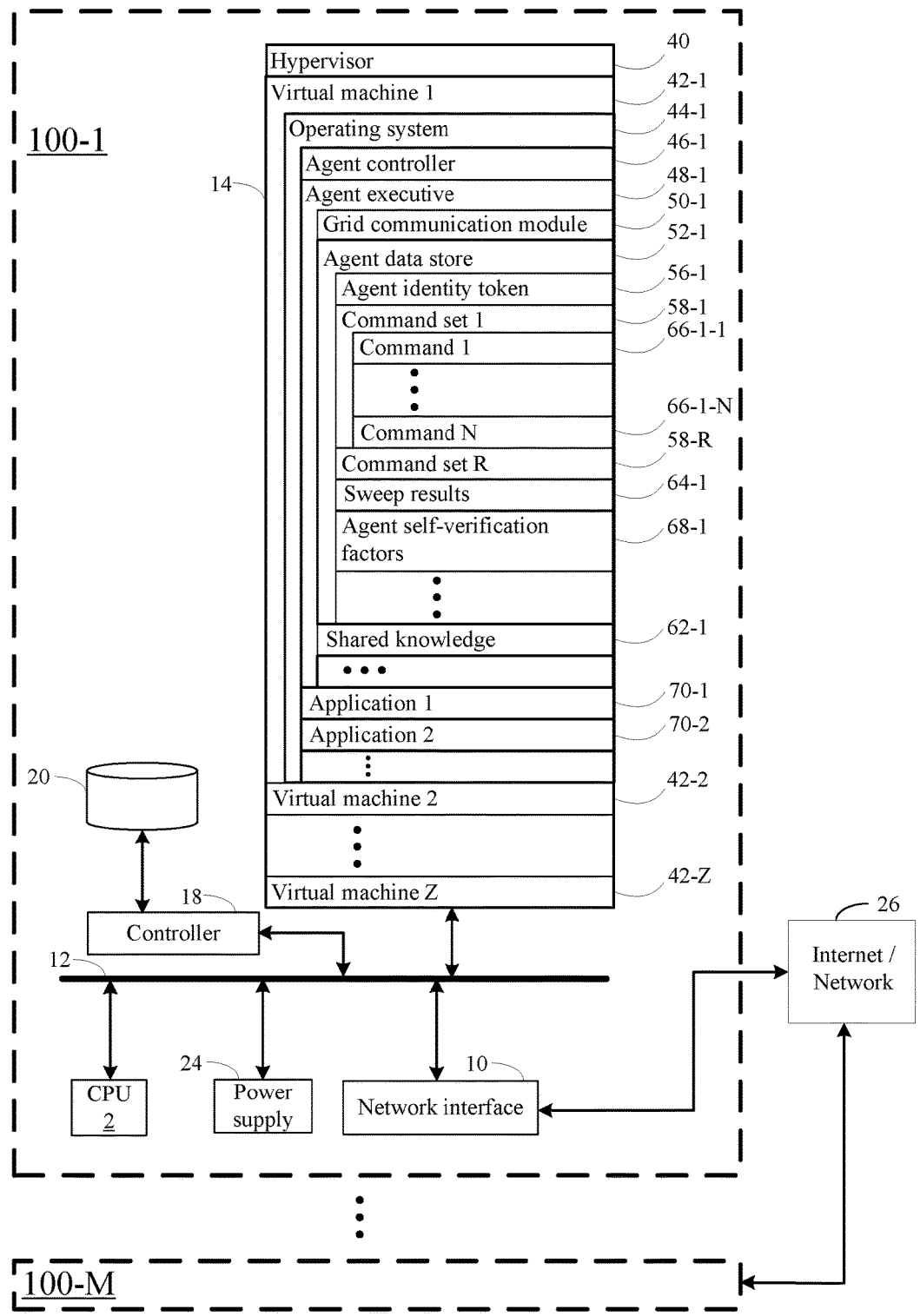
Figure 1C:
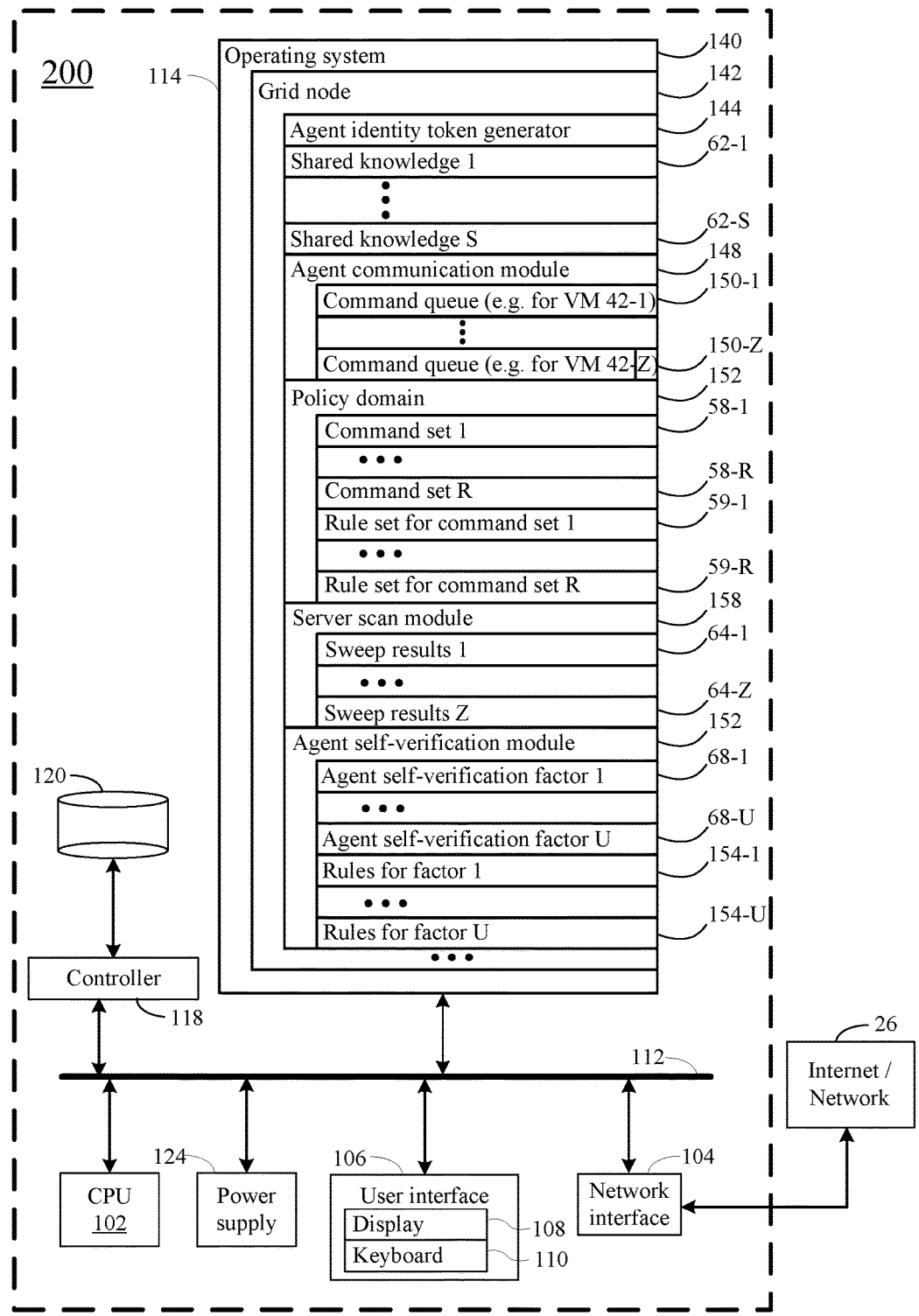
Figure 1D:
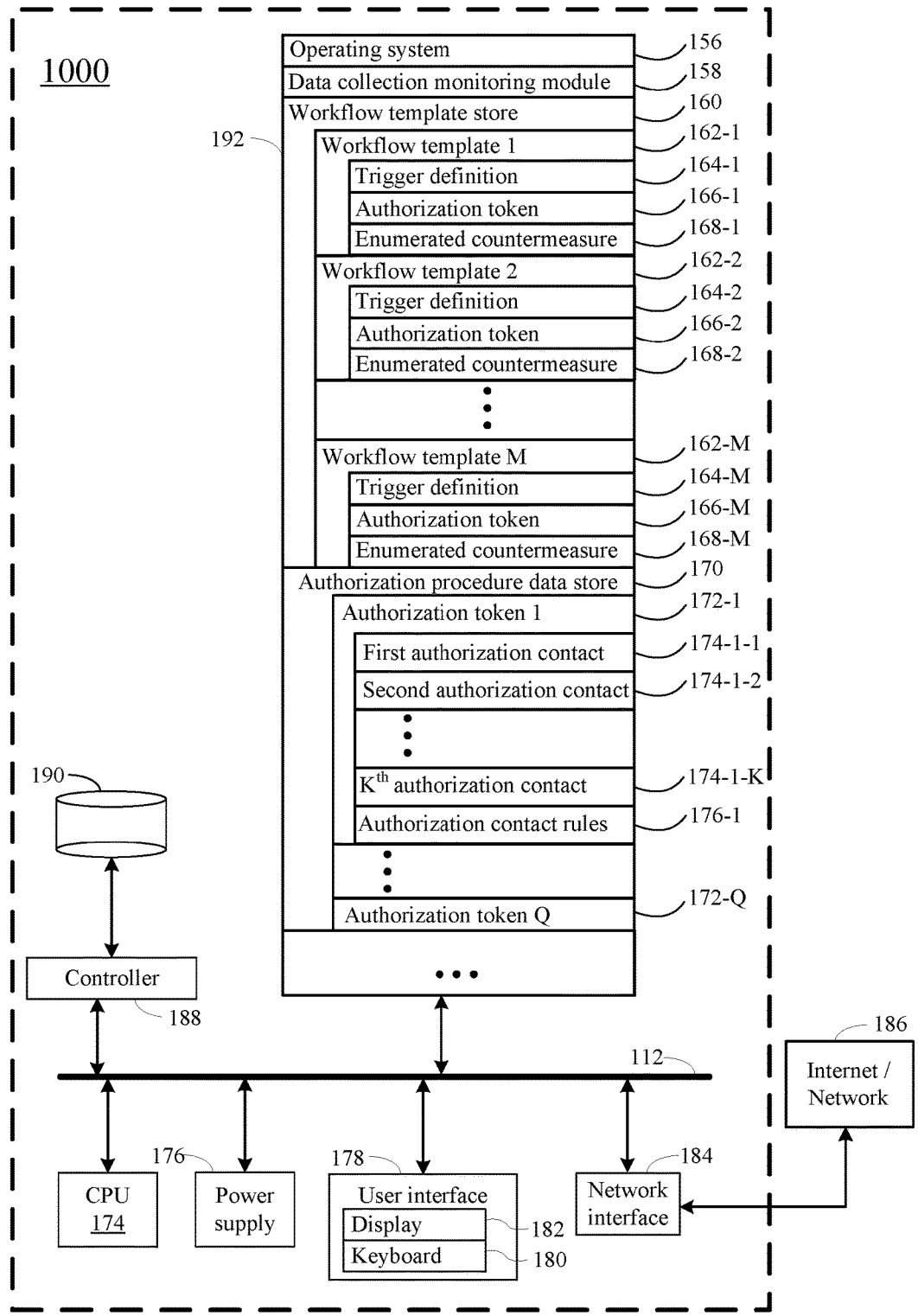

A detailed description of a system in accordance with the present disclosure is described in conjunction with FIGS. 1A through 1D. As such, FIGS. 1A through 1D collectively illustrate the topology of an environment in accordance with the present disclosure. In the topology, there are one or more remote computing assets 100 (FIGS. 1A and 1B), a grid computer system 200 (FIGS. 1A and 1C), devices associated with one or more authorization contacts (FIG. 1A), and a Kill chain monitoring system (FIG. 1D).

Of course, other topologies are possible, for instance, grid computer system 200 can in fact be formed from several computers that are linked together in a network. Further, there may be any number of remote computing assets like that of the remote computing asset 100 illustrated in FIG. 1B and functioning in the same manner as the computing asset 100, where each such remote computing asset is serviced by the grid computer system 200. Moreover, typically, there are hundreds, thousands, hundreds of thousands of remote computing assets 100 or more. The exemplary topology shown in FIGS. 1A-1D merely serves to describe the features of an embodiment of the present disclosure in a manner that will be readily understood to one of skill in the art.

In some embodiments, a remote computing asset is any electronic device or process that is to be protected from infiltration. As such, exemplary computing assets include, but are not limited to, a remote computer system at a predetermined IP address, a data stack, a computer service implemented on a computer system, an internet protocol port or a remote computer system. In some embodiments, referring to FIG. 1B, a remote computing asset 100 has one or more processing units (CPU's) 2, a network or other communications interface 10, a memory 14 (e.g., random access memory), one or more magnetic disk storage and/or persistent devices 20 optionally accessed by one or more controllers 18, one or more communication busses 12 for interconnecting the aforementioned components, and a power supply 24 for powering the aforementioned components. Data in memory 14 can be seamlessly shared with non-volatile memory 20 using known computing techniques such as caching. Memory 14 and/or memory 20 can include mass storage that is remotely located with respect to the central processing unit(s) 2. In other words, some data stored in memory 14 and/or memory 20 may in fact be hosted on computers that are external to computing asset 100 but that can be electronically accessed by the asset 100 over an Internet, intranet, or other form of network or electronic cable (illustrated as element 26 in FIG. 1B) using network interface 10.

In some non-limiting embodiments, a remote computing asset 100 hosts one or more virtual machines. This is illustrated in FIG. 1B where memory 14 stores a hypervisor 40 for initiating one or more hardware virtual machines 42. In such embodiments, there is any number of hardware virtual machines 42 running on the remote computing asset 100. In some instances, there is none or only a single hardware virtual machine 42 running on the remote computing asset 100. In some instances, there are two or more, three or more, five or more, or ten or more hardware virtual machines 42 running on the remote computing asset 100. In some instances, a single virtual machine 42 is running on multiple remote computing assets 100. As illustrated in FIG. 1B, each hardware virtual machines 42 preferably comprises: an operating system 44 that includes procedures for handling various basic system services; an agent controller 46 that runs when the virtual machine 42 is running. The agent controller 46 serves to ensure that an agent executive 48 is running on the virtual machine 42. The agent executive 48 provides security in a cloud computing environment.

In some embodiments, an agent executive 48 comprises:
 a grid communication module 50 that is used for communicating with the grid computer system 200 via one or more communication networks 26, such as the Internet, other wide area networks, local area networks (e.g., a local wireless network can connect remote computing asset 100 to the grid computer system 200), metropolitan area networks, and so on; and
 an agent data store 52 or instructions for accessing an agent data store 52.

In some embodiments, the agent data store 52 stores:
an agent identity token 56 that is uniquely associated with the agent executive 48;

one or more command sets 58, each command set 58 comprising one or more commands 66 that are run by the agent executive 48;
sweep results 64 that are collected by agent executive 48 in response to commands 66 and/or agent self-verification factors 68; and
agent self-verification factors 68 that are used to verify the integrity of the corresponding agent executive 48.

Exemplary memory 14 further comprises shared knowledge 62 that is shared with grid computer system 200, the shared knowledge serving to encrypt, decrypt, digitally sign and/or verify data and messages that are communicated between the remote computing asset 100 and the grid computer system 200 as disclosed in further detail below.

In some embodiments, the agent executive 48 cannot accept a network connection from any remote device and has no access to any open network communication ports. In such embodiments, there is no direct communication between the remote grid computer system 200 and the agent executive 48.

The operating system 44 within each virtual machine 42 also runs one or more user applications 70, such as the first application 70-1 and the second application 70-2 illustrated in FIG. 1A. In some embodiments, one or more of the applications 70 are applications in development.

Although not stored in agent data store 52 or anywhere else on remote computing asset 100, there is an agent API key that is uniquely associated with an organization that controls a respective agent executive 48 or with a policy domain when a single organization desires to implement multiple policy domains, each of which is intended to control a distinct set of one or more agent executives 48.

As will be understood by one of skill in the art, there is individual persistent storage (e.g. of type 20) associated 1:1 with each virtual machine 42 residing on the remote computing asset 100. Such storage is where the virtual machine 42 operating systems and files are stored and accessed, and in turn is where the agent binaries and encrypted databases (e.g., agent data store 52) are stored and accessed.

In operation, agent data store 52 is stored in memory 20, although some agent data is held in memory 14 of the virtual computer during operation.

Some embodiments also include remote computing assets 100 that are not running virtual machines 42. For example, in some embodiments, a remote computing device runs an operating system, and within the operating system are running an agent controller and an agent executive. An agent controller 46 and an agent executive 48 perform the same security monitoring and control whether they are running on a virtual machine 42 or running on an individual computing device.

One or more remote computing assets 100 are able to establish a connection via Internet/network to grid computer system 200. FIG. 1A illustrates the connection to only one such remote computing asset 100.

A grid computer 200 can provide security for many individual virtual machines 42 and/or remote computing asset 100. In addition, virtual machines 42 optionally running on a single remote computing asset 100 may be serviced by two or more distinct grid computers 200. For example, some embodiments spread out the processing load from the agent executives across multiple grid computers 200 in order to provide better load balancing.

As described in further detail below, in typical embodiments the grid computers 200 does not initiate communication with an agent executive 48 (e.g., running on a virtual machine 42) because the agent executive should not have open network ports. Instead, the agent executives initiate communication with the appropriate grid computer 200 to send information and/or retrieve information (e.g., retrieve commands from a designated command queue 150). In some embodiments, some remote computing assets 100 that utilize the grid computer system 200 use a single operating system 44, without a virtual machine. That is, the remote computing asset 100 does not require a hypervisor 40 or virtual machine 42. The agent executive 48 monitors and controls security of an operating system 44, including the integrity of the agent executive 48 itself and the integrity of one or more applications 70 running on the operating system 44.

In typical embodiments, a grid computer system 200 comprises one or more computers. For purposes of illustration in FIG. 1C, the grid computer system 200 is represented as a single computer that includes all of the functionality of the grid computer system 200. However, the disclosure is not so limited. The functionality of the grid computer system 200 may be spread across any number of networked computers and/or reside on each of several networked computers. One of skill in the art will appreciate that a wide array of different computer topologies are possible for the grid computer system 200 and all such topologies are within the scope of the present invention. Turning to FIG. 1C with the foregoing in mind, an exemplary grid computer system 200 comprises:

one or more processing units (CPU's) 102;
a network or other communications interface 104;
a memory 114;
optionally, one or more magnetic disk storage and/or persistent storage devices 120 accessed by one or more optional controllers 118;
a user interface 106, the user interface 106 including a display 108 and a keyboard or keypad or other data entry device 110;
one or more communication busses 112 for interconnecting the aforementioned components; and
a power supply 124 for powering the aforementioned components.

In some embodiments, user interface 106, display 108, and other data entry devices 110 are not part of a grid computer system 200. In fact, in some embodiments, the grid computer system 200 is a virtual machine itself.

In some instances, data in memory 114 can be seamlessly shared with optional non-volatile memory 120 using known computing techniques such as caching. The memory 114 preferably stores an operating system 140 that includes procedures for handling various basic system services and for performing hardware dependent tasks; and a grid node 142 for providing security.

Typically, a grid node 142 comprises an agent identity token generator 144 for generating an agent identity token 56 using a cryptographic token generation protocol when an agent API key provided by an agent executive 48 is deemed valid. The agent identity token generator 144 is sometimes referred to as the token generation module.

Typically, the grid node 142 further comprises shared knowledge 62 for each of one or more agent executives 48 running on one or more remote computing assets 100. Such shared knowledge, which is typically different for each respective remote computing asset 100 enables encryption of information that is exchanged between the remote computing asset 100 (e.g., agent executives 48) and the grid computer system 200.

Typically, the grid node 142 further comprises an agent communication module 148 that is used to communicate commands to one or more remote computing assets 100 (e.g., virtual machines 42 running on one or more remote computing assets 100). The agent communication module 148 includes one or more command queues 150 for each such remote computing asset (e.g., for each virtual machine 42 running on a remote computing asset). The agent communication module 148 posts commands for a respective remote computing asset 100 (e.g., the agent executive 48 running on a remote computing assets 100) to the command queue 150 that uniquely corresponds to the remote computing asset 100 and/or to a process running on the remote computing asset 100 (e.g., virtual machine 42 on which the respective agent executive 48 runs);

Typically, the grid node 142 further comprises a policy domain 152 comprising one or more command sets 58 and one or more rule sets 59, where for each command set 58 there is a corresponding rule set 59. Each command set 58 includes one or more commands. Each such command directs an agent executive 48 operating on a remote computing asset 100 to acquire information or perform a task and report back to the grid computer system 200 the status of the task. Each rule set 59 is for processing information provided by an agent executive 48 to the grid computer system 200 upon completion of a corresponding command set 58.

Typically, the grid node 142 further comprises a server scan module 158 which collects information and/or the status of completed tasks upon completion of a command set 58 and stores such data as sweep results 64. Each such sweep result uniquely corresponds to a remote computing asset 100 or, optionally, a hardware virtual machine 42 operating on a remote computing asset 100, serviced by the grid computer system 200. The server scan module 158 is sometimes referred to as the integrity validation module.

Typically, the grid node 142 further comprises an agent self-verification module 152 which keeps an up-to-date list of the agent self-verification factors 68 that are used to verify an agent executive 48 running on a remote computing asset 100 (e.g., a virtual machine 42 running on a running on a remote computing asset 100) that is serviced by the grid computer system 200 as well as rules 154 for processing these factors. in some embodiments, agent self-verification module 152 comprises agent self-verification corrective command sets and agent self-verification failsafe command sets in addition to agent self verification factors 68. Agent self-verification corrective command sets and agent self-verification failsafe command sets comprise the actual commands used to attempt correct an integrity failure, and in the event that self-correction fails, the failsafe actions to be taken (e.g., alert an administrator, shut down the agent executive 48, shut down the virtual machine 42, etc.).

The agent identity token 56 is uniquely associated with an agent executive 48. As disclosed below, the agent identity token 56 is the data by which the uniquely associated agent executive 48 is identified and authenticated to the grid computer system 200. The agent identity token 56 along with shared knowledge 62 is used by the grid communication module 50 to encrypt and sign any message sent to the grid computer system 200. The agent identity token 56 along with shared knowledge 62 is used by the agent communication module 148 to decrypt, authenticate the sender of, and verify the integrity of any message received from an agent executive 48. The agent identity token 56 along with shared knowledge 62 is also used by the agent communication module 148 to encrypt and sign any message to an individual agent executive 48. The agent identity token 56 along with shared knowledge 62 is also used by the grid communication module 50 to decrypt, authenticate the sender of, and verify the integrity of any message received from the grid computer system 200.

In some embodiments, the kill chain event monitoring system 1000 operates on grid computer system 200. In some embodiments, as illustrated in FIG. 1D, the kill chain event monitoring system 1000 is a standalone system. In typical embodiments, the kill chain event monitoring system 1000 does not operate in a remote computing asset 100 or a device associated with an authorization contact.

In some embodiments, referring to FIG. 1D, kill chain event monitoring system 1000 has one or more processing units (CPU's) 174, a network or other communications interface 184, a memory 192 (e.g., random access memory), one or more magnetic disk storage and/or persistent devices 190 optionally accessed by one or more controllers 188, one or more communication busses 112 for interconnecting the aforementioned components, and a power supply 176 for powering the aforementioned components. Data in memory 192 can be seamlessly shared with non-volatile memory 190 using known computing techniques such as caching. Memory 192 and/or memory 190 can include mass storage that is remotely located with respect to the central processing unit(s) 174. In other words, some data stored in memory 192 and/or memory 190 may in fact be hosted on computers that are external to kill chain event monitoring system 1000 but that can be electronically accessed by the system 1000 over an Internet, intranet, or other form of network or electronic cable (illustrated as element 186 in FIG. 1D) using network interface 184. In some embodiments, kill chain event monitoring system 1000 includes a user interface 178 (e.g., including one or more input devices 180 such as a keyboard, and one or more output devices 182 such as a display).

As illustrated in FIG. 1D, a kill chain event monitoring system 1000 preferably comprises an operating system 156 that includes procedures for handling various basic system services. A kill chain event monitoring system 1000 further comprises a data collection monitoring module 158 for obtaining data collected at one or more remote computing assets 100. In some embodiments, such data are events that occur on remote computing assets 100. For instance, consider the case in which the grid computer system 1000 monitors for any event in a collection of enumerated event types {enumerated event type 1, enumerated event type 2, . . . , enumerated event type M}. In the example, when the grid computer system 200 detects that an event of a type in the set of event types {enumerated event type 1, enumerated event type 2, . . . , enumerated event type M} has occurred, such event is available for interrogation by data collection monitoring module 158. In one exemplary embodiment, data collection monitoring module 158 is run as a cron job on a periodic (e.g., every 60 seconds) or some other form of repetitive basis, and obtains from the sweep results 64 those events specified by the one or more workflows 162 stored in the workflow template store 160 that have been populated, for instance through an a grid computer system 200 application programming interface.

In some embodiments, as disclosed above, a grid computer system 200 detects that an event in the set of enumerated event types {enumerated event type 1, enumerated event type 2, . . . , enumerated event type M} has occurred by invoking server scan module 158 (FIG. 1C) which collects information and/or the status of completed tasks upon completion of a command set 58 on a remote computing asset 100 and stores such data as sweep results 64 in the grid computer system 200. As discussed above, in typical embodiments, there is no network communication between the agent executive 48 on a remote computing asset 100 and the grid computer system 200, and so such sweep results are typically posted by the agent executive 48 in the grid computer system 200 using the agent identity token 56 and shared knowledge 62. In this way, each such sweep result 64 uniquely corresponds to a remote computing asset 100 or, optionally, a hardware virtual machine 42 operating on a remote computing asset 100, serviced by the grid computer system 200. In some embodiments, grid the computer system 200 then detects occurrence of events in the collection of enumerated event types {enumerated event type 1, enumerated event type 2, . . . , enumerated event type M} and stores them in one or more log files or other form of data structure.

In alternative embodiments, these event types are passed on to the data collection monitoring module 158, for instance through an application programming interface responsive to calls from data collection monitoring module 158. In still other embodiments, unfiltered event types are passed on to the data collection monitoring module 158 and the module stores such event types as log files and scans them for events that satisfy the one or more workflow templates 162.

In some embodiments, data collection monitoring module 158 receives event data from the grid computer system 200 on a periodic basis, or some other type of reoccurring basis (e.g., nonperiodic) rather than when the server scan module detected such events. Moreover, in some embodiments, the events collected by data collection monitoring module 158 are from several different remote computing assets 100 of FIG. 1A.

In some embodiments, the grid computer system 200 and the kill chain event monitoring system 1000 is the same system and the data collection monitoring module 158 is invoked as one or more processes running on grid computing system 200.

Returning to FIG. 1D, in typical embodiments, the kill chain event monitoring system 1000 comprises a workflow template store 160 which includes a plurality of workflow templates 162. Each respective workflow template 162 includes a trigger definition 164, an authorization token 166, and an enumerated countermeasure 168.

A trigger definition 164 serves to filter on specific event types, such as any of the event types defined for any of the policies (command sets 58) defined for any of the remote computing assets 100. Examples of such events include, but are not limited to, events associated with detected software vulnerabilities, failed configuration policy rules, or changed file integrity targets.

In some embodiments, an event in the trigger definition 164 is directed to file integrity monitoring. For instance, in some embodiments, an exemplary event type represents changes to files associated with the operating system 44 of a remote computing asset 100 that are commonly modified by attackers to raise privileges or maintain raised privileges of such files. In another example, in which the operating system 44 is LINUX, an exemplary event type represents changes to common files whose setuid permissions bit is set. In still another example where the operating system 44 is LINUX, an exemplary event type represents changes to HAProxy, changes to MongoDB files and directories, or changes to WordPress files and directories. In another example where the operating system 44 of the remote computing asset 100 is a version of MICROSOFT WINDOWS, an exemplary event type is associated with changes in system files (e.g., installers, system settings, core applications, diagnostic files, boot files, and others). In still another example where the operating system 44 is a version of MICROSOFT WINDOWS, event types are defined that detect changes in Windows registry keys related to security settings, including network, user behavior, administration, audit, and others.

In some embodiments, an event is directed to log-based intrusion detection. Non-limiting examples of such events are authentication failure for root, password changes for root, successful root SSH login, or a formally non-root user switching to root.

In some embodiments, an alert is defined as a search expression that is used to search the sweep results 64 for a match. For instance, in the example where the event is authentication failure for root, the search expression may be "pam_unix(su:auth):authentication failure.*user=root." In the example where the event is password changes for root, the search expression may be "password changed for root."

Figure 2:
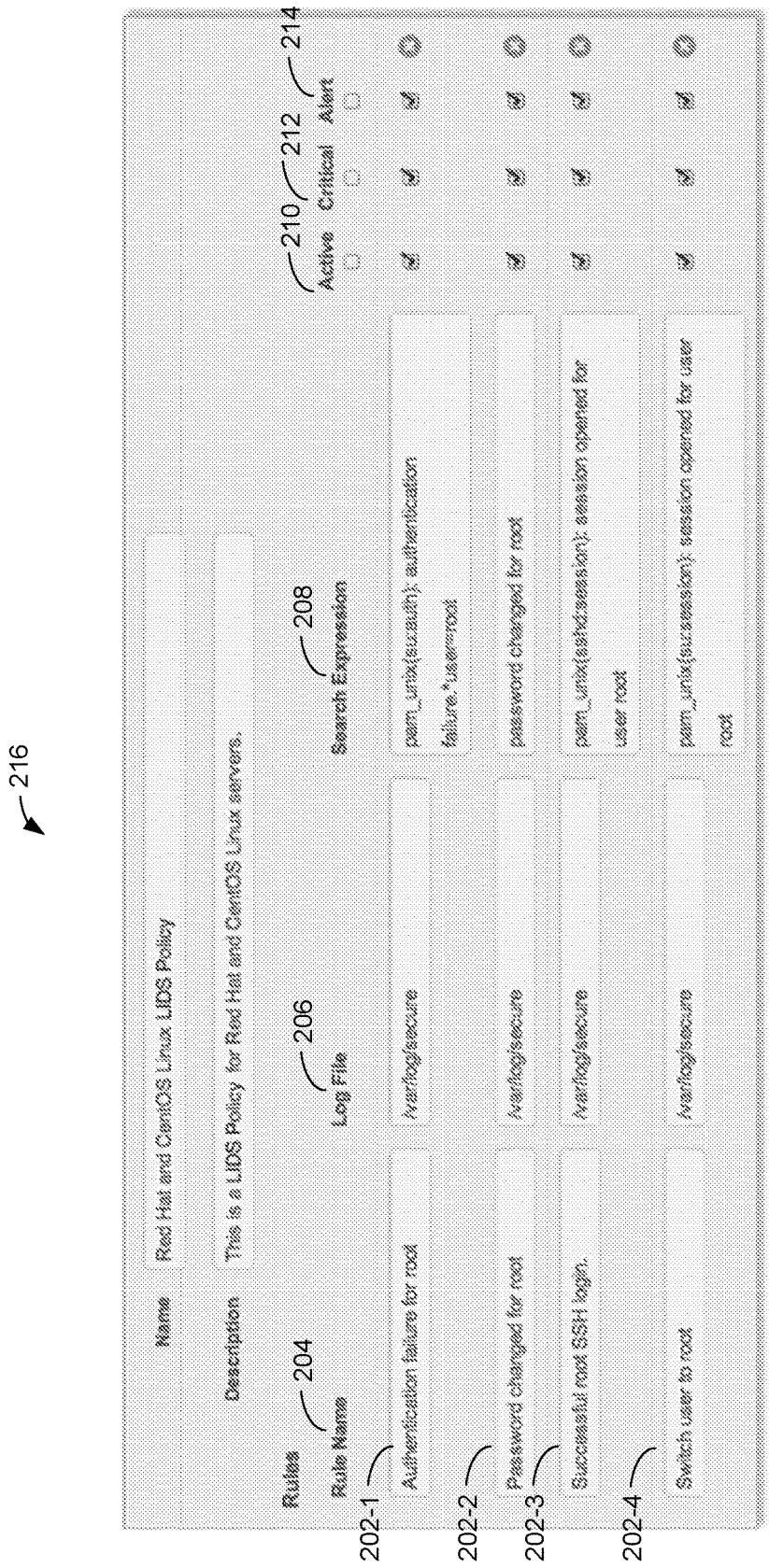
FIG. 2 illustrates a user interface panel for defining event log-based intrusion rules and a relationship between rules and alerts in accordance with one embodiment of the present disclosure.

FIG. 2 illustrates a user interface panel 216 for defining of four different event log-based intrusion rules in accordance with one embodiment and their relationship between rules and alerts. Panel 216 is typically provided by the grid computing system 200. In the embodiment illustrated in FIG. 2, each rule 202 includes a rule name 204, the name and location of the log file 206 that is to be scanned for the rule, and the search expression 208 to be searched. Of course, the exact nature of the search expression 208 will depend on the type of operating system 44 running on the remote computing asset 100, among other things. Furthermore, in the embodiment illustrated in FIG. 2, each rule 202 includes a first affordance (radio button, dial, check box, or other form of input field) 210 to specify whether the rule is active. When the rule 202 is active, the sweep results (the log file 206) is searched using the search expression 208 of the rule. Furthermore, each rule 202 includes a second affordance 212 to specify whether the rule is critical. Still further, each rule 202 includes a third affordance 210 to specify whether firing of the rule (identifying the search expression 208 in the log file 206) constitutes an alert or not.

FIG. 3 illustrates a graphical user interface 301 for defining a workflow 162 that is provided by a kill chain event monitoring system 1000 in some embodiments. In particular, the graphical user interface 301 provides fields for defining the trigger definition 164, the authorization token 166, and the enumerated countermeasure 168. Advantageously, the trigger definition 164 of a workflow 162 can be used to combine any number of events of any number of event types in any number of ways in order to create a trigger that is precisely tuned to a particular type of security breach.

In some embodiments, the trigger definition 164 includes only a single event. In such embodiments, the workflow 162 that includes this single event as a trigger is fired when the data collection monitoring module 158 obtains the event from the grid computer system 200 (e.g., in the one or more log files created by the grid computer system 200 upon analysis of sweep results 64 or through an application programming interface provided by the grid computer system 200).

More typically, the trigger definition 164 includes a plurality of event events, of one or more different event types, and each respective event type in the plurality of event types is associated with a variable that is set when the corresponding event type is discovered. For instance, in FIG. 3, each event 304 includes an alert event type (e.g., log-based intrusion detection) 306, a search string 308 to search to determine whether the event failed, and a variable name 310 to assign the results of the scan.

Moreover, events can be combined using a logical expression using, for instance, panel 302 of FIG. 3. For example, FIG. 4 illustrates eight Venn diagrams associated with eight possible ways to combine two events, A and B, in accordance with some embodiments. In each of the logical expressions of FIG. 4, the logical status of the trigger definition 164 is held by "C." For, example "C" is either TRUE (fire the workflow 162) or FALSE (hold the workflow 162 in abeyance until the trigger 164 is satisfied). The symbols $\wedge$, $\vee$, $\sim$, and $\leftrightarrow$ indicate "logical AND," "logical OR," "logical negation," and "logical equality," respectively in FIG. 4. Thus, in logic expression 1 of FIG. 4, C is True if and only if Alert A and Alert B are both True, for instance, the search expression of both Alert A and Alert B were found in the relevant log file or through API calls to the grid computer system 200. In logic expression 2 of FIG. 4, C is True if and only if Alert A and Alert B are both False. In logic expression 3 of FIG. 4, C is True if either Alert A is True or Alert B is True. In logic expression 4 of FIG. 4, C is True if and only if Alert A is False and Alert B is False. In logic expression 5 of FIG. 4, C is True if and only if Alert A is True and Alert B is False (or if and only if alert A is False and alert B is True). In logic expression 6 of FIG. 4, C is True if and only if Alert A is False or Alert B is True (or if and only if alert A is True and alert B is False. In logic expression 7 of FIG. 4, C is True if and only if one of Alert A and Alert B is True. In logic expression 8 of FIG. 4, C is True if and only if both Alert A and Alert B are True or both Alert A and Alert B are False. Of course, any number of alerts can be combined using any form of logic relationship, such as those of FIG. 4. For instance, as detailed in entry 302 of FIG. 3, the trigger definition 164 of the workflow 162 illustrated in FIG. 3 is fired when event 1004-1 ($a) and event 1004-2 ($b) are both True ($a && &b==true).

In some embodiments, a single workflow template 162 is active on a kill chain event monitoring system 1000. In some embodiments, two or more, three or more, a dozen or more, or hundreds of workflow templates 162 are active on a kill chain event monitoring system 1000. Further still, in some embodiments there are multiple kill chain event monitoring system 1000 in the topology of FIG. 1A.

When a match between the data collected at the one or more remote computing assets 100 and the trigger definition 164 of a corresponding workflow template is identified, an active threat is deemed to be identified. As discussed above, the data collected at the one or more remote computing assets 100 that is monitored for matching is acquired through the grid computer system 200, for instance, in various embodiments, in the form of log files, or specific retrieval of requested events, if they exist, through a grid computer system application programming interface 200. When an active threat is deemed to be identified through a given workflow template 162 by the match in the trigger definition, the authorization token 166 of the workflow template 162 is enacted. In some embodiments, the authorization token 166 is in fact a key or other form of identifier into an authorization procedure data store 170 which provides an index, based on the key or other form of identifier of authorization procedures. For instance, to illustrate in FIG. 1D, a given authorization token 172-1 is associated with a plurality of authorization contacts 174 and a set of authorization contact rules 176. In some alternative embodiments, an authorization procedure data store 170 is not present or is not used and the authorization procedure of a given authorization workflow template 162 is contained within the workflow template 162 as the authorization token 166 itself. Thus, in some embodiments the authorization token 166 contains the authorization procedure of the workflow template 162 and in some embodiment alternative embodiments the authorization token 166 serves as a reference into authorization procedure data store 170 to the relevant authorization procedure.

At a minimum, enacting an authorization token 166 of a corresponding workflow template 162 comprises obtaining authorization from a first authorization contact associated with the corresponding workflow template 162. This obtaining comprises pushing an alert regarding the corresponding workflow template 162 through a first established trust channel to a first remote device 1050 (FIG. 1A) associated with the first authorization contact without user intervention by the first authorization contact. The first remote device 1050 is other than the one or more remote computing assets 100. Further, in some embodiments, a first indication to proceed is received from the first authorization contact. In some embodiments, a first indication to proceed is not received from the first authorization contact and so the enumerated countermeasure 168 associated with the workflow template 162 is not undertaken. At a minimum, the enacting the authorization token 166 of a corresponding workflow template 162 further comprises obtaining authorization from a second authorization contact associated with the corresponding workflow template by pushing the alert regarding the corresponding workflow template 162 through a second established trust channel to a second remote device 1050 associated with the second authorization contact without user intervention by the second authorization contact. As illustrated in FIG. 1D, the second remote device is other than the one or more remote computing assets and the second remote device is other than the first remote device. Further, in some embodiments, a second indication to proceed is received from the second authorization contact. In some embodiments, a second indication to proceed is not received from the second authorization contact and so the enumerated countermeasure 168 associated with the workflow template 162 is not undertaken.

FIG. 3 illustrates how the authorization contacts for a given workflow template 162 are defined in some embodiments. A list of potential authorization contacts 320 is provided. A user selects authorization contacts by toggling the affordance 320 provided for each such authorization contact. For instance, in the illustrated workflow template 162 of FIG. 3, the authorization contacts Thomas Papaspiros and Loustinos Sarris have been selected while all other authorization contacts have not been selected. Moreover, for each authorization contact, contact information 324 is provided.

Figure 5:
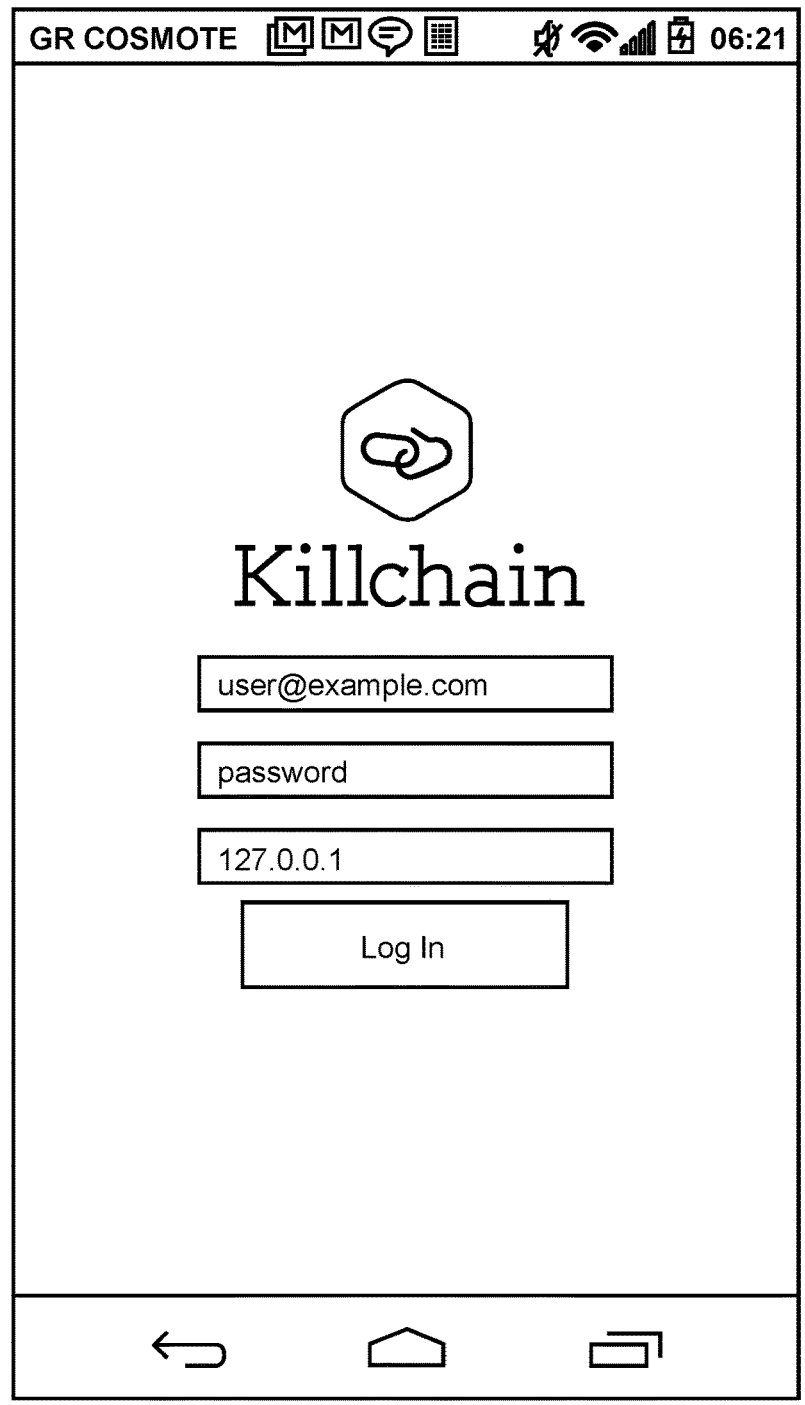
FIG. 5 illustrates a log in screen for application that runs on a device associated with an authorization contact in accordance with some embodiments.
Figure 6:
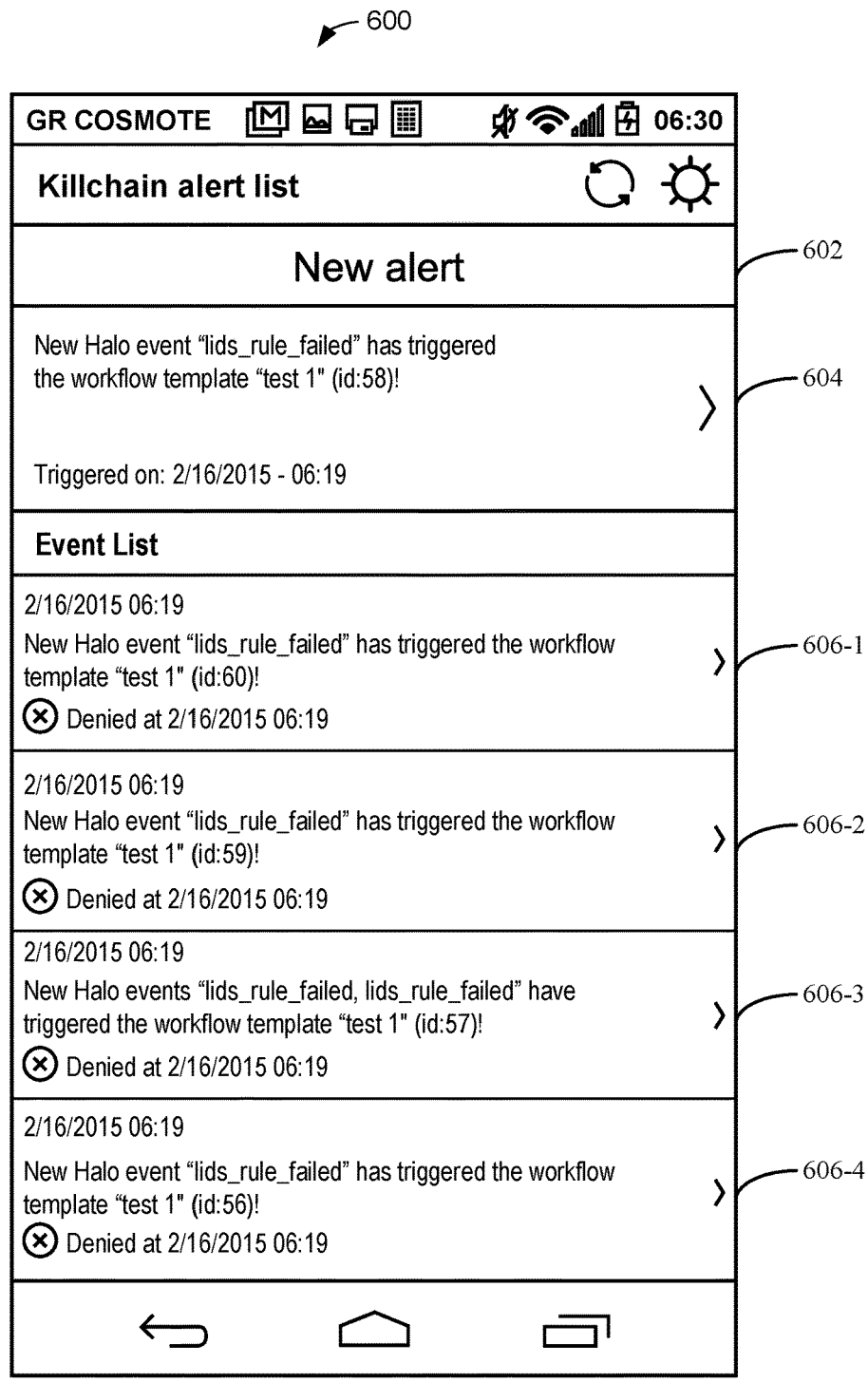
FIG. 6 illustrates a landing page (events finished and alerts page) for an application running on a device associated with an authorization contact once the authorization contact has successfully logged in, which presents alerts as well as the status of completed workflows in accordance with some embodiments.

FIG. 5 illustrates a log in screen for application that runs on a device 1050 associated with an authorization contact in accordance with some embodiments. Through this screen the authorization contact can log into a Kill chain application thereby establishing a trust channel to the kill chain event monitoring system. In some embodiments, the authorization contact must have been previously been added designated as an authorized user by the kill chain event monitoring system before being able to log in. The exemplary login screen of FIG. 5 requires the username and password of the authorization contact and an Internet Protocol address of the kill chain event monitoring system 1000. Upon logging into the application running on the device 1050, the user is presented with the landing screen 600 of FIG. 6, in some embodiments, which presents all pending triggered 604 workflows and all previously triggered and executed 606 workflows. As illustrated in FIG. 6, the details of the alerts that triggered each workflow are presented. For instance, executed workflow 606-1 specifies that the event "lids_rule_failed" thereby triggering workflow 606-1. As indicated in panel 600, this workflow was denied. Thus, panel 600 provides the authorization contact with the details of the executed enumerated countermeasure of the workflow template 162, if it was enacted), as well as a timeline of all things that happened (trigger, approvals or denials, execution of the countermeasure, etc.).

Figure 7:
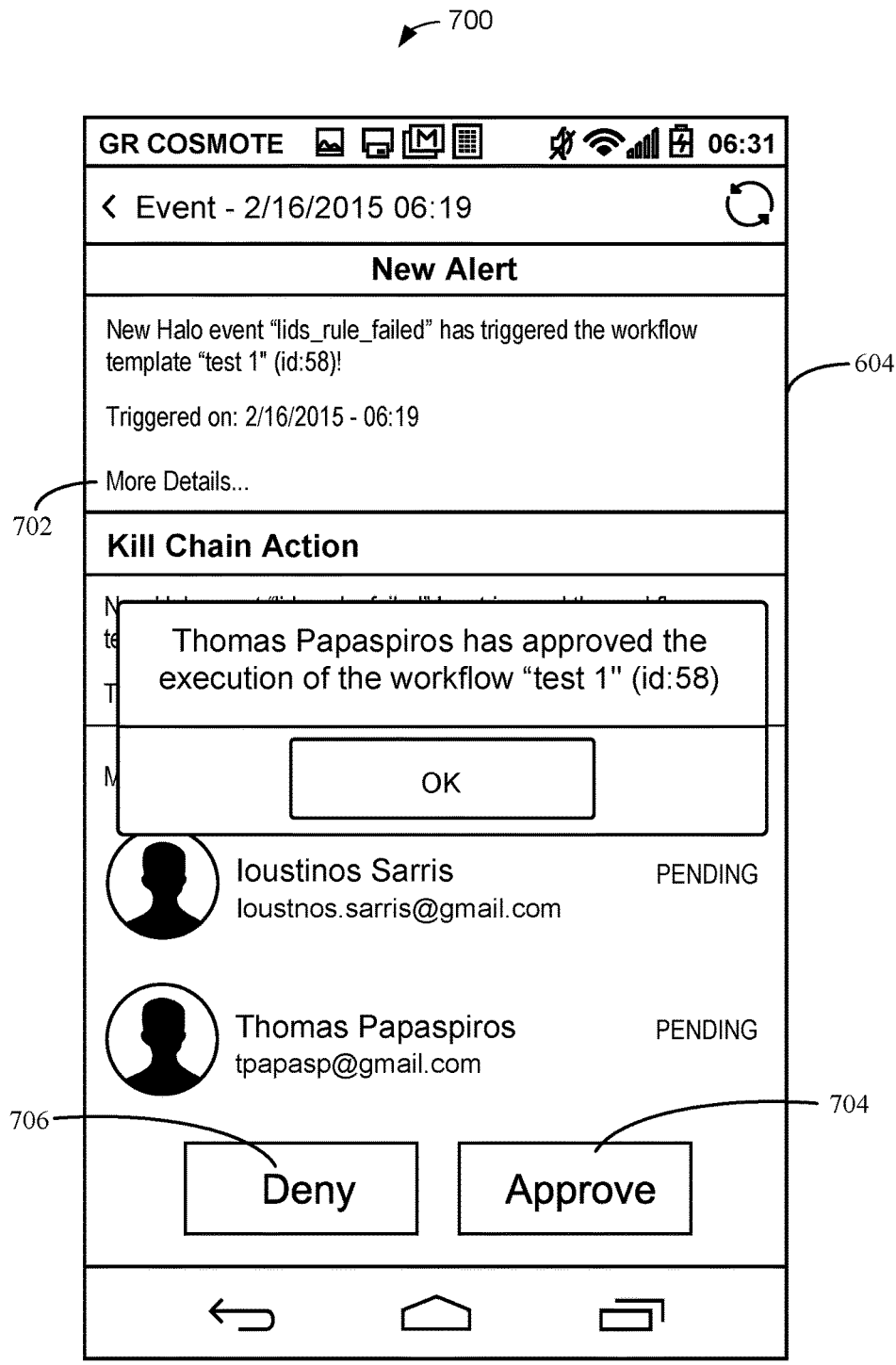
FIG. 7 illustrates an events pending page for an application running on a device associated with an authorization contact, which presents all pending triggered workflows and their present authorization status in accordance with some embodiments.

As illustrated in FIG. 6, when the workflow 162 illustrated in FIG. 3 is fired, an alert 602 regarding the pending triggered workflow template 162 is pushed through an established trust channel from the kill chain event monitoring system 1000 to the device 1050 associated with the authorization contact (e.g., Thomas Papaspiros) without user intervention by Thomas and is presented as alert 602 and pending triggered workflow 604 in panel 600. By selecting the representation of the pending triggered 604 workflow (the alert) in panel 600, the authorized user (here Thomas Papaspiros) is taken to the events pending screen 700 of FIG. 7.

The events pending screen 700 provides information on the alert 604 regarding the triggered workflow template 162 with the option for more details 702. The events pending screen 700 gives the authorization contact the option to approve 704 or deny 706 the workflow template 162 that triggered the alert 604. When each of the authorization contacts specified for the triggered workflow template 162, approve the alert associated with the triggered workflow template 162, the enumerated countermeasure 168 associated with the triggered workflow template 162 is fired, as illustrated in panel 800 of FIG. 8.

Figure 8:
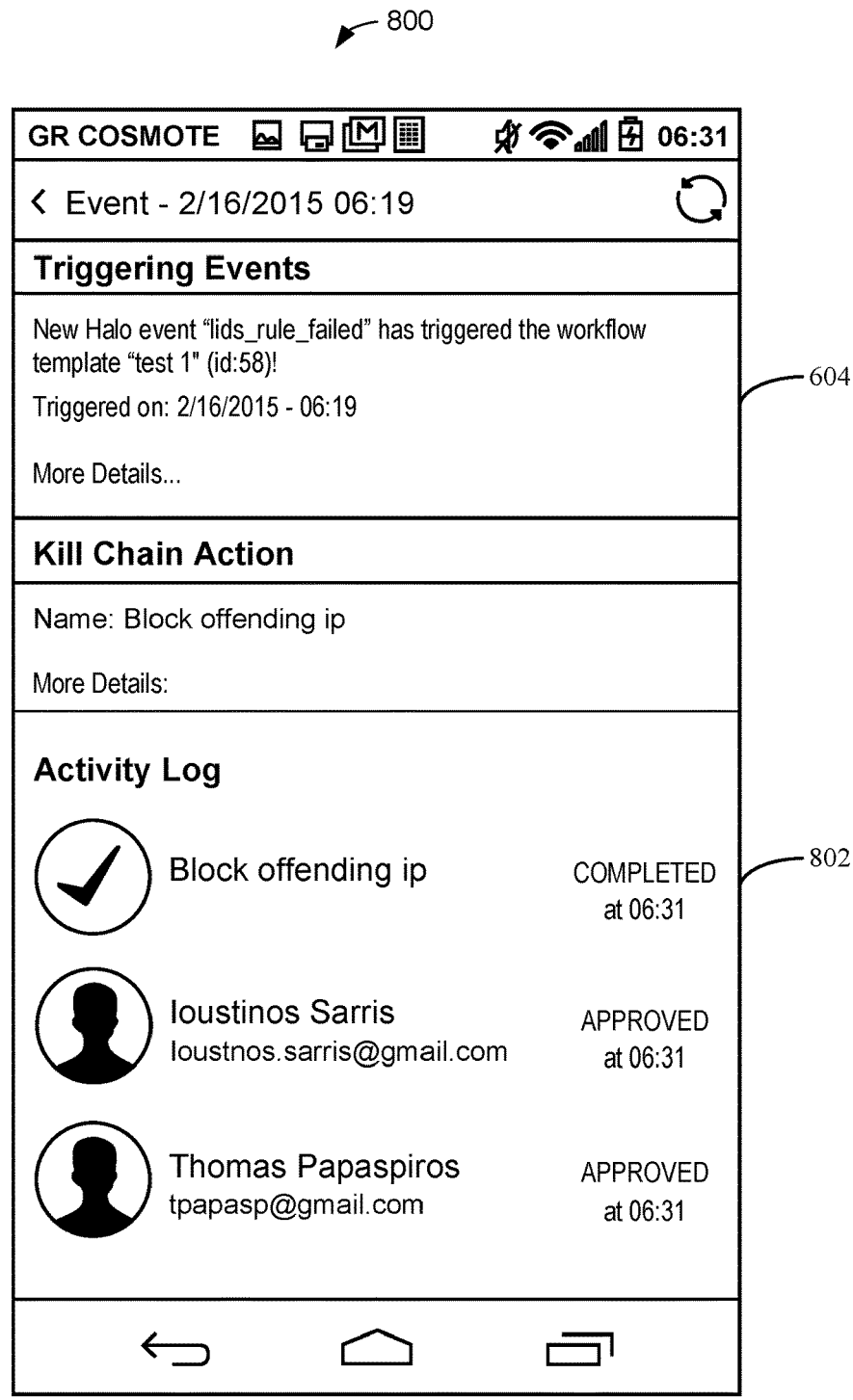
FIG. 8 illustrates an events completed page for an application running on a device associated with an authorization contact, which presents all completed events in accordance with some embodiments.

As illustrated in FIG. 8, the enumerated countermeasure associated with the triggered workflow template 162 was to block an offending IP address, and this is duly reported as notification 802 in panel 800 to the authorization contact. More generally, referring to FIG. 1D, in some embodiments, the enumerated countermeasure 168 associated with a workflow template 162 comprises an action that is designed to target the threat vector that the workflow template 162 is designed to protect against. Moreover, in some embodiments the enumerated countermeasure 168 associated with a workflow template 162 comprises a plurality of actions, with each respective action in the plurality of actions designed to target a different component of the threat vector that the workflow template 162 is designed to protect against. In some embodiments, the enumerated countermeasure 168 restricts a port in a remote computing asset 100.

In some embodiments, the enumerated countermeasure 168 is a technical control set. In some such embodiments, the technical control set comprises closing a port on a device in the one or more remote computing assets, deleting an account on a computing asset 100 in the one or more remote computing assets, terminating a process on a remote computing asset in the one or more remote computing assets, altering a priority level of a process on a computing asset in the one or more remote computing assets, communicating incorrect data to an interne address associated with a active threat that triggered the corresponding workflow template 162, shutting down a remote computing asset 100 in the one or more remote computing assets, or blocking traffic originating from an IP address associated with the active threat from accessing the one or more remote computing assets.

Figure 9:
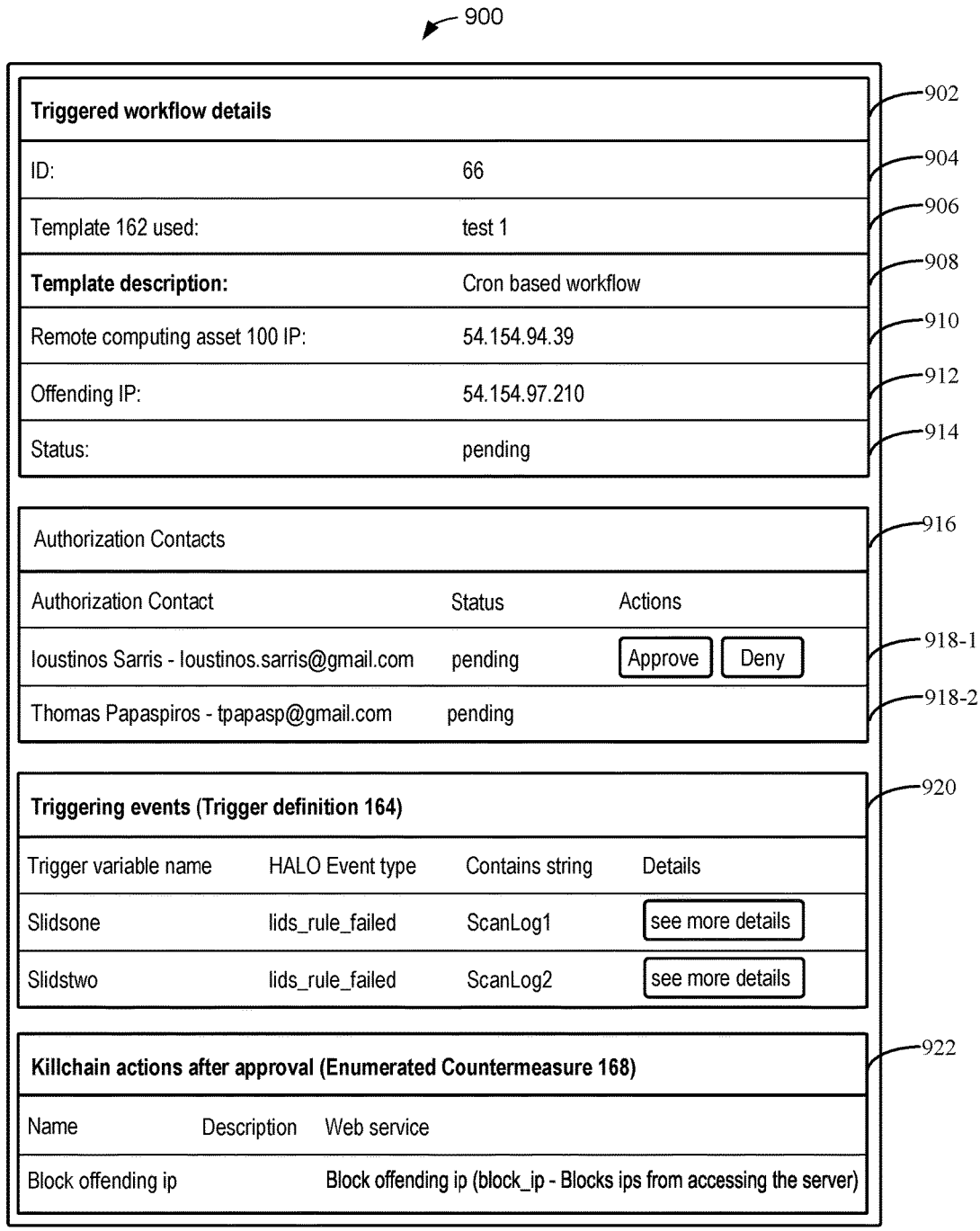
FIG. 9 illustrates an exemplary administration panel of a kill chain monitoring system through which users can see the details of a triggered workflow in accordance with some embodiments.

Panel 900 of FIG. 9 illustrates an exemplary administration panel 900 of the kill chain monitoring system 1000 through which users can see the details 902 of a triggered workflow, including an identifier 904 for the triggered workflow, the name 906 of the workflow template 162 used by the triggered workflow, a description 908 of the triggered workflow, the IP address 910 of the remote computing asset 100 that triggered the workflow, the IP address 914 of the offending device (threat vector) that is the source of the attack on the remote computing asset 100, and the current status 914 of the triggered workflow in accordance with some embodiments. Further, the list 916 of authorized contacts 918 for the triggered workflow are given, including for each authorized contact 918, the approval status of the authorization contact, and what possible actions (e.g., approve, deny, etc.) the authorization contacts can make. Panel 900 further provides details 922 of the enumerated countermeasure 168 of the triggered workflow.

Figure 10:
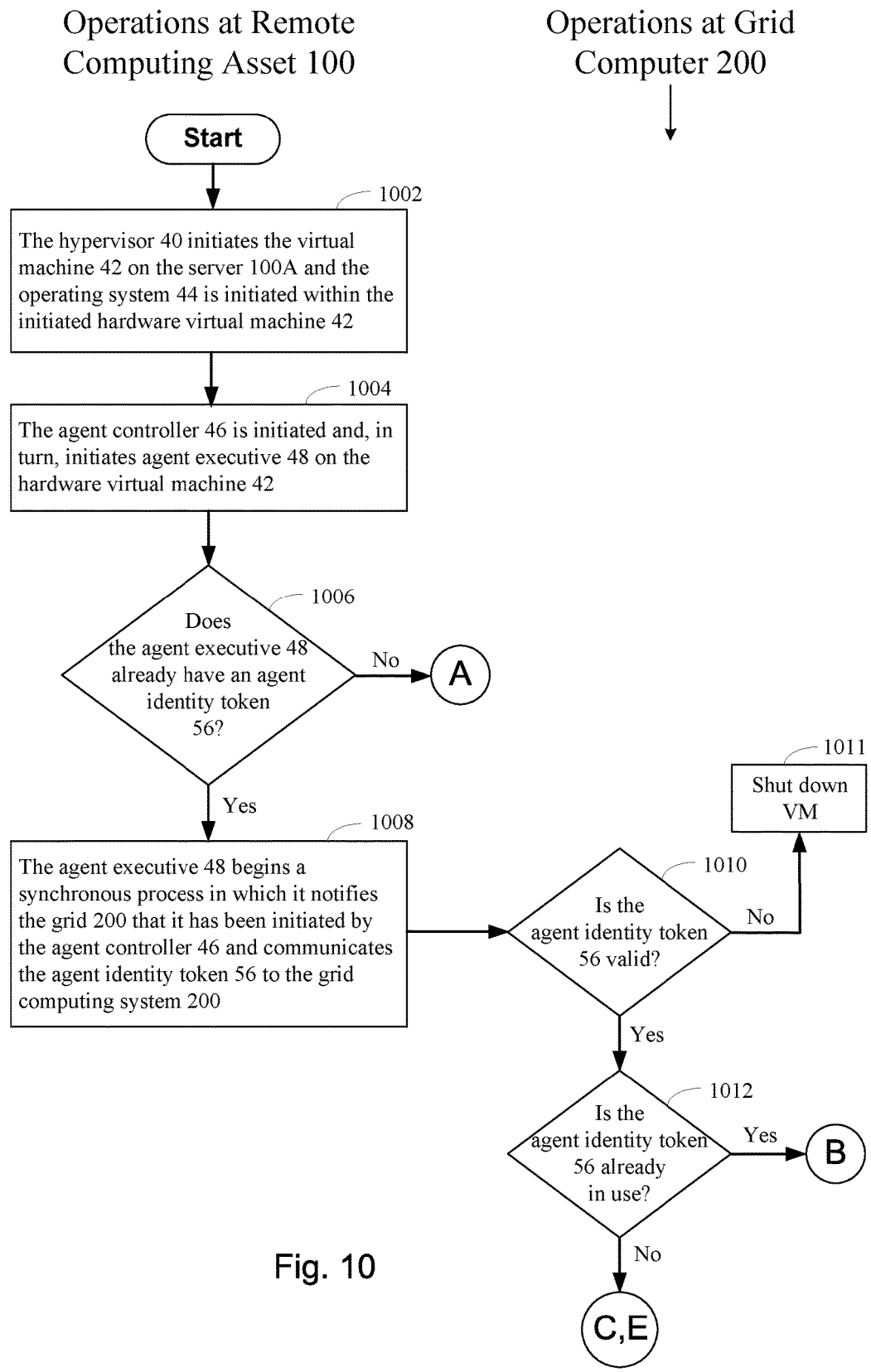
FIG. 10 illustrates the initiation of a hypervisor, agent controller, and agent executive, in accordance with an embodiment of the present disclosure in which the agent executive may or may not have an agent identity token.

Now that details of a kill chain monitoring system 1000 have been disclosed, details regarding the initiation of a hypervisor 40, agent controller 46, and agent executive 48 on a remote computing asset 100, in accordance with an embodiment of the present disclosure are disclosed with reference to FIG. 10. It will be appreciated that the disclosed systems and methods for kill chain event monitoring do not impose a requirement on the remote computing assets that they implement a hypervisor 40, an agent controller 46, agent executive 48, or virtual machines 42. As such, FIG. 10 is simply directed to one embodiment in which a remote computing asset 100 does implement such constructs.

Block 1002.

In block 1002, the hypervisor 40 initiates a virtual machine 42 on the remote computing asset 100 and an operating system 44 is initiated within the initiated virtual machine 42. The hypervisor 40, also called a virtual machine manager (VMM), is any one of many hardware virtualization techniques that allow multiple operating systems 44 to run concurrently on the remote computing asset 100. The hypervisor 40 presents to each of the guest operating systems 44 a virtual operating platform and manages the execution of such operating systems. Multiple instances of a variety of operating systems 44 may share the virtualized hardware resources. Commercial embodiments of the hypervisor 40 include, but are not limited to, OPENSTACK, EUCALYPTUS, VMWARE ESXI, CITRIX XENSERVER, MICROSOFT HYPER-V HYPERVISOR, SUN'S LOGICAL DOMAINS HYPERVISOR, and HP's INTEGRITY VIRTUAL MACHINES. Examples of operating systems 44 include, but are not limited to UNIX, OPEN VMS, LINUX, and MICROSOFT WINDOWS.

Block 1004.

Once the operating system 44 is running on a virtual machine 42, an agent controller 46 is initiated. The agent controller's primary responsibility is to ensure that an agent executive 48 is running on the virtual machine 42 at all times. Thus, in block 1004, the agent controller 46 initiates the agent executive 48 on the hardware virtual machine 42.

Block 1006.

In block 1006, a determination is made by the agent executive 48 as to whether it already has an agent identity token 56 assigned to it. In some instances, an agent executive 48 may already have an agent identity token assigned to it if the virtual machine 42 corresponding to the agent executive 48 had been running before and had stopped running, because of a power outage or computer hardware failure for example, but is now once again running. In some instances, an agent executive 48 already has an agent identity token 56 assigned to it when the virtual machine 42 corresponding to the agent executive 48 is a cloned copy of another virtual machine 42 that is also running. If the agent executive 48 does not have agent identity token 56 (1006—No), then process control passes to block 1102 of FIG. 11A, which describes how an API key is obtained. If the agent executive 48 does have an agent identity token 56 (1006—Yes), then process control passes to block 1008.

Block 1008.

In block 1008, the agent executive 48 begins a synchronous process in which it notifies the grid computer system 200 that the agent executive 48 has been initiated by the agent controller 46. Further, as part of this synchronous process, the agent executive 48 communicates the agent identity token 56 to the grid computing system 200.

Block 1010.

In block 1010, the grid computer system 200 receives the agent identity token 56 from the remote computing asset 100 and determines whether it is valid. This is done by checking the agent identity token 56 against a list of such tokens that is maintained by the grid computer system 200 in memory 114 and/or memory 120 or that is otherwise accessible to the grid computer system 200. If validation is successful in block 1010 (1010—Yes), process control passes to block 1012. If validation is not successful in block 1010 (1010—No), the agent executive 48 is notified of this failure and process control passes to block 1011.

Block 1011.

In block 1011, a synchronous instruction is sent from the grid computer system 200 to the agent executive 48 to shut it down. Optionally, an alert is sent to the user of the remote computing asset 100 to advise that there was an attempt to utilize an invalid agent identity token 56.

Block 1012.

Block 1012 is reached when the agent executive 48 is operating with a valid agent identity token 56. Block 1012 accommodates cloud bursting in which multiple virtual machines 42, termed children virtual machines, are concurrently executed, where each such child virtual machine 42 is based upon a common parent virtual machine 42 that may still be executing or that may be an inactive virtual machine image upon which agent executive 48 has been previously installed and configured. Such cloud bursting processes have the benefit of providing dynamic servicing of loads that vary in computational intensity over time. For instance, in some embodiments, the parent virtual machine 42 hosts one or more retail modules (not shown in FIG. 1A or 1B) that service retail transactions over the Internet. During times of peak demand, such as for sales or during the holidays, the demand on the one or more retail modules increases. To service such demand, multiple children virtual machines 42 may each be generated based on the already implemented parent virtual machine 42. In such instances, each child virtual machine 42 will initially have the same agent identity token 56. In order to uniquely identify and provide adequate security to each of the child virtual machines 42, each such child virtual machine 42 is provided with new a unique agent identity token 56. Thus, if a determination is made that agent identity token 56-1 is a duplicate of an already active agent identity token (one that is being used by an another activated agent executive 48) (1012—Yes), then process control passes to block 1120 of FIG. 11B. If a determination is made that agent identity token 56-1 is not a duplicate of an already active agent identity token (1012—No), then the determination is made that this executive agent 48 is associated with a previously deactivated virtual machine 42 that has been re-activated and process control passes either to block 1209 (FIG. 12C) in order to self-verify the virtual machine 42 or, if the agent executive of the virtual machine is already validated, to step 1302 (FIG. 13) to begin a sweep.

Processes by which an Agent Executive can Acquire a Unique Agent Identity Token in Accordance with the Present Disclosure.

Figure 11A:
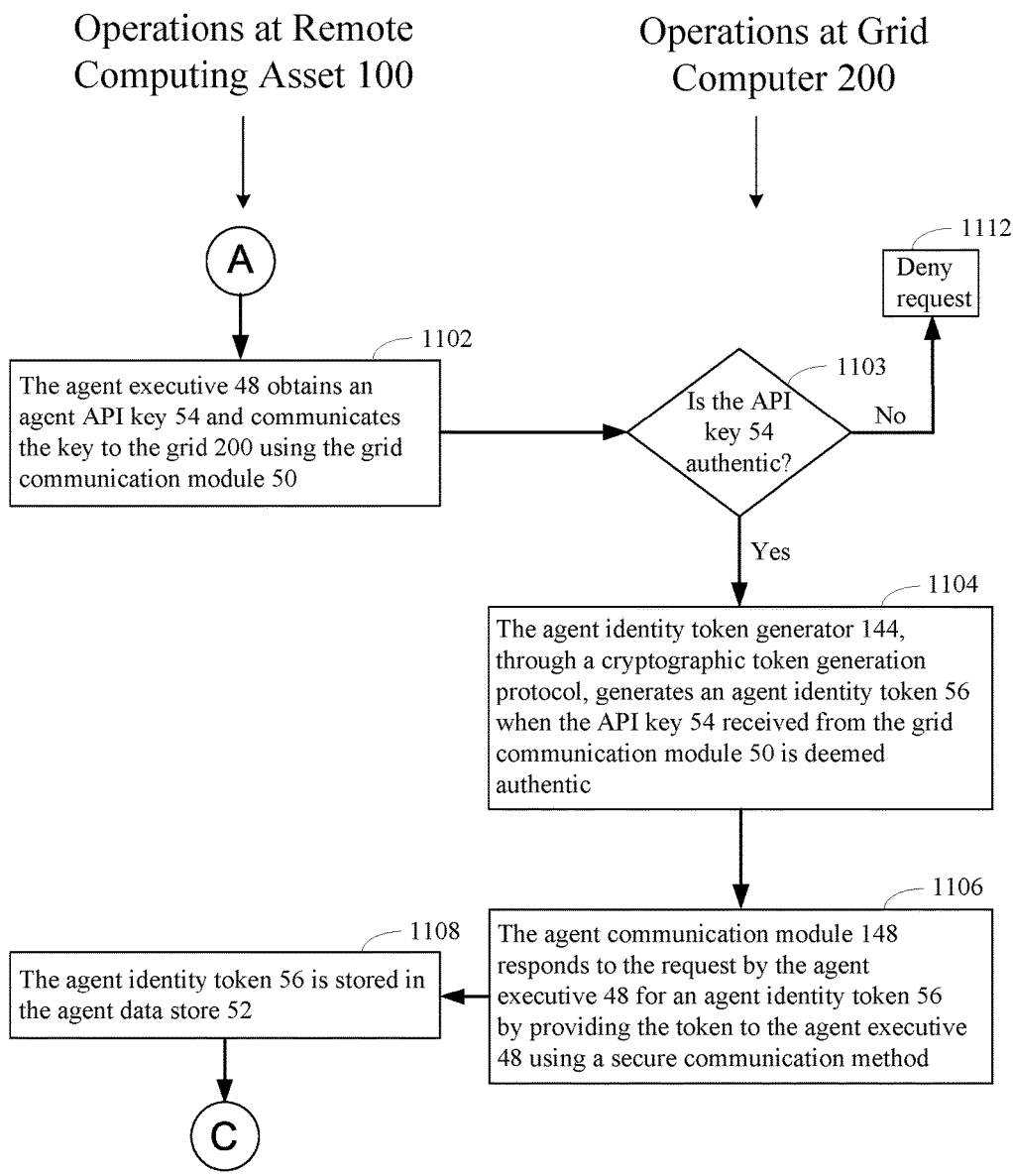
FIG. 11A and FIG. 11B illustrate processes by which an agent executive can acquire a unique agent identity token in accordance with the present disclosure.
Figure 11B:
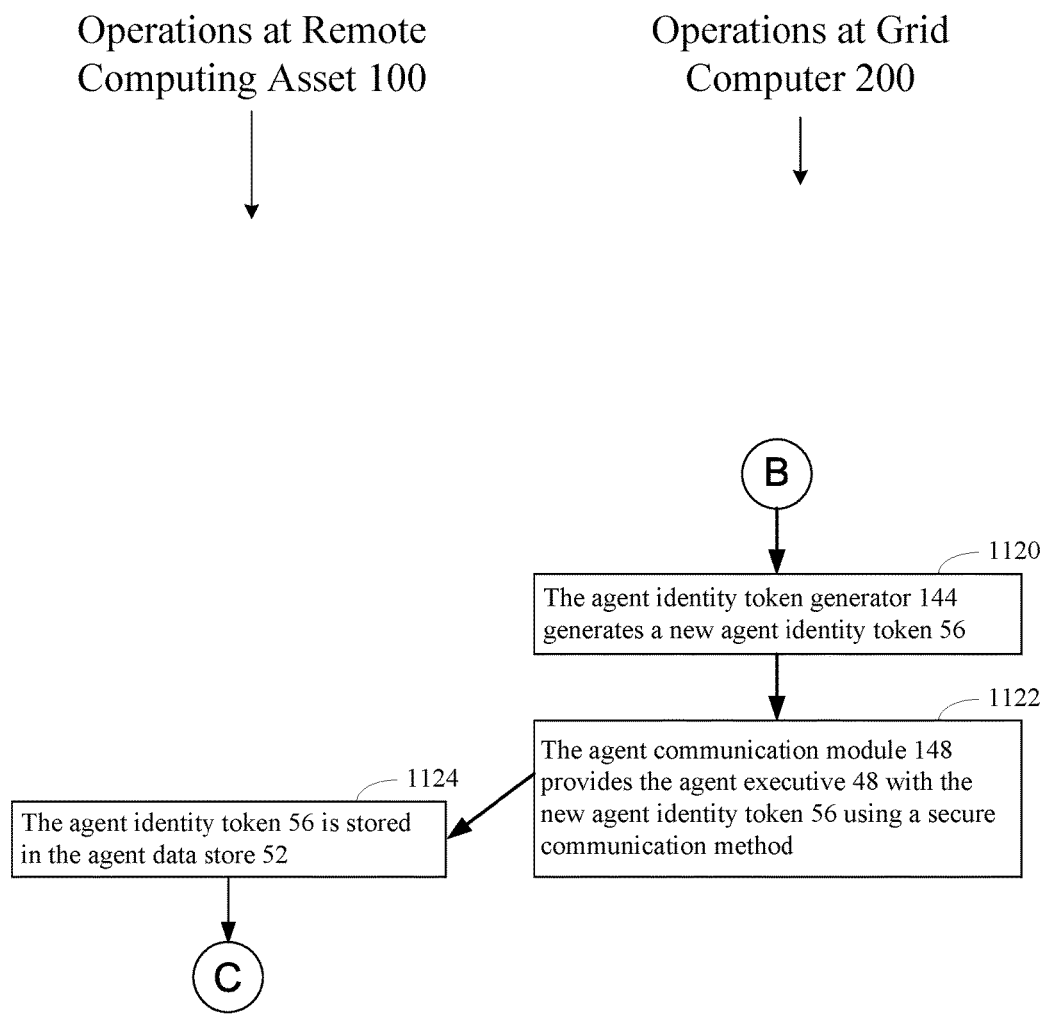

FIG. 11 illustrates processes by which agent identity tokens 56 are generated in accordance with the present disclosure. A first process, exemplified by blocks 1102 through 1108 in FIG. 11A, is used when an agent executive 48 does not have an agent identity token 56 (1006—No). A second process, exemplified by blocks 1120 through 1124 in FIG. 11B, is used when a first agent executive 48 has an agent identity token 56 but the agent identity token is already being used by an active virtual machine 42 that was initiated before the virtual machine 42 associated with the first agent executive 48 was executed (1012—Yes).

Block 1102.

Agent executive 48 does not have an agent identity token 56 when initiated for the first time on a virtual machine 42 to ensure security of the virtual machine 42. If block 1102 is reached, this means that the agent executive 48 does not have an agent identity token 56. In block 1102, the agent executive 48 obtains an agent API key. In some embodiments, the agent executive 48 challenges a user for an API key. In typical practice, the user provides the API key manually or via a user-provided script when the agent executive 48 is started for the first time. Regardless of how the API key is obtained it is communicated to the grid computer system 200 using the grid communication module 50 and process control passes to block 303.

Block 1103.

In block 1103, a determination is made as to whether the API key is authentic. If so (1103—Yes), process control passes to block 304. If not (1103—No), process control passes to block 1112 where the request for an agent identity token 56 is denied. The user is notified of this failure.

Block 1104.

In block 1104, an agent identity token generator 144 (also known as the token generation module) operating on the grid computer system 200 generates, through a cryptographic token generation protocol, an agent identity token 56 when the API key received from the grid communication module 50 in block 1102 is deemed valid. Any one of a number of cryptographic token generation protocols may be used to generate the agent identity token 56 from the API key. In some embodiments, the token 56 includes a cryptographic key and/or information that will be used as shared knowledge 62.

Block 1106.

In block 1106, the agent communication module 148 responds to the request by the agent executive 48 for an agent identity token 56 by providing the token to the agent executive 48 using a secure communication method.

Block 1108.

In block 1108, the agent identity token 56 is stored in the agent data store 52 and process control passes to block 1209.

Block 1120.

Block 1120 begins another process by which a first agent executive 48 may acquire an agent identity token 56. Block 1120 is reached in those instances where the first agent executive 48 actually has a valid agent identity token 56, but the agent identity token 56 is already being used by a second active agent executive 48 of a second virtual machine 42 (parent virtual machine) that was initiated at an earlier date than the first virtual machine (1012—Yes) (child virtual machine). In such instances, a new agent identity token 56 is generated for the child virtual machine through a cryptographic token generation protocol.

Block 1122.

In block 1122, the agent communication module 148 responds to the request by the agent executive 48 for an agent identity token 56 by providing the token to the agent executive 48 using a secure communication method such as the methods disclosed in the section entitled "Message Security Protocol" below.

Block 1124.

In block 1124, the agent identity token 56 is stored in the agent data store 52 for later use and process control passes to block 1209. In some embodiments, agent identity token 56 is stored in a persistent data store (e.g., agent data store 52) maintained by agent executive 48. In some embodiments, this persistent data store is encrypted at all times using the Advanced Encryption Standard (AES) in Cipher Block Chaining (CBC) mode utilizing a 256-bit key length as described in Federal Information Processing Standards (FIPS) Publication 197, Nov. 26, 2001. In such embodiments, the key and initialization vector required by the agent executive 48 to access encrypted information in the persistent data store, including but not limited to the agent identity token 56, is calculated using multiple data values some based on shared knowledge 62 and some dynamically generated on a one-time basis, that are provided by the remote grid computer 200. This calculation involves agent executive 48 invocation of one of a plurality of possible dynamic key generation protocols, a non-limiting example of which is the Dynamic Symmetric Key Provisioning Protocol (DSKPP) (http://tools.ietf.org/search/rfc6063), which is hereby incorporated by reference in its entirety.

Message Security Protocol.

The processes illustrated in FIG. 11B provide methods for securing an agent identity token 56 in agent data store 52. As discussed in further detail below, FIGS. 12A-12D illustrate exemplary processes directed to verifying the integrity of virtual machine 42 and performing services for virtual machines 42 (e.g., imposition of a firewall) that require assignment of a unique agent identity token 56 to the virtual machine 42. These exemplary processes further require communication to take place between the agent executive 48 and the grid computer system 200. It is desirable that such communications take place in a manner that provides for message confidentiality and integrity. Further, it is desirable that the agent executive 48 and remote grid computer 200 be mutually able to authenticate the source of a message for the purposes of identification and authorization. To accomplish this, a secure messaging protocol is used in some embodiments. This secure messaging protocol, in combination with an agent executive self-verification process described below in conjunction with FIGS. 12A-12D, and the use of unique agent identity tokens 56, satisfy the need for the agent executive 48 to be able to securely operate and communicate with the remote computing asset 100 in a relatively untrusted and/or uncontrolled environment, including the transmission of messages across untrusted and/or uncontrolled network environments.

In some embodiments, after agent executive 48 initialization, any message of any type that is generated by the grid computer system 200 to send to the agent executive 48, or by an agent executive 48 to send to the grid computer system 200, is protected from unauthorized disclosure, corruption, replay or spoofing using the disclosed message security protocol.

As described in further detail below, the sender of a message assures message authenticity and integrity by utilizing a hash-based message authentication code (HMAC) functionality, in combination with dynamically generated key based on shared secret knowledge between the sender and receiver, to generate a keyed message digest of the message payload. This digest is added to the original message payload, which is then encrypted utilizing the message confidentiality functionality described below, utilizing a dynamically generated key based on shared secret knowledge between the sender and receiver.

The resulting ciphertext is transmitted to the receiver using a mutually authenticated, encrypted network tunnel. In some embodiments, this transmission is secured using an SSL/TLS protocol. TLS and SSL encrypt the segments of network connections above the transport layer using asymmetric cryptography for transmission confidentiality and a keyed message authentication code for transmission integrity and reliability (see RFC 5246 or http://en.wikipedia.org/wiki/Transport_Layer_Security, which is hereby incorporated by reference in its entirety).

The receiver of the message first decrypts the ciphertext after re-creating the symmetric encryption key based on shared secret knowledge between the sender and receiver. If the sender asserted as part of the transmission metadata did not actually send the message, then the shared secret knowledge will be incorrect and the ciphertext will not be successfully decrypted into a meaningful data structure. In such cases the message will be ignored and the receiver may take actions including triggering mechanisms to generate an alert to a possible attempt to compromise security. If the ciphertext is successfully decrypted, the receiver then attempts to further verify authenticity and integrity of the message by re-generating the asserted HMAC message digest included with the message using a key re-generated based on shared secret knowledge between the sender and receiver. The message digest generated by the receiver will not match the asserted message digest and the message will be considered inauthentic and/or corrupted by the receiver if the sender asserted as part of the transmission metadata did not actually generate the HMAC message digest of the message, or if the message has been changed in any fashion since generation of the HMAC digest. In such cases, the message will be ignored and the receiver may take actions including triggering mechanisms to generate an alert to a possible attempt to compromise security. If the decipherment and message authentication/integrity checks are both successful, the receiver will process the message.

Message Authenticity and Integrity.

In order to ensure the authenticity and integrity of such communications, one of a plurality of possible hash-based message authentication code (HMAC) functions is used (see, for example, IETF RFC 2104, "HMAC: Keyed-Hashing for Message Authentication"). These HMAC functions utilize one or more secure hashing algorithms such as SHA-224, SHA-256, SHA-384, or SHA-512, as defined more fully in Federal Information Processing Standards Publication 180-3 ("Secure Hash Standard (SHS)"), October 2008. In this messaging security protocol functionality, secret key material used to implement the HMAC is derived by means of a dynamic key generation algorithm mutually known to both the agent executive 48/grid communication module 50 and the remote grid computer system 200. Such key generation utilizes a plurality of encryption, hashing and randomization protocols, non-limiting examples of which include AES-256-CBC, the SHA-224 hashing algorithm, and/or the SHA-256 hashing algorithm. In some embodiments, such algorithms are combined into a multi-pass protocol that use as inputs key materials and/or initialization vectors generated from shared knowledge 62 between the grid communication module 50 and the remote grid computer system 200 and values derived from pseudo-random number generation protocols. This algorithm generates secret key material of preferable length no less than 1024 bits, implementing a cryptographic keyspace of a size making it computationally infeasible to check each possible key by brute force. Prior to encryption, this secret key material is used as input to one of a plurality of HMAC implementations such as HMAC-SHA-224, HMAC-SHA-256, HMAC-SHA-384, or HMAC-SHA-512 (see FIPS 180-3). The effect of this combination of cryptographic techniques is implementation of a keyed message digest universally unique to each individual message, with the keyed message digest ensuring that a message may be authenticated and verified for integrity only by the grid computer system 200 and the individual, universally unique agent executive 48/grid communication module 50 that generated a message or for which a message was intended.

Message Confidentiality.

In some embodiments, confidentiality of messages shared between the agent executive 48 and the remote grid computer 200 is assured utilizing encryption of message payload with AES in CBC mode utilizing a 256-bit key length. The symmetric key used for encryption is derived by means of a dynamic key generation algorithm mutually known to both the agent executive 48 and the remote grid computer system 200. This key generation algorithm utilizes one of a plurality of encryption, hashing and randomization protocols, non-limiting examples of which include AES-256-CBC, the SHA-224 hashing algorithm, and the SHA-256 hashing algorithm. In some embodiments, these algorithms are combined into a multi-pass protocol that use as inputs key materials and/or initialization vectors generated from shared knowledge 62 between the agent executive 48 and the remote grid computer system 200, values derived from pseudo-random number generation protocols, and the agent identity token 56. This algorithm generates secret key material of length preferably no less than 1024 bits, implementing a cryptographic keyspace of a size making it computationally infeasible to check each possible key by brute force. The effect of this combination of cryptographic techniques is implementation of a message confidentiality system in which neither cryptographic key materials nor message payloads are transmitted through or stored within non-controlled, non-secure environments as cleartext, and message delivery in the form of ciphertext that may be decrypted into meaningful and usable cleartext only by the grid computer system 200 and the individual, universally unique agent executive 48 that generated a message or for which a message was intended.

Process for Verifying the Integrity of an Agent Executive 48 Using a Grid Computer System 200.

FIGS. 12A-12D illustrate processes by which the integrity of an agent executive 48 can be verified using a grid computer system 200 in accordance with the present disclosure once the agent executive 48 has a valid agent identity token 56.

Figure 12A:
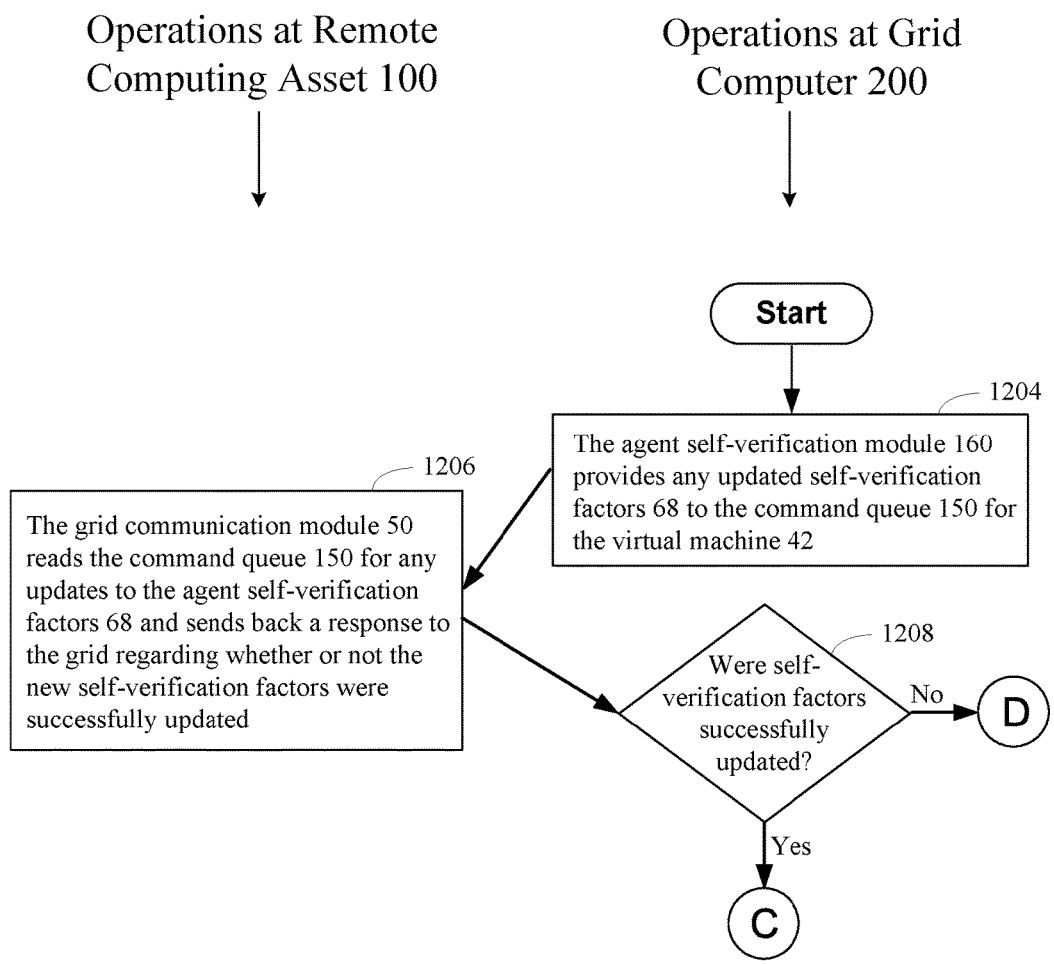
FIG. 12A, FIG. 12B, FIG. 12C, and FIG. 12D illustrate a method in which the integrity of an agent executive can be verified using a grid computer system in accordance with the present disclosure.
Figure 12B:
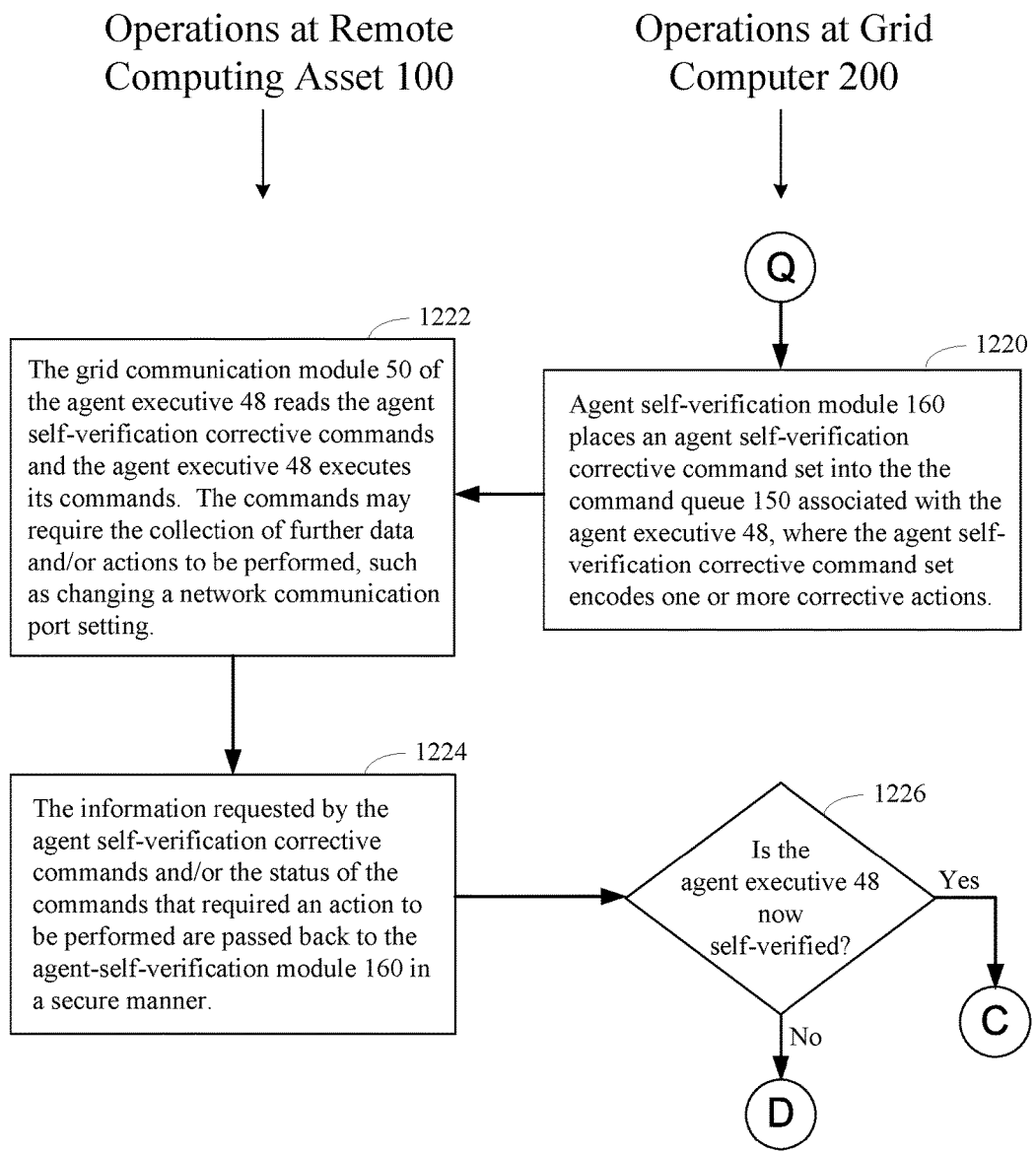
Figure 12C:
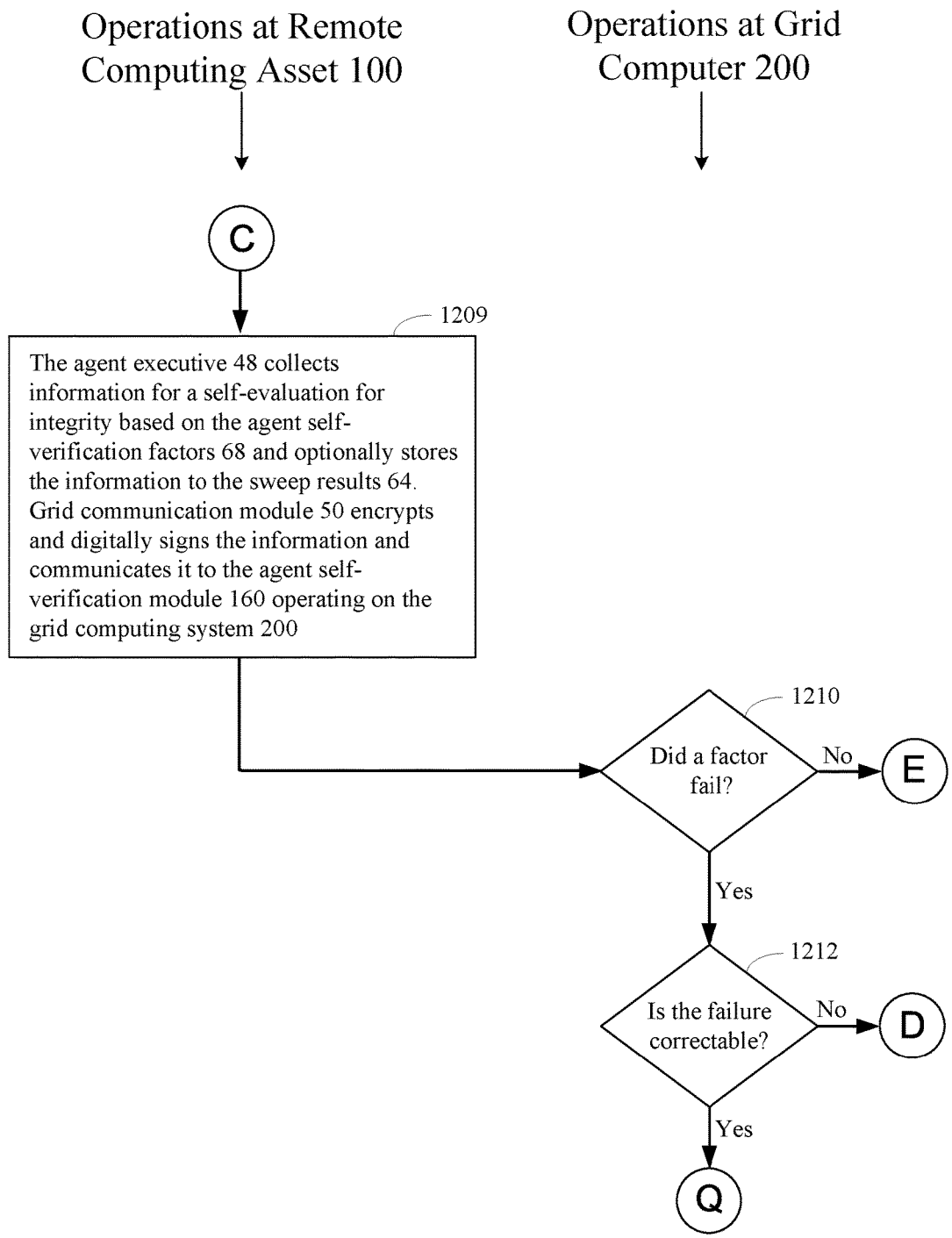
Figure 12D:
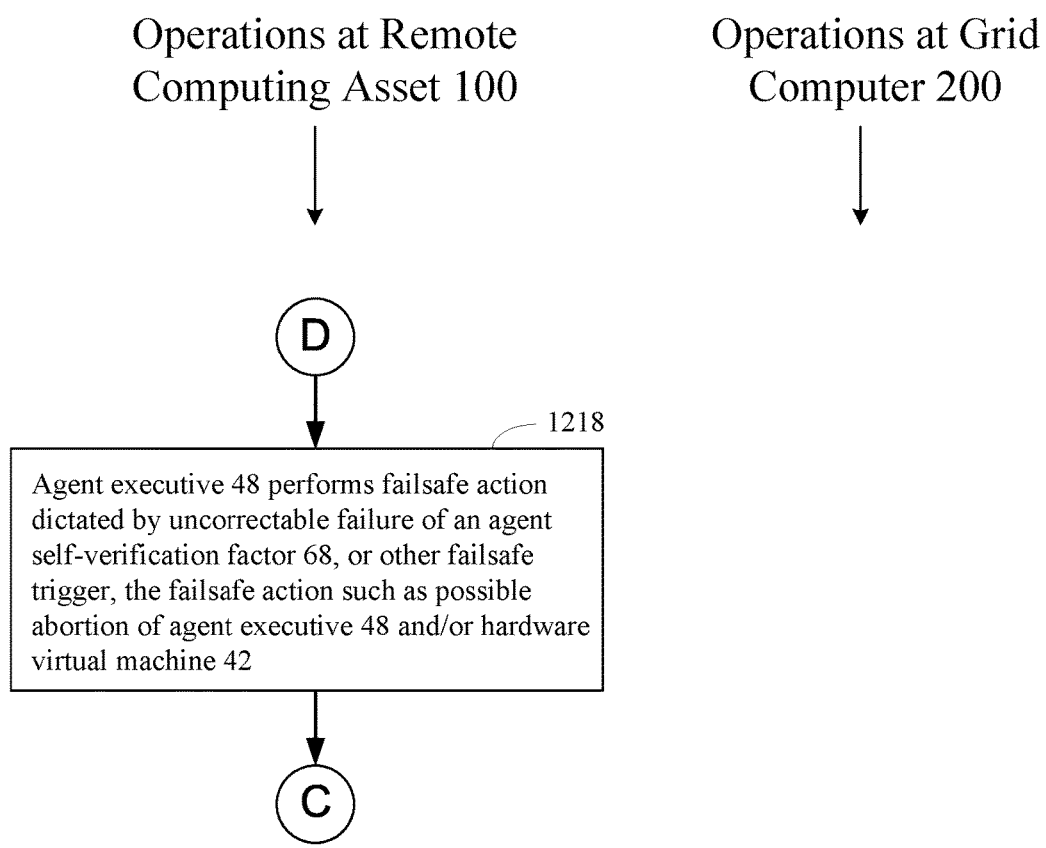

What is depicted in FIGS. 12A, 12C, and 12D are two separate processes that run independent of each other. The first process, blocks 1204 through 1208, serves to update self-verification factors 68 in the virtual machine 42 affected by a policy. Thus, the processes in FIGS. 12A, 12C, and 12D are executed, for each virtual machine 42 affected by agent self-verification factors 68, whenever a grid computer system 200 administrator changes such self-verification factors 68. Typically, such self-verification factors 68 form part of a policy that encompasses one or more virtual machines 42. In such instances, when the grid computer system 200 administrator changes self-verification factors 68 within such a policy, the process depicted by blocks 1204 through 1208 is run for each virtual machine 42 affected by the policy.

Block 1204.

In block 1204 the agent self-verification module 152 operating on the grid computer system 200 provides any updated self-verification factors 68 to the command queue 150 for the virtual machine 42. The posting of such factors to the command queue 150 for the virtual machine 42 is advantageous because, for security purposes, the agent executive 48 cannot accept a network connection from any device or process, regardless of whether any such device or process is running within the virtual machine 42, including the agent self-verification module 152. Thus, in order to communicate with the agent executive 48, the agent self-verification module 152 posts the factors to the command queue 150 for retrieval by the virtual machine 42. Block 404 represents a process that is quite apart from, and independent of any self-verification process for any given virtual machine 42. Whenever the self-verification factors 68 on the grid are updated for any reason, commands are put on the command queues 150 for any and all agent executives 48 that are in the scope for the changes.

Block 1206.

In block 1206, the grid communication module 50 reads the command queue 150 for the updates to the agent self-verification factors 68. The grid communication module sends back a response to the grid computer system 200 regarding whether or not the new self-verification factors 68 were successfully updated.

Block 1208.

In block 1208, a determination is made as to whether the update of the self-verification factors was successful. If so (1208—Yes), process control passes to block 1209. If not (1208—No), process control passes to block 420 in order to perform failsafe actions.

Block 1209.

Block 1209 begins the process of self-verification. In block 1209, the agent executive 48 collects information for a self-evaluation for integrity of the agent executive 48 as dictated by the agent self-verification factors 68. While the agent executive 48 collects the information requested by the agent self-verification factors 68, the agent executive 48 does not actually use the information to determine the integrity of the agent executive 48. Typically, the agent executive 48 stores the information in the agent data store 52. Regardless of whether the information is stored in data store 52, the information is encrypted and signed by the agent executive 48, as identified by the agent identity token 56 associated with the agent executive, and communicated using a secure message security protocol such as the one described in the section above entitled "Message Security Protocol", to the agent self-verification module 152 operating on the grid computer system 200.

Block 1210.

In block 1210, the agent self-verification module 152, operating on the grid computer system 200, makes a determination as to whether any of the self-verification factors 68 have failed. This is done by comparing the information collected in block 1208 to one or more associated self-verification rules in the set of self-verification rules 154. If a factor has failed, (1210—Yes), then process control passes to block 1212. Otherwise (1210—No), the agent executive 48 is confirmed to be intact and process control passes to block 1302 of FIG. 13.

Block 1212.

In block 1212, a determination is made as to whether the failure detected in block 1210 is correctable. If so (1212—Yes), process control passes to block 1220 of FIG. 4B. If the failure detected is not correctable (412—No), either because (i) the failure was detected on a previous cycle and the agent self-verification corrective commands of FIG. 12B were not able to correct the problem during this previous cycle, or (ii) the initial pass through block 1212 determined that the failure was not correctable, process control passes to block 1218 in order to initiate failsafe action.

Block 1218.

In block 1218, the agent executive 48 performs a failsafe action dictated by uncorrectable failure of an agent self-verification factor 68 including possible abortion of agent executive 48 and/or hardware virtual machine 42. In practice, although not illustrated in FIGS. 12A, 12B, and 12C, the manner in which failsafe action is taken in some embodiments is for agent self-verification module 152 to post agent self-verification failsafe commands to the command queue 150 associated with the agent executive 48, where the agent self-verification failsafe commands encode one or more failsafe actions. As such, agent self-verification failsafe commands include commands which will, for example, alert an administrator, shut down the agent executive 48, shut down the virtual machine 42, or some combination of the above. Moreover, other examples of failsafe actions including alerting the user by e-mail, setting the state of the agent to "requires attention" in the grid computer system 200, starting a forensic data collection automatically, updating firewall rules or other security configuration parameters, etc. Multiple failsafe actions can be triggered.

Block 1220.

Turning to FIG. 12B, block 1220 is reached when a determination is made that a self-verification factor has failed but that such failure may be correctable. In such instances, agent self-verification module 152 will place an agent self-verification corrective command set into the command queue 150 associated with the agent executive 48, where the agent self-verification corrective command set encodes one or more corrective actions. As such, agent self-verification corrective commands include commands which will, if successfully implemented, cause the agent executive 48 to become valid.

Block 1222.

The grid communication module 50 of the agent executive 48 reads the agent self-verification corrective commands and the agent executive 48 executes its commands. The commands may require the collection of further data and/or actions to be performed, such as changing a network communication port setting.

Block 1224.

In some instances, after the agent self-verification corrective commands are executed, the information requested by the agent self-verification corrective commands and/or the status of the commands that required an action to be performed are passed back to the agent-self-verification module 152. As in all instances where information is passed between the remote computing asset 100 to the grid computer system, such information is encrypted and signed by the agent executive 48, as identified by the agent identity token 56 uniquely associated with the agent executive using, for example, the secure communication methods disclosed in the section entitled "Message Security Protocol" above.

Block 1226.

When the agent-self-verification module 152 is satisfied with the information received (1226—Yes), then the agent executive 48 is deemed corrected for the initial failure and process control passes on to block 1209 to ensure correction. If the agent-self-verification module 152 is not satisfied with the information received (1226—No), then the agent executive 48 is deemed not corrected for the initial failure and process control passes on to block 1218. It will be appreciated that the process illustrated in FIG. 12B can be run in parallel for any number of correctible failures.

Checking the Security, Compliance, and Integrity of Data Structures, Processes, File Systems, or States Associated with a Virtual Machine Using a Grid Computer System.

Figure 13:
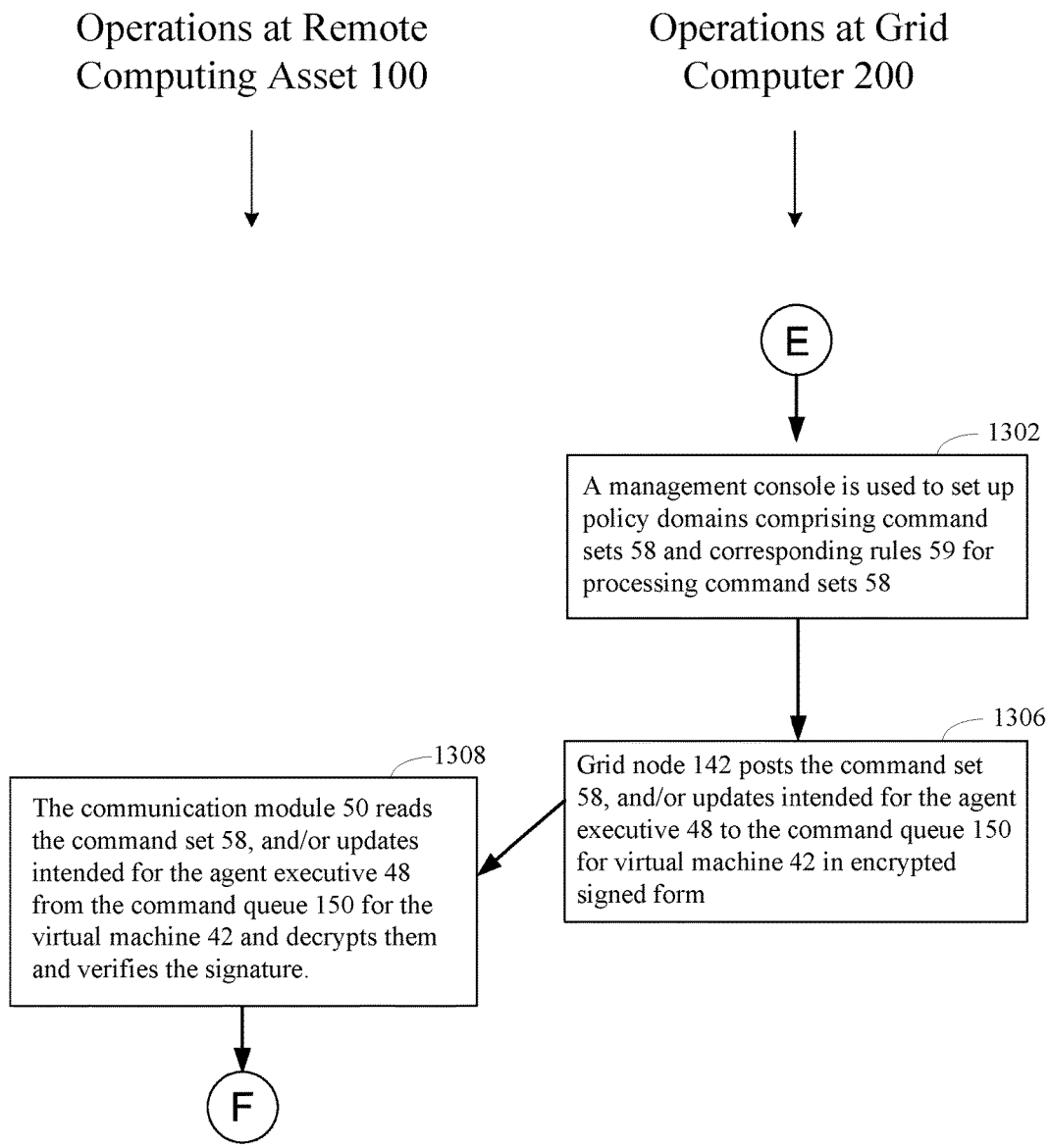
FIG. 13 illustrates a method by which custom command sets that check the integrity of various data structures, processes, file systems, or states associated with a virtual machine, as well as other optional information, can be created using a grid computer system and communicated in a secure manner to a server computer in accordance with the present disclosure.

FIG. 13 illustrates a method by which custom command sets 58 that check the security, compliance, and integrity of various data structures, processes, file systems, or states associated with a virtual machine 42 can be created using the grid computer system 200 and communicated in a secure manner to a remote computing asset 100 in accordance with the present disclosure.

Block 1302.

In block 1302 command sets 58 and corresponding rule sets 59 for processing command sets 58 are set up. In some embodiments, there are two or more command sets 58 for a corresponding virtual machine 42, one for the checking the states of security, compliance and integrity of the operating system 44 running on the virtual machine 42 and the other commands sets for checking the states of security, compliance, and integrity of various programs and/or data structures that are running and/or present on the virtual machine 42 other than the operating system 44.

One or more command sets 58 and their corresponding rule sets 59 constitute a policy domain. The purpose of a policy domain is to establish a specific configuration for each type of virtual machine 42 which will help harden it against and react to prevent attacks. The policy domain consists of a set of commands 58 applied to both the operating system 44 and the applications 70 running on it and a corresponding set of rules 59 to ensure that the commands are appropriately executed. Other commands 58 and corresponding set of rules 59 might be associated with reactive actions designed to prevent a successful attack against virtual machines 42. Groups of virtual machines 42, each running the same operating system 44 and applications 70 can run the same policy domain, greatly reducing the number of command sets 58 that the grid computer system 200 needs. In this way, any rules, commands, scheduling directives and configuration parameters, including firewall rules and configuration directives, may be scoped to affect all virtual machines 42, a single virtual machine 42, or multiple user-defined groups of virtual machines.

In the case of a multi-tenant system, many policy domains 152 reside in grid node 142. If an operator has one or more private instances of grid module 142, there would likely be only one policy domain 152. One API key is associated with each policy domain 152. The API key initially establishes an association between an agent identity token 56 and the policy domain 152.

In some embodiments, a management console associated with the grid computer system 200 is used to create, modify, or delete policy domains 152. As such, the management console is used to create, modify, or delete one or more rules (and related commands or actions); to modify the frequency with which sweeps and/or commands are executed by the agent executives 48; and to configure other parameters germane to the module in question (e.g., who should receive e-mail alerts, what kind of issue is considered "critical", etc.). Based on the scope of the creations, modifications, and deletions made in the management console, the grid computer system puts the commands needed to affect the changes into the command queues 150 of all the virtual machines 42 that are within the scope of the policy domain that has been modified.

Each respective command 66 in a command set 58 checks an important configuration of the operating system 44 and/or an application 70 running on the virtual machine 42 to which the respective rule is applicable. The results of the commands 66 are checked against corresponding rules 59. In some embodiments, each command 66 and its corresponding rule 59 are represented by a name (e.g., "cron should always be running") and a description. (e.g., "the cron daemon should always be running"). In some embodiments, there is an indication as to whether the failure of the rule 59 for a command 66 should be considered a critical risk. If a rule is deemed critical, then failsafe action, up to termination of the virtual machine 42, is designated. However, the failure of a general rule 59 (e.g., a rule not directly associated with agent executive 48 self-verification) doesn't necessarily cause termination of agent executive 48 and virtual machine 42. A rule failure can trigger one or more actions that might include commands to attempt to remediate the issue, generating e-mail or other kinds of alerts, simply recording the rule failure, or going to the extreme of shutting down the agent executive 48 and the virtual machine 42 to absolutely contain the compromise.

Moreover, in some embodiments, rules 59 and, indeed commands 66 and/or commands sets 58, may be designated as active or de-activated. Commands 66 for active command sets 58 are executed by agent executive 48 whereas nonactive commands 66 are stored by the grid computer system 200 but are not executed by the agent executive 48. Importantly, while commands 66 are communicated to a remote computing asset 100, for security purposes, the rules 59 used to interpret the results of the commands sets 58 remain on the grid computer system 200 and cannot be accessed by the remote computing asset 100.

In some embodiments, a command set 58 comprises one or more commands 66 for checking a status of a data structure accessible to the virtual machine 42 or for checking a status of a process running on the virtual machine 42. In some embodiments, a command set 58 comprises one or more commands 66 for checking the status of a setting associated with a file stored in the agent data store 52 (memory) accessible to the virtual machine 42, a setting of a directory stored in the memory accessible to the virtual machine, or an existence or a status of a process running on the virtual machine 42. In some embodiments, a command set 58 comprises one or more commands 66 for checking a password associated with a user or with a group of users of the virtual machine 42. In some embodiments, a command set 58 comprises one or more commands 66 for checking a status of a network communication port that is associated with the virtual machine 42.

In some embodiments, a command set 58 comprises one or more commands 66 for validation of a name-value pair in a file in a memory accessible by the virtual machine 42. For instance, in some embodiments, a rule 59 comprises a configuration file path (e.g., "/etc/httpd/httpd.conf", an optional configuration file section, a configuration item (first component of the name-value pair, e.g., "User"), a desired value (second component of the name-value pair, e.g., "nobody"), an optional configuration file comment character (e.g., "#"), a configuration item/value delimiter, if any, and a remedial suggestion (e.g., "if this rule fails, the User setting in the Apache configuration file should be changed to 'nobody'"). Thus, in the exemplary rule, if the value for "User" in the Apache configuration file is set to other than "nobody" the rule requires that it be set to "nobody." Thus, in this example, the command 66 for the rule 59 would be to acquire the relevant name-value pair from the file /etc/httpd/httpd.conf from the remote computing asset 100 and the rule 59, operating on the grid computer system 200, would check to see if the name-value pair retrieved by the command 66 is correct (e.g., "User nobody"). If so, the rule passes. If not, the rule fails.

Block 1306.

In block 1306 the grid node 142 posts the command set 58 and/or updates intended for the agent executive 48 to the command queue 150 for virtual machine 42 in encrypted form. In typical embodiments, this information is encrypted and signed prior to sending it to the remote computing asset 100, for example, in the manner set forth in the section entitled "Message Security Protocol" above.

Block 1308.

In block 1308 the communication module 50 reads the command set 58 and other updates from the command queue 150 for the virtual machine 42 and decrypts them, for example, in the manner set forth in the section entitled "Message Security Protocol," above. Process control then passes on to block 602 of FIG. 6A.

Execution of Sweeps on the Remote Computing Asset 100 and the Analysis of Information Retrieved from Such Sweeps Using Rules Stored on the Grid Computer System 200.

Figure 14A:
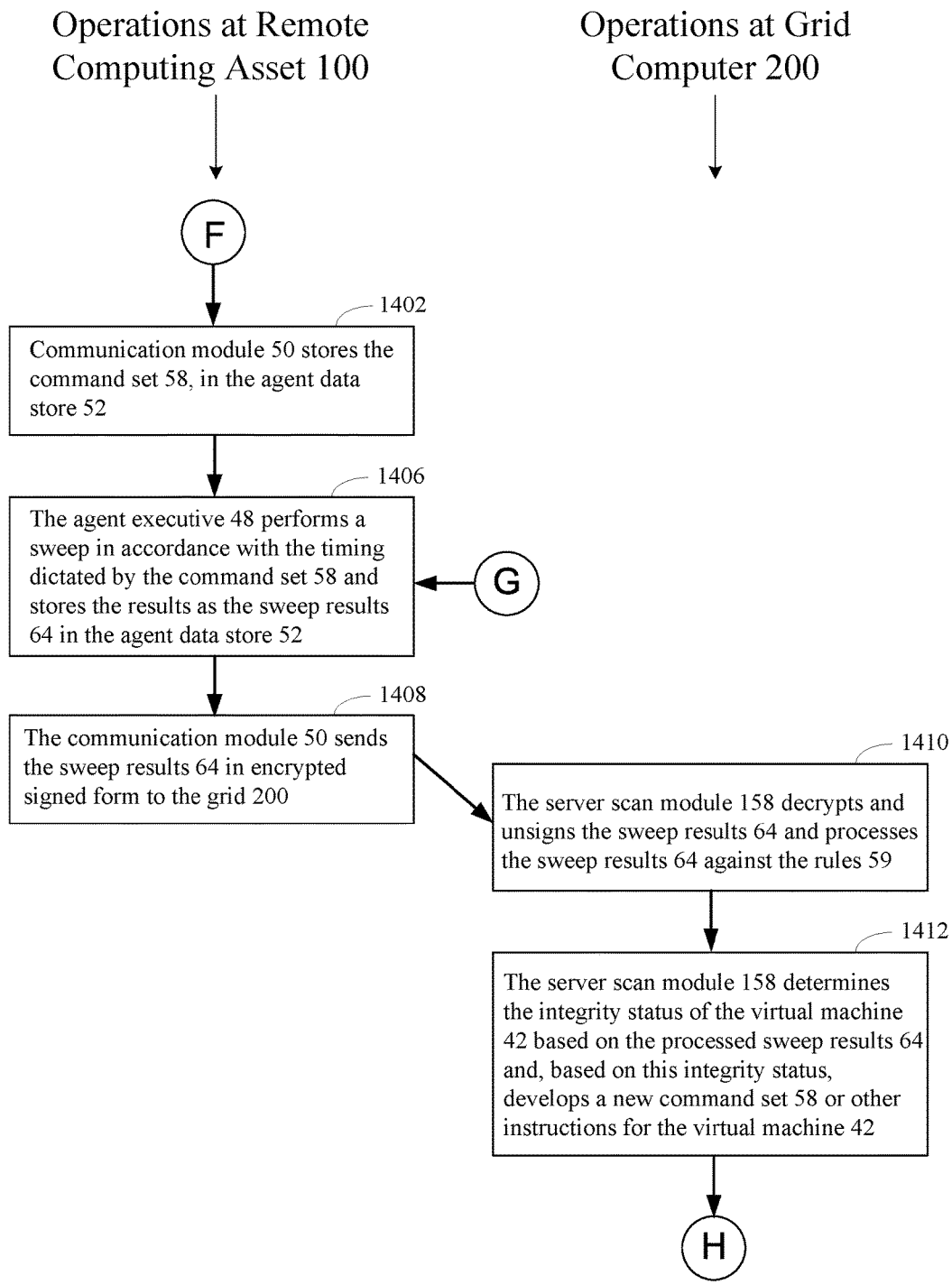
FIG. 14A and FIG. 14B illustrate how sweeps are executed on a remote computing asset and the information from the sweeps is communicated to the grid computer system for evaluation against rules and, based on this evaluation, new commands are provided to the remote computing asset by the grid computer system in accordance with the present disclosure.
Figure 14B:
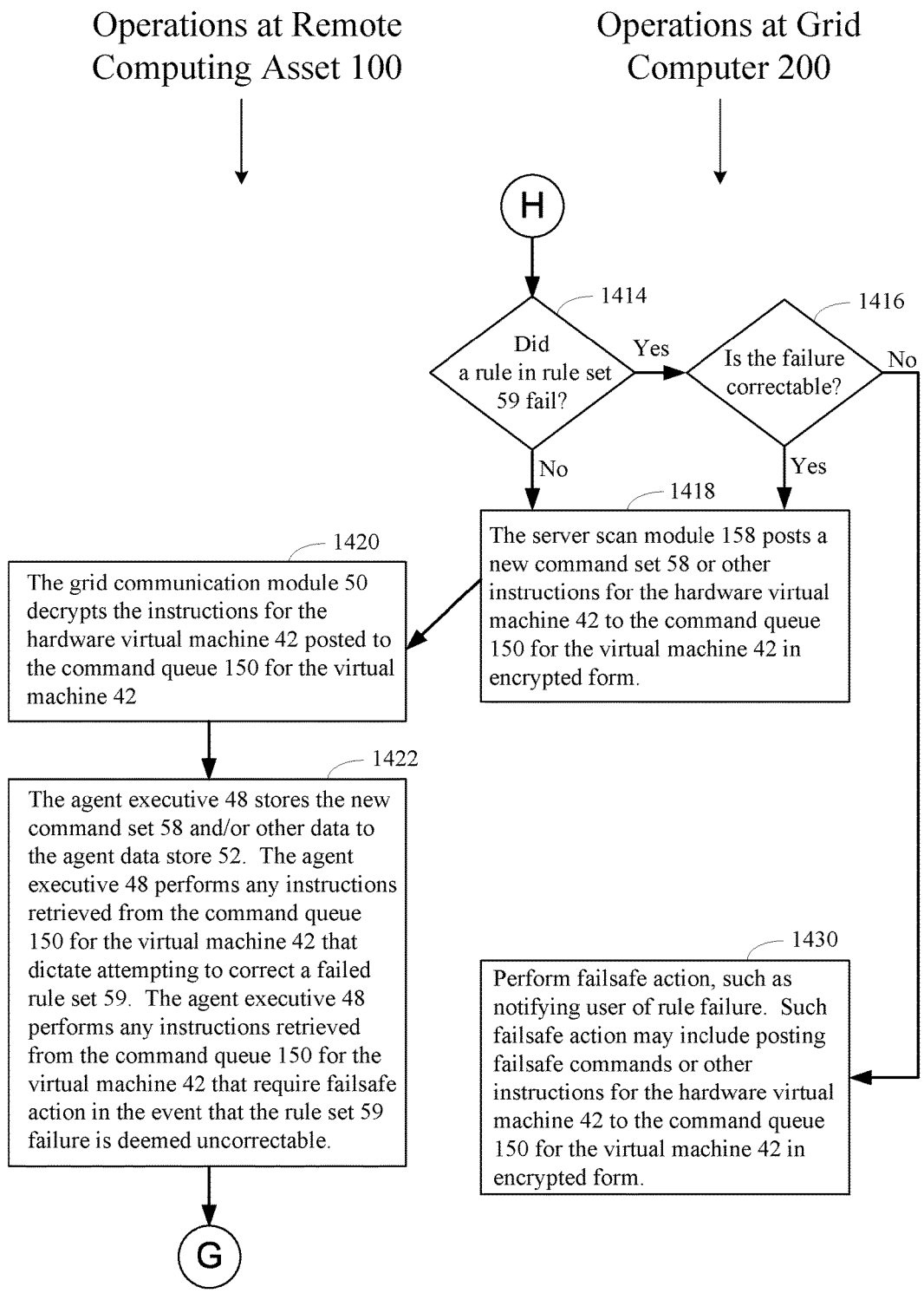

FIGS. 14A and 14B illustrates an exemplary process for executing a sweep on the remote computing asset 100 and sending the information from the sweep to the grid computer system 200 for evaluation against the rules 59. Based on this evaluation, new commands 66 are provided to the remote computing asset 100 by the grid computer system 200.

Block 1402.

In block 1402 the communication module 50 stores the command set 58 and/or the updated agent self-verification factors 68 in the agent data store 52.

Block 1406.

In block 1406, the agent executive 48 performs a sweep in accordance with the timing dictated by the command set 58 and/or the agent self-verification factors 68 and stores the results as the sweep results 64 in the agent data store 52. In some embodiments, block 1406 only executes the commands 66 of one or more command sets 58 and does not collect information mandated by the agent self-verification factors 68. In some embodiments, the commands 66 of one or more command sets 58 are executed and the information mandated by the agent self-verification factors 68 is collected. Examples of commands 66 that may be executed in block 1406 are described in block 1302 and further examples are provided below.

In some embodiments, a command 66 requests that a certain action be taken. In one example, the command 66 may request that a file in a particular directory be deleted. Such a command is an action command. If an action command is executed in block 1406, then the status of the command is captured. For instance, in the case where the action command 66 was to delete a file, the command 66 may achieve a status of "1" if the command 66 successfully deleted the file and "0" otherwise. Non-binary status results for action commands 66 are also possible and are within the scope of the present disclosure. Additional non-limiting examples of action commands that may be executed in block 1406 include starting or stopping a process in virtual machine 42, deleting, moving or renaming a file, combination of files or directory, altering the privileges of a user of virtual machine 42, changing the time interval for when sweeps in accordance with block 1406 are performed, purging a cache, changing the priority of a process running on the virtual machine 42, deleting or adding a user account, reinitializing the virtual machine 42, activating or deactivating a firewall or policy or a rule within a firewall policy, and making changes to configuration parameters within the operating system 44 and application configuration files.

In some embodiments, a command 66 requests that certain information be retrieved from the virtual machine 42. In one example, the command 66 may request that the size of a file in a particular directory be obtained. Such a command is a collection command. If a collection command is executed in block 1406, then the information requested by the command is captured. More collection commands are described in greater detail in block 1302 above.

Block 1408.

In block 1408, the communication module 50 sends the sweep results 64 in encrypted form, and signed by the agent executive 48, as identified by the agent identity token 56, to the grid computer system 200 using, for example, the techniques disclosed in the section entitled "Message Security Protocol" above to ensure secure communication of the sweep results 64. In some embodiments, sweep results 64 includes the identity and status of any action command that was executed in block 1406 and the data collected by any command that requested information in block 1406. In some embodiments, where block 606 also required that information dictated by agent self-verification factors 68 be collected, the sweep results further include the information dictated by the agent self-verification factors 68. It will be appreciated that there is benefit to requiring the agent executive 48 verification from time to time to ensure that the agent executive 48 has not become corrupt. Thus, in some instances of block 606, the information requested by the agent self-verification factors 68 will be collected and this information will be included in the sweep results 64 that are sent to the grid computer system 200 in block 1408.

Block 1410.

In block 1410, the server scan module 158 (also known as the integrity validation module) decrypts and unsigns the sweep results 64 using, for example, the techniques disclosed in the section entitled "Message Security Protocol" above to ensure secure communication of the sweep results 64. The server scan module 158 then processes the sweep results 64 against the rules 59. In one example, a command executed in block 66 required that a cryptographic hash of a particular file resident in the corresponding virtual machine 42 be taken. In such an instance, the rule 59 will compare the cryptographic hash value returned by the rule 59 to a predetermined value and, if the cryptographic hash value returned by the rule 59 does not match the predetermined value, the rule 59 will fail. Advantageously, for security reasons, the exact nature of the rules, such as the predetermined value, are stored on the secure grid computer system 200 rather than sent to the relatively untrustworthy or uncontrolled virtual machine 42.

Block 1412.

In block 1412, the server scan module 158 determines the states of security, compliance, and integrity of the virtual machine 42 based on the processed sweep results 64 and, based on this integrity status, develops a new command set 58 or other instructions for the virtual machine 42. Blocks 602 through 1412 show the power of the present disclosure. Information can be queried or action can be taken by the integrity-verified agent executive 48 using thoroughly authenticated and verifiable commands 66 acting on a relatively unsecure virtual machine 42 and the results of such commands can be analyzed using rules 59 that are in the secure grid computer system 200. In this way, in combination with other aspects of the disclosure, the states of security, compliance and integrity of virtual machine 42 and the programs running on the virtual machine are continuously assessed, analyzed, and improved.

Block 1414.

In block 1414, a determination is made as to whether a rule in rule set 59 failed. If a determination is made that a rule 59 has failed (614—Yes), then process control passes to block 616. If no rule 59 has failed (614—No), then process control passes directly to block 618.

Block 1416.

In block 1416, a determination is made as to whether the failure identified in block 614 is correctable. If a rule in rule set 59 failed and the failure is correctable (1416—Yes), then process control passes to block 1418 where corrective actions are posted to the command queue 150 for the virtual machine 42 or virtual machines 42 for which the rule failed. If the rule failure is deemed not correctable (1416—No), then process control passes to block 630 where failsafe action is taken. In some instance, a rule failure is deemed not correctable after corrective actions were attempted by blocks 1418 and 1420 and such corrective action failed to remove the rule failure.

Block 1418.

In block 1418, the server scan module 158 posts a new command set 58 or other instructions for the hardware virtual machine 42 to the command queue 150 for the virtual machine 42 in encrypted and signed form. If a rule in rule set 59 failed and the failure is deemed correctable, instructions to attempt correction are posted to the command queue 150 for the virtual machine 42 in encrypted and signed form as well.

If a rule in rule set 59 failed and the failure is deemed correctable then, in practice, the manner in which corrective action is taken in some embodiments is for the server scan module 158 to post a pre-configured or dynamically generated remedial command set 58 to the command queue 150 associated with the agent executive 48, where the remedial command set 58 encodes one or more corrective actions directed to correcting some aspect of the virtual machine 42. Nonlimiting examples of what may be corrected include, but are not limited to, changing a firewall setting, altering a status of a data structure accessible to the virtual machine 42, altering a process running on the virtual machine 42, changing a setting associated with a file stored in a memory accessible to the virtual machine 42, changing a setting of a directory stored in a memory accessible to the virtual machine 42, changing a password associated with a user or with a group of users of the virtual machine 42, resetting or altering a name-value pair in a file in a memory accessible by the virtual machine 42, or changing a network communication port setting that is associated with the virtual machine 42.

Block 1420.

Once commands, for example commands designed to correct a self-verification factor 68 failure or rule 59 failure have been posted to the command queue 150 associated with the agent executive 48, the grid communication module 50 of the agent executive 48 reads the command set 58 and decrypts them and verifies the signature. In typical embodiments, the techniques disclosed in the section entitled "Message Security Protocol" above are used to communicate this information to the agent executive 48.

Block 1422.

In block 1422, the agent executive 48 stores the new command set 58 and/or other data to the agent data store 52. The agent executive 48 performs any instructions retrieved from the command queue 150 for the virtual machine 42 that dictate attempting to correct failed rules in rule set 59. Once block 1422 is completed, process control passes back to block 1406 and another iteration of the loop beginning at this block is performed in accordance with the periodic interval or schedule dictated by a command set 58 or by the agent executive 48 itself.

Block 1430.

Block 1430 is reached if a failsafe action needs to be taken because one or more rules in rule set 59 have failed. Such failsafe action may include one or more actions. Such one or more actions may include notifying the user of the failure and/or the posting of failsafe instructions to the command queues 150 for the virtual machines 42 on which the rule in the rule set 59 failed. If such instructions are posted on queues 150 of affected virtual machines 42, in subsequent steps not illustrated in FIG. 14B, such failsafe instructions are read by the virtual machines 42 and executed by the agent executives 48 of the affected virtual machines 42. Depending on the nature of the failsafe action, process control may (i) pass back to block 1406 and another iteration of the loop beginning at this block is performed in accordance with the periodic interval or schedule dictated by a command set 58 or by the agent executive 48 itself or (ii) termination of the affected virtual machines 42 initiated.

Now that systems for detecting and responding to intrusions have been described, methods in accordance with the present disclosure, for implementing an intrusion prevention system in which authorization from at least two authorization contacts across established trust channels is obtained before enacting a countermeasure responsive to a detected intrusion of one or more protected computing assets is disclosed with reference to FIG. 15A through 15G.

In accordance with block 1502, at a computer system (e.g., grid computer system 200 of FIGS. 1A and 1C or, alternatively kill chain event monitoring system 1000 of FIGS. 1A and 1D which makes use of a grid computer system 200) comprising one or more processing units, and memory storing one or more programs for execution by the one or more processors, the one more programs comprising instructions for implementing the method, data is received that has been collected from one or more remote computing assets 100.

In some embodiments in accordance with block 1504, such data is collected through an established trust channel. For instance, a request from a security control module (e.g. agent executive 48) running within a first operating system 44 on a first remote computing asset 100 in the one or more remote computing assets is received. The request includes a policy identifier (e.g., an API key 54 as describe with reference to block 1102 of FIG. 11A) that identifies a security policy. Responsive to the request, a unique agent identity token 56, which includes a cryptographic key, is generated and transmitted to the security control module (e.g., agent executive 48) of the remote computing asset 100. Also, a first set of commands 58 is selected according to the identified security policy based upon (i) a current state of the first operating system 44 and (ii) a current state of the security control module (e.g., agent executive 48). Optionally, the first set of commands is further selected based upon a current state of one or more applications running in the first operating system on the first remote computing asset 100. The first set of commands 58 is placed in a command queue 150 for retrieval and execution by the security control module 48 on the first remote computing asset 100. The data collected at the one or more remote computing assets 100 (e.g., sweep results 64 of FIG. 1B) includes information that is collected by execution of the first set of commands 58 on the first remote computing asset 100.

In some embodiments, grid computing system 200 collects the above-described data and communicates such data to kill chain event monitoring system 1000. In some embodiments, kill chain event monitoring system 1000 requests specific types of data (e.g. specific types of CloudPassage HALO events) on a periodic or nonperiodic basis from grid computing system 200. In some embodiments, kill chain event monitoring system 1000 and the grid computing system 200 are in the same system and any such data acquire by the grid computing system functionality is accessible, within the system, by the kill chain event monitoring system functionality. In still other embodiments the kill chain event monitoring system 1000 and the grid computing system 200 are distinct systems and the grid computing system 200 pushes the data to the kill chain event monitoring system 1000 (e.g., in the form of log files and/or event calls) on a repetitive (periodic or nonperiodic) basis.

In some embodiments in accordance with block 1506, the one or more remote computing assets 100 are, in fact, a single remote computing asset. In other embodiments, the one or more remote computing assets 100 is a plurality of remote computing assets, such as two or more computers or other forms of devices, three or more computers or other forms of devices, and so forth. In typical embodiments where there are two or more remote computing assets 100, the assets are networked together and form a single system.

In some embodiments in accordance with block 1508, the integrity of the data received from the one or more remote computing assets 100 is ensured by way of a cryptographic key uniquely assigned to the one or more remote computing assets 100 as well as secret shared knowledge 62 (shared between the remote computing assets 100 and the grid computing system 200). In such embodiments, the cryptographic key and the shared knowledge is used to decrypt the received data and verify a digital signature within the data. In some embodiments, if the digital signature is not verified, the received data is not matched against the trigger events of workflows. In some embodiments, if the digital signature is not verified, a special workflow is initiated to alert responsible authorities that there has been a failure in receiving sweep data from the one or more remote computing assets 100. In some embodiments in which the remote computing asset 100 includes a virtual machine and the digital signature is not verified, process control passes to step 1430 of FIG. 14B.

Referring to block 1510 of FIG. 15A, in some embodiments the data collected at the one or more remote computing assets 100 includes: (i) information regarding one or more processes running in memory 14 associated with the one or more remote computing assets 100, (ii) information that identifies what processes are running in memory 14 associated with the one or more remote computing assets 100, (iii) a current set of authorized users of the one or more remote computing assets, (iv) a current set of files and directories hosted by the one or more remote computing assets, (v) current metadata for files and directories hosted by the one or more remote computing assets, and/or (vi) current content of one or more configuration files for the one or more remote computing assets.

Referring to block 1512 of FIG. 15A, in some embodiments the one or more remote computing assets 100 include at least one virtual machine 42, or alternatively, consist of a single virtual machine 42.

Figure 15B:
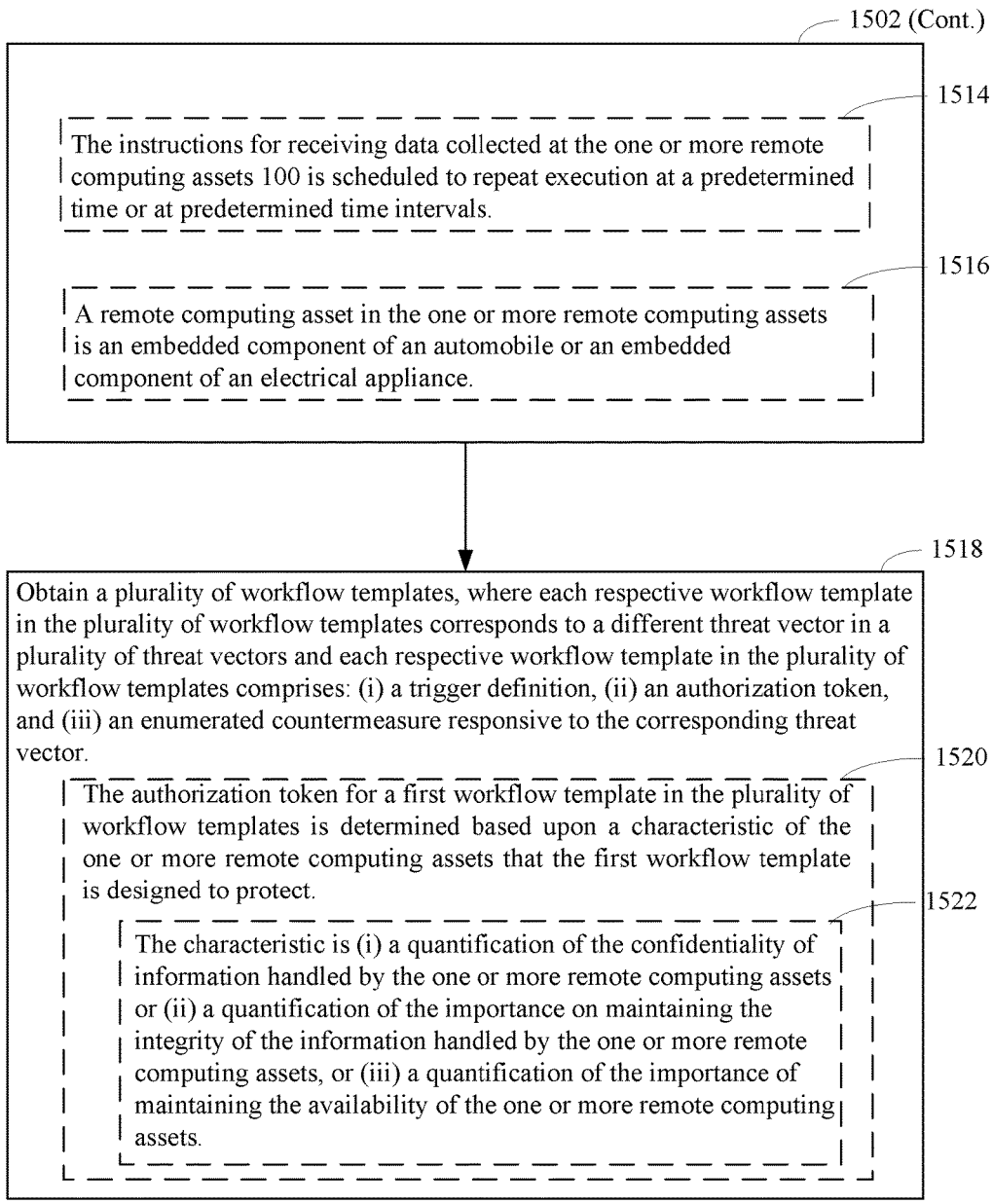

Referring to block 1514 of FIG. 15B, in some embodiments data is collected from the one or more remote computing assets 100 on a repetitive (periodic or nonperiodic) basis. In some embodiments, data is collected from the one or more remote computing assets 100 every sixty seconds, every five minutes, each half hour, every hour, or once a day.

Referring to block 1516 of FIG. 15B, it is noted that the disclosed systems and methods advantageously impose now significant limitations on the nature of the remote computing assets provided that such assets are accessible by a communication network 104. As such, a remote computing asset 100 can be a standalone server, such as the computer disclosed in FIG. 1B, or, alternatively, an embedded component of an automobile or an embedded component of an electrical appliance. In still other embodiments, a remote computing asset 100 is a security video camera, a networked printer, a networked photocopier, a web server, or an appliance.

As illustrated in FIG. 15B, process control continues with the obtaining, in accordance with block 1518, a plurality of workflow templates. As further illustrated in FIG. 1D, each respective workflow template 162 in the plurality of workflow templates corresponds to a different threat vector in a plurality of threat vectors and each respective workflow template in the plurality of workflow templates comprises: (i) a trigger definition 164, (ii) an authorization token 166, and (iii) an enumerated countermeasure 168 responsive to the corresponding threat vector.

Referring to block 1520 of FIG. 15B, in some embodiments the authorization token for a first workflow template in the plurality of workflow templates is determined based upon a characteristic of the one or more remote computing assets 100 that the first workflow template is designed to protect, such as (block 1522) (i) a quantification of the confidentiality of information handled by the one or more remote computing assets, (ii) a quantification of the importance on maintaining the integrity of the information handled by the one or more remote computing assets, or (iii) a quantification of the importance of maintaining the availability (e.g., online availability of a web server) of the one or more remote computing assets 100. In this way, each respective workflow template is precisely tuned to the characteristics of the devices the template is designed to protect.

Figure 15C:
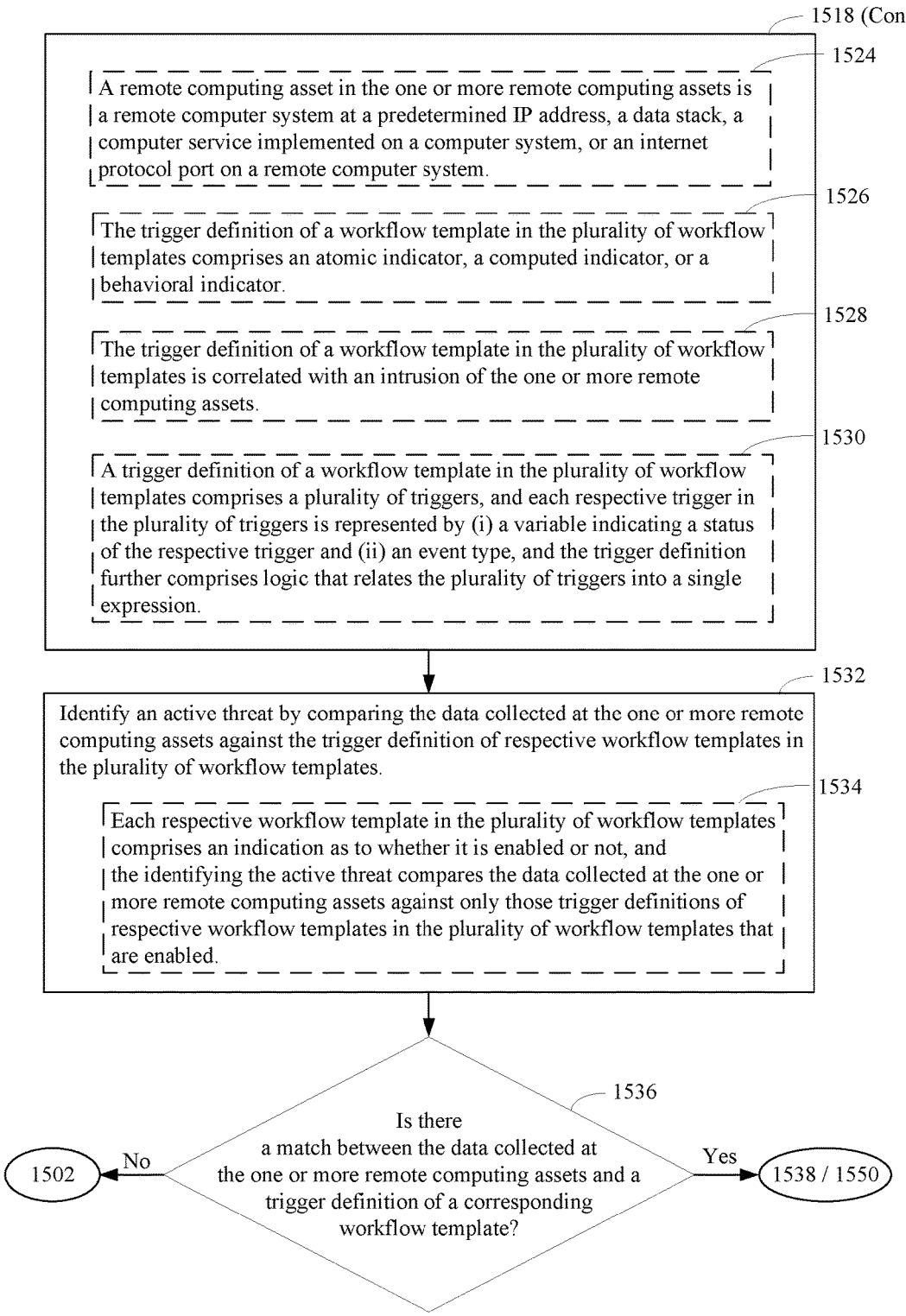

Referring to block 1524 of FIG. 15C, in some embodiments a remote computing asset in the one or more remote computing assets is a remote computer system at a predetermined IP address, a data stack, a computer service implemented on a computer system, or an interne protocol port on a remote computer system.

Referring to block 1526 of FIG. 15C, in some embodiments the trigger definition 164 of a workflow template in the plurality of workflow templates comprises an atomic indicator, a computed indicator, or a behavioral indicator.

Referring to block 1528 of FIG. 15C, in some embodiments a workflow template in the plurality of workflow templates is correlated with an intrusion of the one or more remote computing assets.

Referring to block 1530 of FIG. 15C, in some embodiments a trigger definition of a workflow template 162 in the plurality of workflow templates comprises a plurality of triggers, and each respective trigger in the plurality of triggers is represented by (i) a variable indicating a status of the respective trigger and (ii) an event type, and the trigger definition further comprises logic that relates the plurality of triggers into a single expression, as disclosed in further detail above in conjunction with FIGS. 3 and 4.

As illustrated in FIG. 15C, process control continues in FIG. 15C with advancement to block 1532 in which an active threat (against the one or more remote computing assets 100) is identified by comparing the data collected at the one or more remote computing assets against the trigger definition of respective workflow templates in the plurality of workflow templates. This involves searching for a match between the alert trigger conditions (trigger definition 164) of a workflow template 160 and the data (e.g., CLOUD-PASSAGE HALO event calls) results received at block 1502. Referring to block 1534, in some embodiments, each respective workflow template in the plurality of workflow templates comprises an indication as to whether it is enabled or not, and the identifying the active threat compares the data collected at the one or more remote computing assets against only those trigger definitions of respective workflow templates in the plurality of workflow templates that are enabled.

At block 1536 of FIG. 15C, a determination is made as to whether there is a match between the data collected at the one or more remote computing assets and a trigger definition of a corresponding workflow. If not (1536—No), process control returns to block 1532. If so (1536—Yes), process control continues to block 1538 in which the authorization token 166 of the workflow template 162 that was triggered is enacted. In the present disclosure, a workflow template, which once activated is sometimes referred to as a workflow, comprises at least two authorization contacts. In some embodiments, the authorization token 166 includes the identity of these two at least two authorization contacts whereas in other embodiments the authorization token 166 serves as a key to an a corresponding authorization procedure in an authorization procedure data store 170, where such authorization procedure includes the identity of these two at least two authorization contacts.

Regardless of the nature of the authorization token 166, the identity of the at least two authorization contacts, and the devices associated with the at least two authorization contacts is retrieved and in block 1538 authorization from a first authorization contact associated with the corresponding workflow template is sought by pushing an alert regarding the corresponding workflow template through a first established trust channel to a first remote device 1050 associated with the first authorization contact without user intervention by the first authorization contact. Here, as illustrated in FIG. 1A, the first remote device 1050 is other than the one or more remote computing assets 100. Further, as illustrated in FIG. 6, the alert is sent to the device associated with the first authorization contact without the first authorization contact specifically soliciting the alert. Further, as noted in block 1540, in some embodiments, the first remote device (the device associated with the first authorization contact) is a remote device.

Referring to block 1542, in some embodiments, the established first trust channel between the kill chain event monitoring system 1000 and the device 1050 associated with the first authorization contact is originated or maintained in the same manner by which trusted communication is established between the grid computing system 200 and a remote computing asset 100. For example, in some embodiments the first trust channel is originated or maintained by receiving a request from a security control module running within an operating system on the first remote device 1050 associated with the first authorization contact. In some such exemplary embodiments, the request includes a policy identifier that identifies a security policy. A unique agent identity token which includes a cryptographic key is generated and transmitted (from the kill chain event monitoring system 1000 to the security control module of the device 1050 associated with the first authorization contact. A set of commands is selected according to the identified security policy, based on (i) a current state of the operating system of the remote device 1050, (ii) a current state of the security control module, and, optionally, (iii) a current state of one or more applications running in the operating system on the first remote device. The set of commands is placed in a command queue for retrieval and execution by the first remote device 1050. Data is received from the first remote device responsive to execution of the set of commands on the first remote device and thereby used to originate or maintain the first established trust channel with the first remote device 1050. Further in some such embodiments, as illustrated in block 1544 of FIG. 15D, the alert regarding the corresponding workflow template is pushed through the first trusted channel by placing the alert in a command queue for retrieval by the first remote device.

Figure 15D:
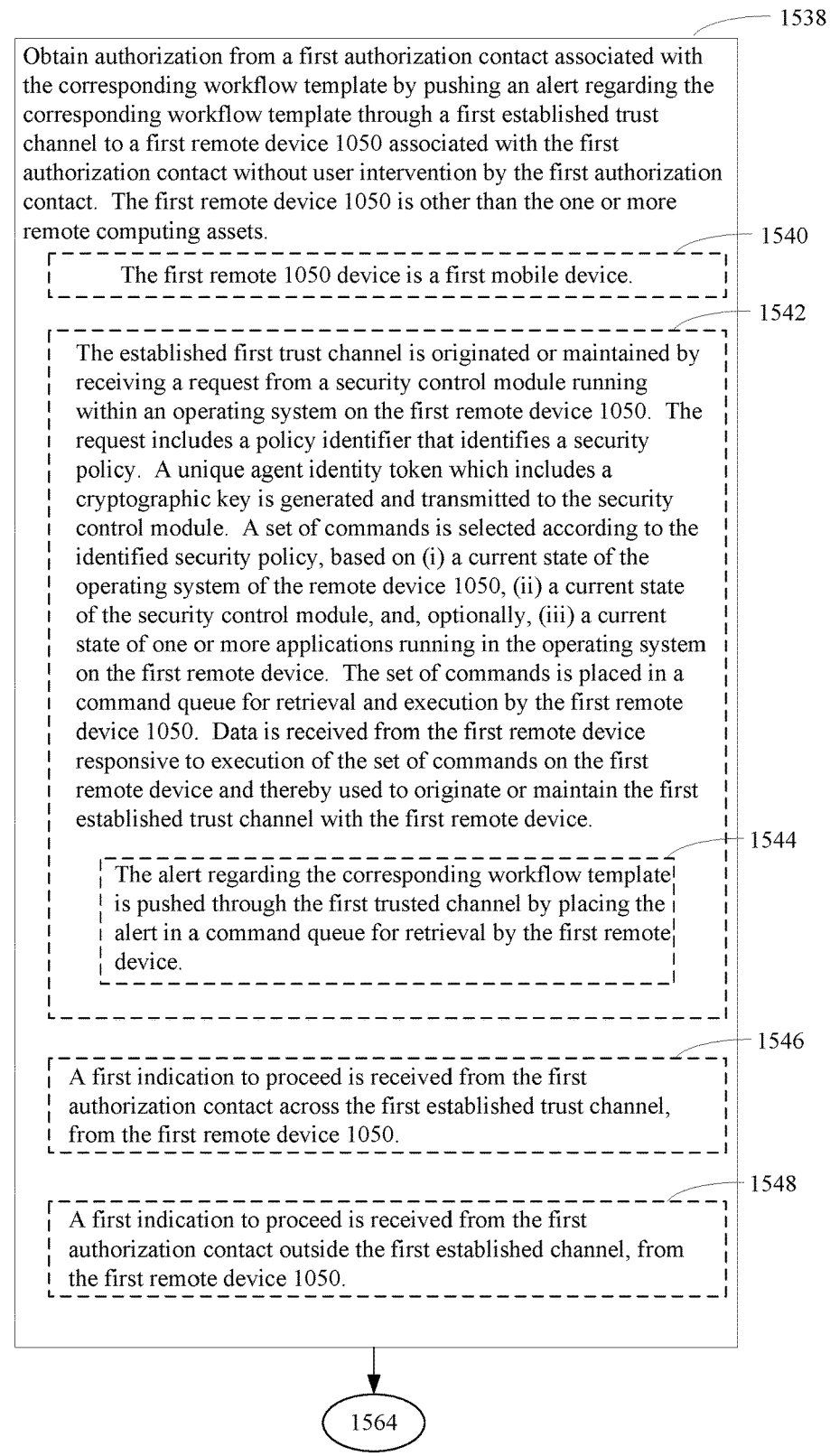

In some embodiments, the first established trust channel is used to receive a first indication to proceed from the first authorization contact, as illustrated by block 1546 of FIG. 15D. However, in some embodiments, as illustrated in FIG. 1548, the first authorization contact may operate outside of the first established trust channel, for instance by logging into grid computing system 200 and/or kill chain event monitoring system 1000 directly when the alert is received to make sure that the enumerated countermeasure is enacted, to modify the enumerated countermeasure or to take other action. Thus, the disclosed systems and methods provide flexible convenience of using remote authorization to invoke countermeasures, while still leaving the option open for manual maintenance of the intrusion prevention systems.

Figure 15E:
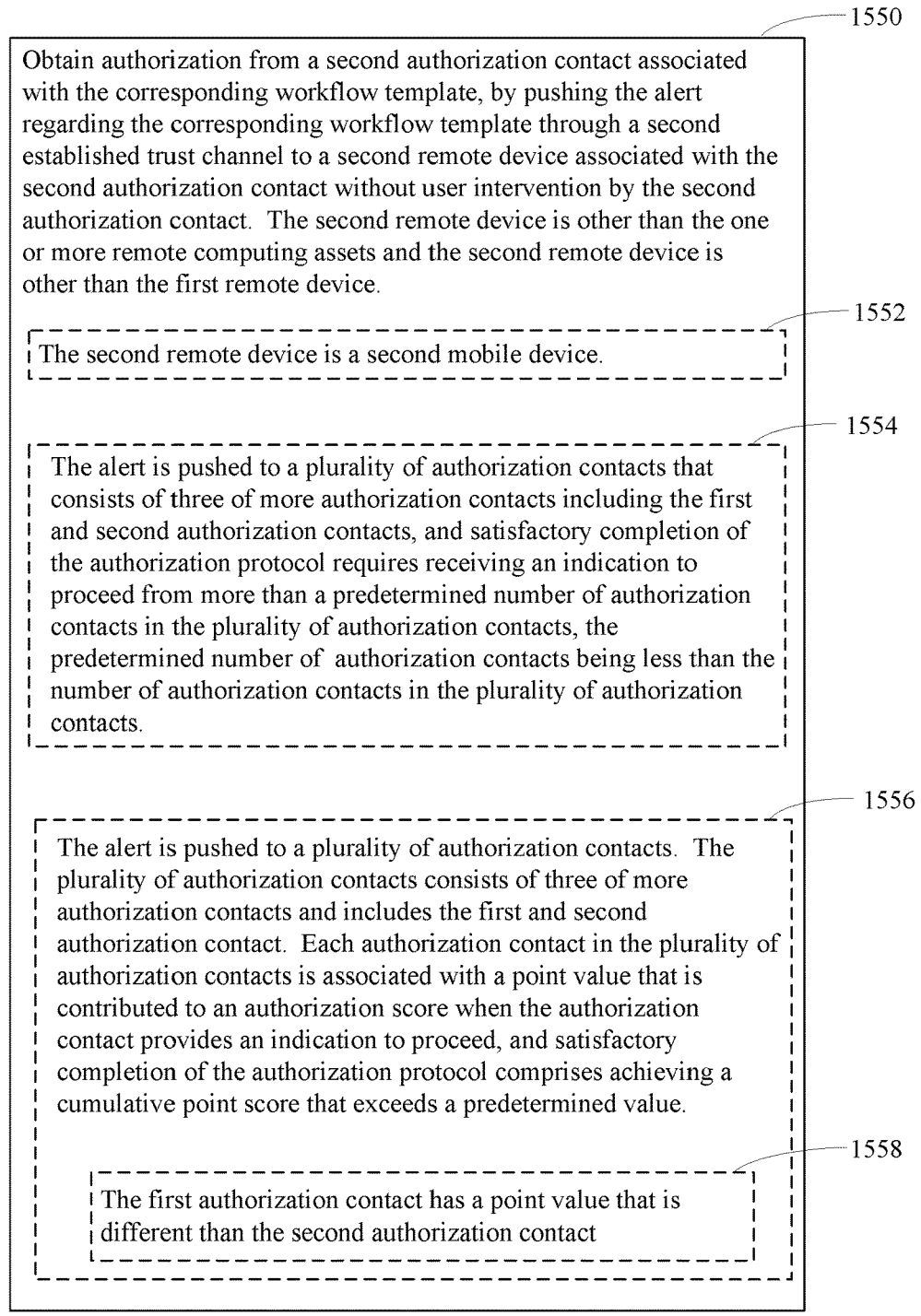

In block 1550 of FIG. 15E, authorization from a second authorization contact associated with the corresponding workflow template is sought by pushing the alert regarding the corresponding workflow template through a second established trust channel to a second remote device associated with the second authorization contact without user intervention by the second authorization contact. In typical embodiments, authorization from each authorization contact associated with a triggered workflow is concurrently sought. Thus, in typical embodiments, block 1538 of FIG. 15D occurs concurrently with block 1550 of FIG. 15E. In this way, the speed in which the enumerated countermeasure associated with the triggered workflow is enacted is maximized. However, the present disclosure is not so limited. In some embodiments, authorization from some authorized contacts is only sought through trusted channels when another authorized contact is not available. Furthermore, in some embodiments, the identity of the authorized contacts associated with a workflow change as a function of the date and time. For instance, in some embodiments one group of authorized contacts are associated with a workflow during day time hours (in a particular time zone) while other authorized contacts are associated with a workflow during night (or weekend/holiday) hours. Further still, in some embodiments, the workflows are in communication with time and attendance package that is electronically accessible by communication network 104 and the identity of the authorized contacts for a given workflow are chosen from those workers that are presently on duty and that have the requite degree of authority in the business organization associated with the one more remote computing assets 100 to authorize countermeasures.

In some embodiments, the second remote device is other than the one or more remote computing assets. Further still, the second remote device is other than the first remote device.

Referring to block 1552 of FIG. 15E, in some embodiments, the second remote device is a second mobile device (e.g., a smart phone, tablet, etc.).

Referring to block 1554 of FIG. 15E, in some embodiments, the alert is pushed to a plurality of authorization contacts that consists of three of more authorization contacts including the first and second authorization contacts, and satisfactory completion of the authorization protocol requires receiving an indication to proceed from more than a predetermined number of authorization contacts in the plurality of authorization contacts, the predetermined number of authorization contacts being less than the number of authorization contacts in the plurality of authorization contacts.

Referring to block 1556 of FIG. 15E, in some embodiments, the alert is pushed to a plurality of authorization contacts. The plurality of authorization contacts consists of three of more authorization contacts and includes the first and second authorization contact. Each authorization contact in the plurality of authorization contacts is associated with a point value that is contributed to an authorization score when the authorization contact provides an indication to proceed, and satisfactory completion of the authorization protocol comprises achieving a cumulative point score that exceeds a predetermined value. For instance, referring to block 1558, in some embodiments the first authorization contact has a point value that is different than the second authorization contact 1558.

Figure 15F:
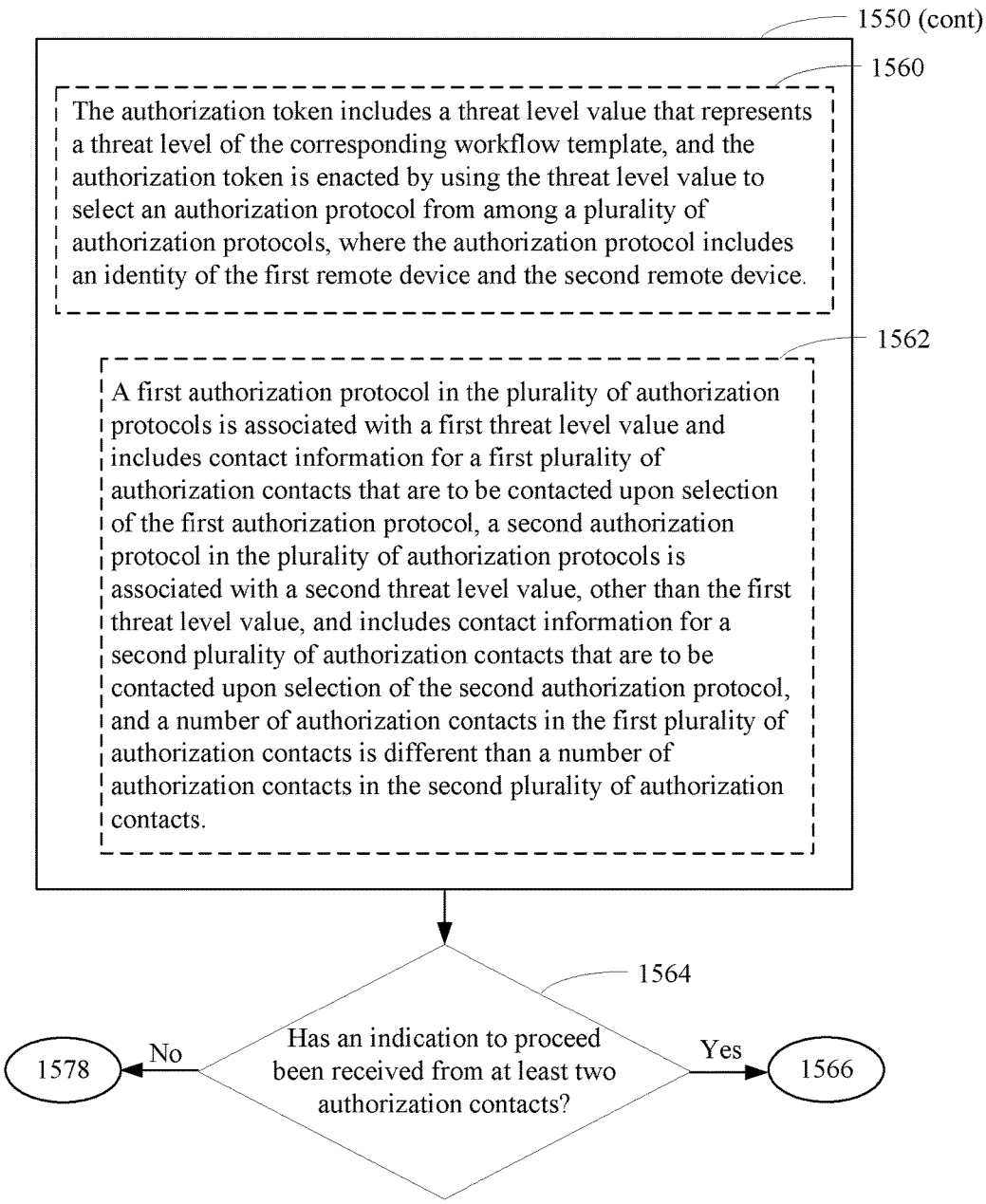

Referring to block 1560 of FIG. 15F, in some embodiments, the authorization token includes a threat level value that represents a threat level of the corresponding workflow template, and the authorization token is enacted by using the threat level value to select an authorization protocol from among a plurality of authorization protocols, where the authorization protocol includes an identity of the first remote device and the second remote device. As an example, referring to block 1562 of FIG. 15F, in some embodiments a first authorization protocol in the plurality of authorization protocols is associated with a first threat level value and includes contact information for a first plurality of authorization contacts that are to be contacted upon selection of the first authorization protocol, a second authorization protocol in the plurality of authorization protocols is associated with a second threat level value, other than the first threat level value, and includes contact information for a second plurality of authorization contacts that are to be contacted upon selection of the second authorization protocol, and a number of authorization contacts in the first plurality of authorization contacts is different than a number of authorization contacts in the second plurality of authorization contacts.

Once approval from the requisite authorization contacts for a triggered workflow have been obtained, a determination is made at block 1564 of FIG. 15F as to whether authorization has been received from at least two authorization contacts. In embodiments, the impose a point system, quorum, or other form of group decision making, block 1564 checks to determine if such additional constraints imposed by such group decision making have been satisfied (e.g., sufficient number of points achieved, quorum achieved, etc.). If so, 1564—Yes, process control proceeds to block 1566 of FIG. 15G in which the enumerated countermeasure of the corresponding triggered workflow template is executed. If not, 1564—No, the enumerated countermeasure of the corresponding workflow template is not executed (1578, FIG. 15G).

Figure 15G:
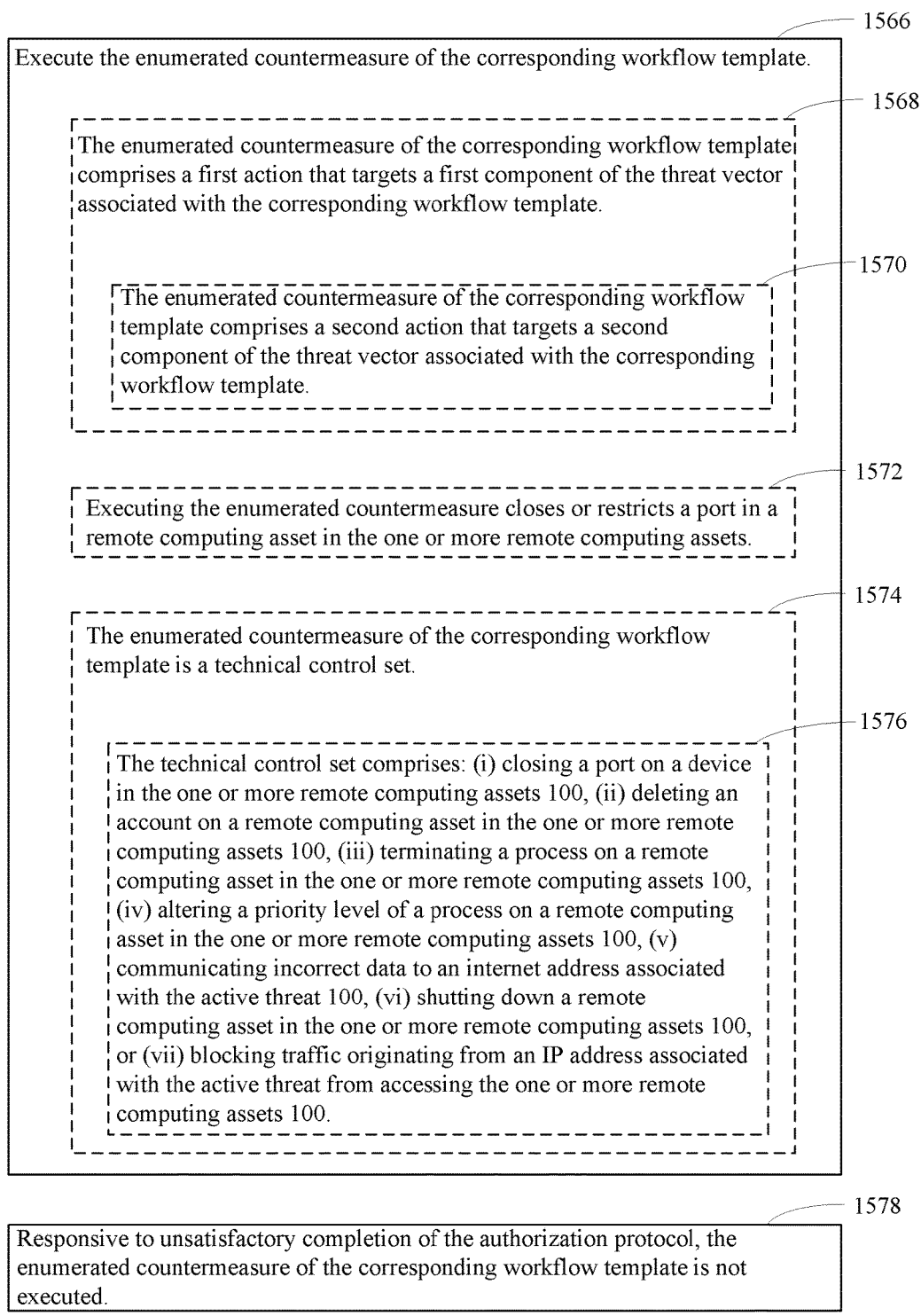

Referring to block 1568 of FIG. 15G, in some embodiments, the enumerated countermeasure of the corresponding workflow template comprises a first action that targets a first component of the threat vector associated with the corresponding workflow template. Further still, referring to block 1570 of FIG. 15G, in some embodiments, the enumerated countermeasure of the corresponding workflow template comprises a second action that targets a second component of the threat vector associated with the corresponding workflow template. Referring to block 1572 of FIG. 15G, in some embodiments, executing the enumerated countermeasure closes or restricts a port in a remote computing asset in the one or more remote computing assets. Referring to block 1574 of FIG. 15G, in some embodiments the enumerated countermeasure of the corresponding workflow template is a technical control set. For instance, referring to block 1576 of FIG. 15G, in some embodiments the technical control set comprises: (i) closing a port on a device in the one or more remote computing assets 100, (ii) deleting an account on a remote computing asset in the one or more remote computing assets 100, (iii) terminating a process on a remote computing asset in the one or more remote computing assets 100, (iv) altering a priority level of a process on a remote computing asset in the one or more remote computing assets 100, (v) communicating incorrect data to an interne address associated with the active threat 100, (vi) shutting down a remote computing asset in the one or more remote computing assets 100, and/or (vii) blocking traffic originating from an IP address associated with the active threat from accessing the one or more remote computing assets 100.

References Cited and Alternative Embodiments

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a tangible computer readable storage medium. For instance, the computer program product could contain the program modules shown in any combination of FIGS. 1A and/or 1B and/or 1C and/or 1D. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A computer system comprising:
   one or more processing units;
   memory storing one or more programs for execution by the one or more processors, the one more programs comprising:

instructions for receiving data collected at one or more remote computing assets;

instructions for obtaining a plurality of workflow templates, wherein each respective workflow template in the plurality of workflow templates corresponds to a different threat vector in a plurality of threat vectors and wherein each respective workflow template in the plurality of workflow templates comprises: (i) a trigger definition, (ii) an authorization token, and (iii) an enumerated countermeasure responsive to the corresponding threat vector; and instructions for identifying an active threat by comparing the data collected at the one or more remote computing assets against the trigger definition of respective workflow templates in the plurality of workflow templates, wherein, when a match between the data collected at the one or more remote computing assets and a specific trigger definition of a corresponding specific workflow template is identified, an active threat is deemed to be identified, and the instructions for identifying further comprise:

(A) enacting the authorization token of the corresponding workflow template, wherein the enacting comprises:
  (a) obtaining authorization from a first authorization contact associated with the corresponding workflow template, the obtaining (a) comprising (i) pushing an alert regarding the corresponding workflow template through a first established trust channel to a first remote device associated with the first authorization contact without user intervention by the first authorization contact, wherein the first remote device is other than the one or more remote computing assets, and (ii) receiving a first indication to proceed from the first authorization contact, and
  (b) obtaining authorization from a second authorization contact associated with the corresponding workflow template, by a method comprising (i) pushing the alert regarding the corresponding workflow template through a second established trust channel to a second remote device associated with the second authorization contact without user intervention by the second authorization contact, wherein the second remote device is other than the one or more remote computing assets and wherein the second remote device is other than the first remote device, and (ii) receiving a second indication to proceed from the second authorization contact,
  (c) pushing the alert to a plurality of authorization contacts, wherein the plurality of authorization contacts consists of three of more authorization contacts and includes the first and the second authorization contacts,
(B) responsive to satisfactory completion of authorization protocol, wherein satisfaction of the authorization protocol requires receiving an indication to proceed from more than a predetermined number of authorization contacts in the plurality of authorization contacts, including the first and the second indication to proceed, wherein the predetermined number of authorization contacts is less than the number of authorization contacts in the plurality of authorization contacts, executing the enumerated countermeasure of the corresponding workflow template, and
(C) originating or maintaining the established first trust channel by:
  receiving a request from a security control module running within an operating system on the first remote device, wherein the request includes a policy identifier that identifies a security policy,
  generating a unique agent identity token, which includes a cryptographic key,
  transmitting the unique agent identity token to the security control module,
  selecting a set of commands according to the identified security policy, based on (i) a current state of the operating system, (ii) a current state of the security control module, and, optionally (iii) a current state of one or more applications running in the operating system on the first remote device,
  placing the set of commands in a command queue for retrieval and execution by the first remote device,
  receiving data from the first remote device responsive to execution of the set of commands on the first remote device, and
  using the data to originate or maintain the first established trust channel with the first remote device.

2. The computer system of claim 1, wherein the one or more programs further comprise instructions for:
  receiving the request from the security control module running within the first operating system on the first remote computing asset in the one or more remote computing assets, wherein the request includes the policy identifier that identifies the security policy;
  generating the unique agent identity token, which includes the cryptographic key;
  transmitting the agent identity token to the security control module;
  selecting the first set of commands according to the identified security policy, based upon (i) the current state of the first operating system, (ii) the current state of the security control module, and (iii) the current state of one or more applications running in the first operating system on the first remote computing asset; and
  placing the first set of commands in the command queue for retrieval and execution by the security control module on the first remote computing asset, wherein the data collected at the one or more remote computing assets includes information that is collected by execution of the first set of commands on the first remote computing asset.

3. The computer system of claim 1, wherein the first remote device is a first mobile device and the second remote device is a second mobile device.

4. The computer system of claim 1, wherein the enumerated countermeasure of the corresponding workflow template comprises a first action that targets a first component of the threat vector associated with the corresponding workflow template.

5. The computer system of claim 4, wherein the enumerated countermeasure of the corresponding workflow template further comprises a second action that targets a second component of the threat vector associated with the corresponding workflow template.

6. The computer system of claim 1, wherein executing the enumerated countermeasure closes or restricts a port in a remote computing asset in the one or more remote computing assets.

7. The computer system of claim 1, wherein the enumerated countermeasure of the corresponding workflow template is a technical control set.

8. The computer system of claim 1, wherein the technical control set comprises:
  (i) closing a port on a device in the one or more remote computing assets, (ii) deleting an account on a remote computing asset in the one or more remote computing assets,
(iii) terminating a process on a remote computing asset in the one or more remote computing assets,
(iv) altering a priority level of a process on a remote computing asset in the one or more remote computing assets,
(v) communicating incorrect data to an internet address associated with the active threat,
(vi) shutting down a remote computing asset in the one or more remote computing assets, or
(vii) blocking traffic originating from an IP address associated with the active threat from accessing the one or more remote computing assets.

9. The computer system of claim 1, wherein the pushing the alert regarding the corresponding workflow template through the first trusted channel comprises placing the alert in the command queue for retrieval by the first remote device.

10. The computer system of claim 1, wherein the first indication to proceed is received from the first authorization contact across the first established trust channel, from the first remote device.

11. The computer system of claim 1, wherein the first indication to proceed is received from the first authorization contact outside the first established trust channel.

12. The computer system of claim 1, wherein the enacting the security token comprises pushing the alert to a plurality of authorization contacts, wherein
the plurality of authorization contacts consists of three of more authorization contacts and includes the first and second authorization contact,
each authorization contact in the plurality of authorization contacts is associated with a point value that is contributed to an authorization score when the authorization contact provides the indication to proceed, and
satisfactory completion of the authorization protocol comprises achieving a cumulative point score that exceeds a predetermined value.

13. The computer system of claim 12, wherein the first authorization contact has a point value that is different than the second authorization contact.

14. The computer system of claim 1, wherein the authorization token includes a threat level value that represents the threat level of the corresponding workflow template, and wherein enacting the authorization token comprises using the threat level value to select an authorization protocol from among a plurality of authorization protocols, wherein the authorization protocol includes an identity of the first remote device and the second remote device.

15. The computer system of claim 14, wherein
a first authorization protocol in the plurality of authorization protocols is associated with a first threat level value and includes contact information for a first plurality of authorization contacts that are to be contacted by the enacting (i) upon selection of the first authorization protocol,
a second authorization protocol in the plurality of authorization protocols is associated with a second threat level value, other than the first threat level value, and includes contact information for a second plurality of authorization contacts that are to be contacted by the enacting (i) upon selection of the second authorization protocol, and a number of authorization contacts in the first plurality of authorization contacts is different than a number of authorization contacts in the second plurality of authorization contacts.

16. The computer system of claim 1, wherein the one more programs further comprise instructions for determining the authorization token for a first workflow template in the plurality of workflow templates based upon a characteristic of the one or more remote computing assets that the first workflow template is designed to protect.

17. The computer system of claim 16, wherein the characteristic is (i) a quantification of the confidentiality of information handled by the one or more remote computing assets or (ii) a quantification of the importance on maintaining the integrity of the information handled by the one or more remote computing assets, or (iii) a quantification of the importance of maintaining the availability of the one or more remote computing assets.

18. The computer system of claim 16, wherein a remote computing asset in the one or more remote computing assets is a remote computer system at a predetermined IP address, a data stack, a computer service implemented on a computer system, or an internet protocol port on a remote computer system.

19. The computer system of claim 1, wherein the trigger definition of the workflow template in the plurality of workflow templates is correlated with an intrusion of the one or more remote computing assets.

20. The computer system of claim 1, wherein, responsive to unsatisfactory completion of the authorization protocol, the enumerated countermeasure of the corresponding workflow template is not executed.

21. The computer system of claim 1, wherein
each said respective workflow template in the plurality of workflow templates comprises an indication as to whether it is enabled or not, and
the identifying the active threat compares the data collected at the one or more remote computing assets against only those trigger definitions of respective workflow templates in the plurality of workflow templates that are enabled.

22. The computer system of claim 1, wherein
the trigger definition of the workflow template in the plurality of workflow templates comprises a plurality of triggers,
each said respective trigger in the plurality of triggers is represented by (i) a variable indicating a status of the respective trigger and (ii) an event type, and
the trigger definition further comprises logic that relates the plurality of triggers into a single expression.

23. The computer system of claim 1, wherein receiving the data collected uses the cryptographic key assigned to the one or more remote computing assets and data shared with the one or more remote computing assets to decrypt the received data and verify a digital signature within the data.

24. The computer system of claim 1, wherein the data collected at the one or more remote computing assets includes:
(i) information regarding one or more processes running in memory associated with the one or more remote computing assets,
(ii) information that identifies what processes are running in memory associated with the one or more remote computing assets,
(iii) a current set of authorized users of the one or more remote computing assets, (iv) a current set of files and directories hosted by the one or more remote computing assets, (v) current metadata for files and directories hosted by the one or more remote computing assets, or (vi) current content of one or more configuration files for the one or more remote computing assets.

25. The computer system of claim 1, wherein the one or more remote computing assets includes at least one virtual machine.

26. The computer system of claim 1, wherein the one or more remote computing assets consists of a single virtual machine.

27. The computer system of claim 1, wherein the instructions for receiving data collected at the one or more remote computing assets is scheduled to repeat execution at a predetermined time or at predetermined time intervals.

28. The computer system of claim 1, wherein a remote computing asset in the one or more remote computing assets is an embedded component of an automobile or an embedded component of an electrical appliance.

29. A non-transitory computer readable storage medium storing one or more programs configured for execution by a computing device having one or more processors and memory, the one or more programs comprising:

instructions for receiving data collected at one or more remote computing assets;

instructions for obtaining a plurality of workflow templates, wherein each respective workflow template in the plurality of workflow templates corresponds to a different threat vector in a plurality of threat vectors and wherein each respective workflow template in the plurality of workflow templates comprises: (i) a trigger definition, (ii) an authorization token, and (iii) an enumerated countermeasure responsive to the corresponding threat vector; and instructions for identifying an active threat by comparing the data collected at the one or more remote computing assets against the trigger definition of respective workflow templates in the plurality of workflow templates, wherein, when a match between the data collected at the one or more remote computing assets and a trigger definition of a corresponding workflow template is identified, an active threat is deemed to be identified, and the instructions for identifying further comprise:

(A) enacting the authorization token of the corresponding workflow template, wherein the enacting comprises:

(a) obtaining authorization from a first authorization contact associated with the corresponding workflow template, the obtaining (a) comprising (i) pushing an alert regarding the corresponding workflow template through a first established trust channel to a first remote device associated with the first authorization contact without user intervention by the first authorization contact, wherein the first remote device is other than the one or more remote computing assets, and (ii) receiving a first indication to proceed from the first authorization contact, and (b) obtaining authorization from a second authorization contact associated with the corresponding workflow template, by a method comprising (i) pushing the alert regarding the corresponding workflow template through a second established trust channel to a second remote device associated with the second authorization contact without user intervention by the second authorization contact, wherein the second remote device is other than the one or more remote computing assets and wherein the second remote device is other than the first remote device, and (ii) receiving a second indication to proceed from the second authorization contact, (c) pushing the alert to a plurality of authorization contacts, wherein the plurality of authorization contacts consists of three of more authorization contacts and includes the first and second authorization contacts, (B) responsive to satisfactory completion of the authorization protocol, wherein satisfaction of the authorization protocol requires receiving an indication to proceed from more than a predetermined number of authorization contacts in the plurality of authorization contacts, including the first and second indication to proceed, wherein the predetermined number of authorization contacts is less than the number of authorization contacts in the plurality of authorization contacts, executing the enumerated countermeasure of the corresponding workflow template, and (C) originating or maintaining the established first trust channel by:

receiving a request from a security control module running within an operating system on a first remote device, wherein the request includes a policy identifier that identifies a security policy, generating a unique agent identity token, which includes a cryptographic key, transmitting the agent identity token to the security control module, selecting a set of commands according to the identified security policy, based on (i) a current state of the operating system, (ii) a current state of the security control module, and, optionally (iii) a current state of one or more applications running in the operating system on the first remote device, placing the set of commands in a command queue for retrieval and execution by the first remote device, receiving data from the first remote device responsive to execution of the set of commands on the first remote device, and using the data to originate or maintain the first established trust channel with the first remote device.

30. The non-transitory computer readable storage medium of claim 29, wherein the one or more programs further comprise instructions for:

receiving a request from a security control module running within a first operating system on a first remote computing asset in the one or more remote computing assets, wherein the request includes a policy identifier that identifies a security policy;

generating a unique agent identity token, which includes a cryptographic key;

transmitting the agent identity token to the security control module;

selecting a first set of commands according to the identified security policy, based upon (i) a current state of the first operating system, (ii) a current state of the security control module, and (iii) a current state of one or more applications running in the first operating system on the first remote computing asset; and placing the first set of commands in a command queue for retrieval and execution by the security control module on the first remote computing asset, wherein the data collected at the one or more remote computing assets includes information that is collected by execution of the first set of commands on the first remote computing asset.

* * * * *